United States Patent
Wang et al.

(10) Patent No.: US 10,536,926 B2
(45) Date of Patent: Jan. 14, 2020

(54) MBSFN CONFIGURATION METHOD AND DEVICE

(71) Applicant: Huawei Technologies Co., Ltd., Shenzhen, Guangdong (CN)

(72) Inventors: Ting Wang, Shanghai (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 59 days.

(21) Appl. No.: 15/336,491

(22) Filed: Oct. 27, 2016

(65) Prior Publication Data
US 2017/0048820 A1 Feb. 16, 2017

Related U.S. Application Data

(63) Continuation of application No. PCT/CN2014/076405, filed on Apr. 28, 2014.

(51) Int. Cl.
*H04H 20/71* (2008.01)
*H04W 72/00* (2009.01)
(Continued)

(52) U.S. Cl.
CPC ......... *H04W 72/005* (2013.01); *H04L 5/0048* (2013.01); *H04L 5/0053* (2013.01);
(Continued)

(58) Field of Classification Search
CPC ........ H04W 4/06; H04W 84/18; H04W 84/12
See application file for complete search history.

(56) References Cited

U.S. PATENT DOCUMENTS

2010/0246376 A1 * 9/2010 Nam ..................... H04L 5/0051
370/208
2011/0176634 A1 7/2011 Yoon et al.
(Continued)

FOREIGN PATENT DOCUMENTS

CN 101540751 A 9/2009
CN 101931600 A 12/2010
(Continued)

OTHER PUBLICATIONS

CATR; "Simulation results for downlink DMRS overhead reduction"; 3GPP TSG-RAN WG1 Meeting #72BIS; R1-131508; Chicago, USA; Apr. 15-19, 2013; 5 pages.
(Continued)

*Primary Examiner* — Siren Wei
(74) *Attorney, Agent, or Firm* — Leydig, Voit & Mayer, Ltd.

(57) ABSTRACT

Embodiments of the present invention provide an MBSFN configuration method and a device, which may implement flexible configuration of an MBSFN, and improve radio resource utilization of a system. The method includes: determining, by a base station, a subframe configuration of an MBSFN subframe that is used to bear a physical multicast channel PMCH, where the subframe configuration includes a cyclic prefix CP type and/or a reference signal pattern; and sending, by the base station, MBSFN configuration information to user equipment UE, where the MBSFN configuration information is used to indicate the subframe configuration of the MBSFN subframe, where the CP type includes a normal CP, an extended CP, or another CP, and a length of the another CP is different from a length of the normal CP or a length of the extended CP. The present invention is applicable to the communications field.

13 Claims, 23 Drawing Sheets

(51) Int. Cl.
    *H04L 5/00*       (2006.01)
    *H04L 27/26*     (2006.01)
    *H04W 4/06*      (2009.01)
    *H04L 12/18*     (2006.01)

(52) U.S. Cl.
    CPC ........ *H04L 5/0094* (2013.01); *H04L 27/2607* (2013.01); *H04W 4/06* (2013.01); *H04L 12/189* (2013.01)

(56) References Cited

U.S. PATENT DOCUMENTS

| | | | |
|---|---|---|---|
| 2011/0286382 A1 | 11/2011 | To et al. | |
| 2013/0258935 A1* | 10/2013 | Zhang | H04W 72/005 370/312 |
| 2013/0294317 A1* | 11/2013 | Malladi | H04W 4/06 370/312 |
| 2014/0204825 A1* | 7/2014 | Ekpenyong | H04L 5/001 370/312 |
| 2014/0226636 A1* | 8/2014 | Xu | H04W 72/042 370/336 |
| 2015/0078266 A1 | 3/2015 | Guo et al. | |
| 2015/0078292 A1* | 3/2015 | Walker | H04L 27/2607 370/329 |
| 2015/0341131 A1* | 11/2015 | Sano | H04W 16/28 370/329 |

FOREIGN PATENT DOCUMENTS

| | | |
|---|---|---|
| CN | 102088434 A | 6/2011 |
| CN | 102377722 A | 3/2012 |
| CN | 103314614 A | 9/2013 |
| CN | 103457709 A | 12/2013 |
| WO | 2010090215 A1 | 8/2010 |
| WO | 2013/025547 A2 | 2/2013 |

OTHER PUBLICATIONS

"3rd Generation Partnership Project; Technical Specification Group Radio Access Network; Evolved Universal Terrestrial Radio Access (E-UTRA); Physical channels and modulation (Release 12)"; 3GPP TS 36.211 V12.1.0; Mar. 2014; total 9 pages.

"Issues regarding MBSFN subframes," 3GPP TSG-RAN WG1 Meeting #51, Jeju, Korea, R1-074863, 3rd Generation Partnership Project, Valbonne, France (Nov. 5-9, 2007).

"Configurations of Subframes for Monitoring ePDCCH," 3GPP TSG-RAN WG1 #70bis, San Diego, USA, R1-124450, pp. 1-4, 3rd Generation Partnership Project, Valbonne, France (Oct. 8-12, 2012).

KR 045628911, Notice of Allowance, dated Jun. 28, 2019.

* cited by examiner

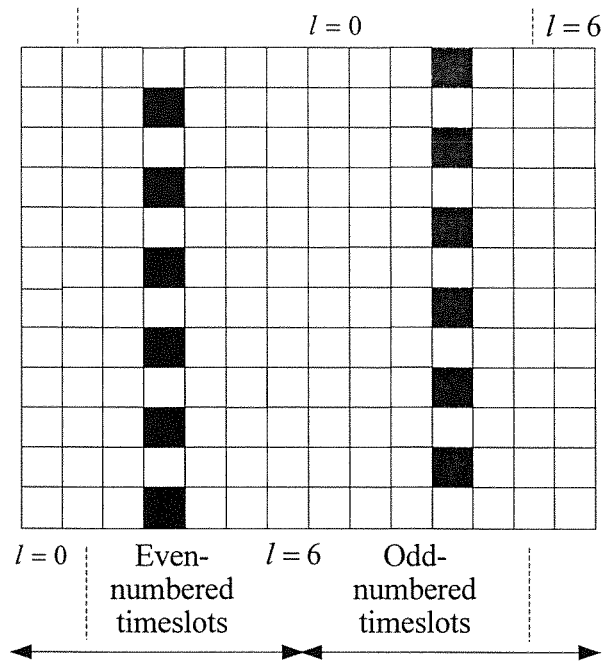

FIG. 39

UE receives MBSFN configuration information, where the MBSFN configuration information is used to indicate subframe configuration of an MBSFN subframe that bears a PMCH, and the subframe configuration includes a CP type and/or a reference signal pattern, where the CP type includes a normal CP, an extended CP, or another CP, and a length of the another CP is different from a length of the normal CP or a length of the extended CP — 4001

The UE determines the subframe configuration of the MBSFN subframe according to the MBSFN configuration information — 4002

FIG. 40

MBSFN CONFIGURATION METHOD AND DEVICE

CROSS-REFERENCE TO RELATED APPLICATIONS

This application is a continuation of International Application No. PCT/CN2014/076405, filed on Apr. 28, 2014, the disclosure of which is hereby incorporated by reference in its entirety.

TECHNICAL FIELD

The present invention relates to the communications field, and in particular, to an MBSFN configuration method and a device.

BACKGROUND

Currently, in a Long Term Evolution (LTE) system, a structure of a radio frame is as follows: One radio frame includes 10 subframes, and each subframe includes two timeslots. Generally, timeslots in the 10 subframes are represented according to numbers such as number 0, number 1, number 2, . . . , number 18, and number 19, that is, in a radio frame, a subframe number 1 consists of a timeslot number 0 and a timeslot number 1, a subframe number 1 consists of a timeslot number 2 and a timeslot number 3, . . . , and a subframe number 9 consists of a timeslot number 18 and a timeslot number 19.

An orthogonal frequency division multiplexing (OFDM) technology is used in downlink transmission in the LTE system. In the OFDM technology, a guard interval or a cyclic prefix (CP) may be added preceding each OFDM symbol to eliminate intersymbol interference brought by multipath transmission of a signal. Currently, two CP types are defined in LTE: One is a normal CP, and the other is an extended CP. When the CP type is a normal CP, each timeslot includes seven OFDM symbols, where numbers of the OFDM symbols may be respectively denoted as 0 to 6. When the CP type is an extended CP, a timeslot of a subframe of a radio frame includes six OFDM symbols, where numbers of the OFDM symbols may be respectively denoted as 0 to 5.

One physical resource block (PRB) pair occupies one subframe, that is, two timeslots, in a time domain, and consists of 12 subcarriers in a frequency domain. Exemplarily, as shown in FIG. 1(a), FIG. 1(a) is a schematic structural diagram of one PRB pair exists when a CP type is an extended CP. Each small grid is one resource element (RE), and the PRB pair consists of 12 subcarriers in a frequency domain, and occupies one subframe, that is, two timeslots, corresponding to 12 OFDM symbols, in a time domain. In this case, one PRB pair includes 144 resource elements. Each RE is corresponding to one OFDM symbol in the time domain and one subcarrier in the frequency domain, that is, one small grid in FIG. 1(a). Exemplarily, as shown in FIG. 1(b), FIG. 1(b) is a schematic diagram of one PRB pair exists when a CP type is a normal CP. Each small grid is one RE, and the PRB pair consists of 12 subcarriers in a frequency domain, and occupies one subframe, that is, two timeslots, corresponding to 14 OFDM symbols, in a time domain. In this case, the one PRB pair includes 168 REs. Each RE is corresponding to one OFDM symbol in the time domain and one subcarrier in the frequency domain, that is, one small grid in FIG. 1(b).

A Multimedia Broadcast multicast service Single Frequency Network (MBSFN) transmission manner may be used when a multimedia broadcast multicast service is being transmitted in the LTE system. In the transmission manner, MBSFN data is transmitted from multipath strict time synchronization cells over an air interface at the same time, and user equipment (UE) may receive a signal transmitted through multiple paths. For the UE, multipath transmission received from the multiple cells is equivalent to one-path transmission from a single cell, so that transmission that could have caused inter-cell interference is converted into desired signal energy, which may improve spectral efficiency and a signal to interference plus noise ratio (SINR), and improve coverage performance.

In the prior art, MBSFN data is mapped to a physical multicast channel (PMCH) for transmission. Because a channel for the MBSFN data is actually an aggregate channel from multiple cells, UE needs to perform independent channel estimation when receiving the MBSFN data. In a subframe, to prevent an MBSFN reference signal and another reference signal from mixing, in a current standard protocol, frequency division multiplexing of the PMCH and a physical downlink shared channel (PDSCH) is not permitted, but time division multiplexing of the PMCH and the PDSCH is permitted, that is, some specific subframes may be designed as MBSFN subframes, and the MBSFN subframes may be used to bear the PMCH.

Because a difference between transmission delays of multiple cells is generally greater than a delay spread of a single cell, in the standard protocol, it is specified that the MBSFN subframe uses an extended CP, because a relatively long CP helps reduce intersymbol interference. In addition, an MBSFN reference signal pattern is also modified to improve channel estimation accuracy. As shown in FIG. 3, compared with non-MBSFN data transmission, a quantity of REs in an MBSFN reference signal pattern increases, and a spacing in a frequency domain is tighter. Therefore, a base station and user equipment that comply with the standard protocol can successfully complete MBSFN transmission by using the extended CP and the foregoing MBSFN reference signal pattern. In addition, to adhere to a deployment scenario in which a difference between transmission delays of a signal transmitted in different cells is larger, in LTE, it is considered to use a CP that is longer than the extended CP to eliminate the intersymbol interference as possible. In addition, a smaller subcarrier spacing is designed accordingly to reduce CP overheads. Therefore, with further development of MBSFN transmission, how to avoid a reduction in radio resource utilization of a system is still a problem worthy of further study.

SUMMARY

Embodiments of the present invention provide an MBSFN configuration method and a device, which may implement flexible configuration of an MBSFN, and improve radio resource utilization of a system.

To achieve the foregoing objective, the following technical solutions are used in the embodiments of the present invention:

According to a first aspect, a Multimedia Broadcast multicast service Single Frequency Network MBSFN configuration method is provided, where the method includes:

determining, by a base station, a subframe configuration of an MBSFN subframe that is used to bear a physical multicast channel PMCH, where the subframe configuration includes a cyclic prefix CP type and/or a reference signal pattern; and sending, by the base station, MBSFN configuration information to user equipment UE, where the MBSFN configuration info' nation is used to indicate the subframe configuration of the MBSFN subframe; where the CP type includes a normal CP, an extended CP, or another CP, and a length of the another CP is different from a length of the normal CP or a length of the extended CP.

In a first possible implementation manner of the first aspect, with reference to the first aspect, the subframe configuration of the MBSFN subframe includes at least one configuration of a configuration A or B:

the configuration A: the CP type is a normal CP or another CP; or the configuration B: in each physical resource block PRB pair, the reference signal pattern includes n reference signal resource elements REs, where n is a positive integer less than 18.

In a second possible implementation manner of the first aspect, with reference to the first possible implementation manner of the first aspect, the configuration B further includes:

n=6, and the n reference signal REs are spaced five, three, or one subcarrier apart in a frequency domain; or n=8, and the n reference signal REs are spaced two subcarriers apart in a frequency domain; or n=9, and the n reference signal REs are spaced three subcarriers apart in a frequency domain; or n=4, and the n reference signal REs are spaced five or two subcarriers apart in a frequency domain; or n=12, and the n reference signal REs are spaced one subcarrier apart in a frequency domain.

In a third possible implementation manner of the first aspect, with reference to the second possible implementation manner of the first aspect, the configuration B further includes:

if the reference signal RE is denoted as (k,l), k indicates a frequency domain index, and l indicates a time domain index:

when n=6, and the n reference signal REs are spaced five subcarriers apart in the frequency domain:

$$k = \begin{cases} 6m + k_0 & \text{if } l \neq l_1 \text{ and } \Delta f = 15 \text{ kHz} \\ 6m + k_0 + a_0 & \text{if } l = l_1 \text{ and } \Delta f = 15 \text{ kHz} \end{cases},$$

$$l = \begin{cases} l_0 & \text{if } n_s \mod 2 = 0 \text{ and } \Delta f = 15 \text{ kHz} \\ l_1, l_2 & \text{if } n_s \mod 2 = 1 \text{ and } \Delta f = 15 \text{ kHz} \end{cases},$$

$0 \leq k_0 \leq 5$, $-5 \leq a_0 \leq 5$, $0 \leq k_0 + a_0 \leq 5$, and $m = 0, 1, \ldots, 2N_{RB}^{PMCH,DL} - 1$; or when n=6, and the n reference signal REs are spaced three subcarriers apart in the frequency domain:

$$k = \begin{cases} 4m + k_0 & \text{if } l \neq l_1 \text{ and } \Delta f = 15 \text{ kHz} \\ 4m + k_0 + a_0 & \text{if } l = l_1 \text{ and } \Delta f = 15 \text{ kHz} \end{cases},$$

$$l = \begin{cases} l_0 & \text{if } n_s \mod 2 = 0 \text{ and } \Delta f = 15 \text{ kHz} \\ l_1 & \text{if } n_s \mod 2 = 1 \text{ and } \Delta f = 15 \text{ kHz} \end{cases},$$

$0 \leq k_0 \leq 3$, $-3 \leq a_0 \leq 3$, and $0 \leq k_0 + a_0 \leq 3$, and $m = 0, 1, \ldots, 3N_{RB}^{PMCH,DL} - 1$; or when n=6, and the n reference signal REs are spaced one subcarrier apart in the frequency domain:

$k = 2m + k_0$, $l = l_0$ if $n_s \mod 2 = 0$ and $\Delta f = 15$ kHz, $0 \leq k_0 \leq 1$, and $m = 0, 1, \ldots, 6N_{RB}^{PMCH,DL} - 1$; or when n=8, and the n reference signal REs are spaced two subcarriers apart in the frequency domain:

$$k = \begin{cases} 3m + k_0 & \text{if } l \neq l_1 \text{ and } \Delta f = 15 \text{ kHz} \\ 3m + k_0 + a_0 & \text{if } l = l_1 \text{ and } \Delta f = 15 \text{ kHz} \end{cases},$$

$$l = \begin{cases} l_0 & \text{if } n_s \mod 2 = 0 \text{ and } \Delta f = 15 \text{ kHz} \\ l_1 & \text{if } n_s \mod 2 = 1 \text{ and } \Delta f = 15 \text{ kHz} \end{cases},$$

$0 \leq k_0 \leq 2$, $-2 \leq a_0 \leq 2$, and $0 \leq k_0 + a_0 \leq 2$; and $m = 0, 1, \ldots, 4N_{RB}^{PMCH,DL} - 1$; or when n=9, and the n reference signal REs are spaced three subcarriers apart in the frequency domain:

$$k = \begin{cases} 4m + k_0 & \text{if } l \neq l_1 \text{ and } \Delta f = 15 \text{ kHz} \\ 4m + k_0 + a_0 & \text{if } l = l_1 \text{ and } \Delta f = 15 \text{ kHz} \end{cases},$$

$$l = \begin{cases} l_0 & \text{if } n_s \mod 2 = 0 \text{ and } \Delta f = 15 \text{ kHz} \\ l_1, l_2 & \text{if } n_s \mod 2 = 1 \text{ and } \Delta f = 15 \text{ kHz} \end{cases},$$

$0 \leq k_0 \leq 3$, $-3 \leq a_0 \leq 3$, and $0 \leq k_0 + a_0 \leq 3$, and $m = 0, 1, \ldots, 3N_{RB}^{PMCH,DL} - 1$; or when n=4, and the n reference signal REs are spaced five subcarriers apart in the frequency domain:

$$k = \begin{cases} 6m + k_0 & \text{if } l \neq l_1 \text{ and } \Delta f = 15 \text{ kHz} \\ 6m + k_0 + a_0 & \text{if } l = l_1 \text{ and } \Delta f = 15 \text{ kHz} \end{cases},$$

$$l = \begin{cases} l_0 & \text{if } n_s \mod 2 = 0 \text{ and } \Delta f = 15 \text{ kHz} \\ l_1 & \text{if } n_s \mod 2 = 1 \text{ and } \Delta f = 15 \text{ kHz} \end{cases},$$

$0 \leq k_0 \leq 5$, $-5 \leq a_0 \leq 5$, $0 \leq k_0 + a_0 \leq 5$, and $m = 0, 1, \ldots, 2N_{RB}^{PMCH,DL} - 1$; or when n=4, and the n reference signal REs are spaced two subcarriers apart in the frequency domain:

$k = 3m + k_0$, $l = l_0$ if $n_s \mod 2 = 0$ and $\Delta f = 15$ kHz, $0 \leq k_0 \leq 2$, and $m = 0, 1, \ldots, 4N_{RB}^{PMCH,DL} - 1$; or when n=12, and the n reference signal REs are spaced one subcarrier apart in the frequency domain:

$$k = \begin{cases} 2m + k_0 & \text{if } l \neq l_1 \text{ and } \Delta f = 15 \text{ kHz} \\ 2m + k_0 + a_0 & \text{if } l = l_1 \text{ and } \Delta f = 15 \text{ kHz} \end{cases},$$

$$l = \begin{cases} l_0 & \text{if } n_s \mod 2 = 0 \text{ and } \Delta f = 15 \text{ kHz} \\ l_1 & \text{if } n_s \mod 2 = 1 \text{ and } \Delta f = 15 \text{ kHz} \end{cases},$$

$0 \leq k_0 \leq 1$, $-1 \leq a_0 \leq 1$, $0 \leq k_0 + a_0 \leq 1$, and $m = 0, 1, \ldots, 6N_{RB}^{PMCH,DL} - 1$; where $\Delta f$ indicates a frequency domain spacing between adjacent subcarriers; $n_s$ indicates a number of a timeslot that is in a radio frame and in which the reference signal RE is located; $n_s \mod 2$ indicates a mod 2 operation performed on $n_s$; m indicates a number of a reference symbol; $k_0$ and $a_0$ indicate offsets of the frequency domain index; $l_0$, $l_1$, and $l_2$ indicate numbers of OFDM symbols in the timeslot $n_s$ in which the reference signal RE is located, where $t \leq l_0 \leq N_{symb}^{DL} - 1$, $0 \leq l_1 \leq N_{symb}^{DL} - 1$, $0 \leq l_2 \leq N_{symb}^{DL} - 1$, and $l_1 < l_2$; $N_{RB}^{PMCH,DL}$ indicates transmission bandwidth of the PMCH borne on the MBSFN subframe; $N_{symb}^{DL}$ indicates a quantity of OFDM symbols in one timeslot; and t indicates a number of an initial OFDM symbol of the PMCH on the MBSFN subframe.

In a fourth possible implementation manner of the first aspect, with reference to the first aspect to the third possible implementation manner of the first aspect, the method further includes:

sending, by the base station, configuration information of a physical downlink shared channel PDSCH to the UE, where the configuration information of the PDSCH is used to indicate transmission bandwidth of the PDSCH on the MBSFN subframe.

In a fifth possible implementation manner of the first aspect, with reference to the first aspect to the fourth possible implementation manner of the first aspect, the method further includes:

sending, by the base station, orthogonal frequency division multiplexing OFDM symbol information of the PMCH to the UE, where the OFDM symbol information of the PMCH is used to indicate that the initial OFDM symbol of the PMCH on the MBSFN subframe is the first OFDM symbol of the MBSFN subframe.

In a sixth possible implementation manner of the first aspect, with reference to the first aspect to the fifth possible implementation manner of the first aspect, the method further includes:

sending, by the base station, configuration information of an enhanced physical downlink control channel EPDCCH to the UE, where the configuration information of the EPDCCH is used to indicate transmission bandwidth of the EPDCCH on the MBSFN subframe.

In a seventh possible implementation manner of the first aspect, with reference to the first aspect to the sixth possible implementation manner of the first aspect, the method further includes:

sending, by the base station, antenna configuration information of the PMCH to the UE, where the antenna configuration information is used to indicate that an antenna transmission manner of the PMCH is a multi-antenna transmission manner in which a quantity of antenna ports is greater than 1.

In an eighth possible implementation manner of the first aspect, with reference to the seventh possible implementation manner of the first aspect, in the multi-antenna transmission manner, the reference signal pattern uses a frequency division multiplexing FDM manner, or a time division multiplexing TDM manner, or a code division multiplexing CDM manner in which code division is performed by using an orthogonal code.

In a ninth possible implementation manner of the first aspect, with reference to the first aspect to the eighth possible implementation manner of the first aspect, the determining, by a base station, a subframe configuration of an MBSFN subframe that is used to bear a PMCH includes:

using, by the base station, a preset subframe configuration of the MBSFN subframe, where the preset subframe configuration of the MBSFN subframe is determined based on a deployment environment of the base station.

In a tenth possible implementation manner of the first aspect, with reference to the first aspect to the eighth possible implementation manner of the first aspect, the determining, by a base station, a subframe configuration of an MBSFN subframe that is used to bear a physical multicast channel PMCH includes:

receiving, by the base station, second MBSFN configuration information sent by a network device, and determining the subframe configuration of the MBSFN subframe according to the second MBSFN configuration information.

According to a second aspect, a Multimedia Broadcast multicast service Single Frequency Network MBSFN configuration method is provided, where the method includes:

receiving, by user equipment UE, MBSFN configuration information, where the MBSFN configuration information is used to indicate a subframe configuration of an MBSFN subframe that bears a physical multicast channel PMCH, and the subframe configuration includes a cyclic prefix CP type and/or a reference signal pattern; and determining, by the UE, the subframe configuration of the MBSFN subframe according to the MBSFN configuration information, where the CP type includes a normal CP, an extended CP, or another CP, and a length of the another CP is different from a length of the normal CP or a length of the extended CP.

In a first possible implementation manner of the second aspect, with reference to the second aspect, the subframe configuration of the MBSFN subframe includes at least one configuration of a configuration A or B:

the configuration A: the CP type is a normal CP or another CP; or the configuration B: in each physical resource block PRB pair, the reference signal pattern includes n reference signal resource elements REs, where n is a positive integer less than 18.

In a second possible implementation manner of the second aspect, with reference to the first possible implementation manner of the second aspect, the configuration B further includes:

n=6, and the n reference signal REs are spaced five, three, or one subcarrier apart in a frequency domain; or n=8, and the n reference signal REs are spaced two subcarriers apart in a frequency domain; or n=9, and the n reference signal REs are spaced three subcarriers apart in a frequency domain; or n=4, and the n reference signal REs are spaced five or two subcarriers apart in a frequency domain; or n=12, and the n reference signal REs are spaced one subcarrier apart in a frequency domain.

In a third possible implementation manner of the second aspect, with reference to the second possible implementation manner of the second aspect, the configuration B further includes:

a location of the reference signal RE in the reference signal pattern meets the following conditions:

if the reference signal RE is denoted as (k,l), k indicates a frequency domain index, and l indicates a time domain index:

when n=6, and the n reference signal REs are spaced five subcarriers apart in the frequency domain:

$$k = \begin{cases} 6m + k_0 & \text{if } l \neq l_1 \text{ and } \Delta f = 15 \text{ kHz} \\ 6m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1, l_2 & \text{if } n_s \bmod 2 = 1 \text{ and } \Delta f = 15 \text{ kHz} \end{cases},$$

$0 \leq k_0 \leq 5$, $-5 \leq a_0 \leq 5$, $0 \leq k_0 + a_0 \leq 5$, and m=0, 1, . . . , $2N_{RB}^{PMCH,DL}-1$; or when n=6, and the n reference signal REs are spaced three subcarriers apart in the frequency domain:

$$k = \begin{cases} 4m + k_0 & \text{if } l \neq l_1 \text{ and } \Delta f = 15 \text{ kHz} \\ 4m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1 & \text{if } n_s \bmod 2 = 1 \text{ and } \Delta f = 15 \text{ kHz} \end{cases},$$

$0 \leq k_0 \leq 3$, $-3 \leq a_0 \leq 3$, and $0 \leq k_0 + a_0 \leq 3$, and m=0, 1, . . . , $3N_{RB}^{PMCH,DL} - 1$; or when n=6, and the n reference signal REs are spaced one subcarrier apart in the frequency domain:

$k = 2m + k_0$, $l = l_0$ if $n_s \bmod 2 = 0$ and $\Delta f = 15$ kHz, $0 \leq k_0 \leq 1$, and m=0, 1, . . . , $6N_{RB}^{PMCH,DL} - 1$; or when n=8, and the n reference signal REs are spaced two subcarriers apart in the frequency domain:

$$k = \begin{cases} 3m + k_0 & \text{if } l \neq l_1 \text{ and } \Delta f = 15 \text{ kHz} \\ 3m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1 & \text{if } n_s \bmod 2 = 1 \text{ and } \Delta f = 15 \text{ kHz} \end{cases},$$

$0 \leq k_0 \leq 2$, $-2 \leq a_0 \leq 2$, and $0 \leq k_0 + a_0 \leq 2$, and m=0, 1, . . . , $4N_{RB}^{PMCH,DL} - 1$; or when n=9, and the n reference signal REs are spaced three subcarriers apart in the frequency domain:

$$k = \begin{cases} 4m + k_0 & \text{if } l \neq l_1 \text{ and } \Delta f = 15 \text{ kHz} \\ 4m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1, l_2 & \text{if } n_s \bmod 2 = 1 \text{ and } \Delta f = 15 \text{ kHz} \end{cases},$$

$0 \leq k_0 \leq 3$, $-3 \leq a_0 \leq 3$, and $0 \leq k_0 + a_0 \leq 3$, and m=0, 1, . . . , $3N_{RB}^{PMCH,DL} - 1$; or when n=4, and the n reference signal REs are spaced five subcarriers apart in the frequency domain:

$$k = \begin{cases} 6m + k_0 & \text{if } l \neq l_1 \text{ and } \Delta f = 15 \text{ kHz} \\ 6m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1 & \text{if } n_s \bmod 2 = 1 \text{ and } \Delta f = 15 \text{ kHz} \end{cases},$$

$0 \leq k_0 \leq 5$, $-5 \leq a_0 \leq 5$, $0 \leq k_0 + a_0 \leq 5$, and m=0, 1, . . . , $2N_{RB}^{PMCH,DL} - 1$; or when n=4, and the n reference signal REs are spaced two subcarriers apart in the frequency domain:

$k = 3m + k_0$, $l = l_0$ if $n_s \bmod 2 = 0$ and $\Delta f = 15$ kHz, $0 \leq k_0 \leq 2$, and m=0, 1, . . . , $4N_{RB}^{PMCH,DL} - 1$; or when n=12, and the n reference signal REs are spaced one subcarrier apart in the frequency domain:

$$k = \begin{cases} 2m + k_0 & \text{if } l \neq l_1 \text{ and } \Delta f = 15 \text{ kHz} \\ 2m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1 & \text{if } n_s \bmod 2 = 1 \text{ and } \Delta f = 15 \text{ kHz} \end{cases},$$

$0 \leq k_0 \leq 1$, $-1 \leq a_0 \leq 1$, $0 \leq k_0 + a_0 \leq 1$, and m=0, 1, . . . , $6N_{RB}^{PMCH,DL} - 1$; where $\Delta f$ indicates a frequency domain spacing between adjacent subcarriers; $n_s$ indicates a number of a timeslot that is in a radio frame and in which the reference signal RE is located; $n_s \bmod 2$ indicates a mod 2 operation performed on $n_s$; m indicates a number of a reference symbol; $k_0$ and $a_0$ indicate offsets of the frequency domain index; $l_0$, $l_1$, and $l_2$ indicate numbers of OFDM symbols in the timeslot $n_s$ in which the reference signal RE is located, where $t \leq l_0 \leq N_{symb}^{DL} - 1$, $0 \leq l_1 \leq N_{symb}^{DL} - 1$, $0 \leq l_2 \leq N_{symb}^{DL} - 1$, and $l_1 < l_2$; $N_{RB}^{PMCH,DL}$ indicates transmission bandwidth of the PMCH borne on the MBSFN subframe; $N_{symb}^{DL}$ indicates a quantity of OFDM symbols in one timeslot; and t indicates a number of an initial OFDM symbol of the PMCH on the MBSFN subframe.

In a fourth possible implementation manner of the second aspect, with reference to the second aspect to the third possible implementation manner of the second aspect, the method further includes:

receiving, by the UE, configuration information of a physical downlink shared channel PDSCH, where the configuration information of the PDSCH is used to indicate transmission bandwidth of the PDSCH on the MBSFN subframe; and determining, by the UE, the transmission bandwidth of the PDSCH on the MBSFN subframe according to the configuration information of the PDSCH.

In a fifth possible implementation manner of the second aspect, with reference to the second aspect to the fourth possible implementation manner of the second aspect, the method further includes:

receiving, by the UE, orthogonal frequency division multiplexing OFDM symbol information of the PMCH, where the OFDM symbol information is used to indicate that the initial OFDM symbol of the PMCH on the MBSFN subframe is the first OFDM symbol of the MBSFN subframe; and determining, by the UE, the initial OFDM symbol of the PMCH on the MBSFN subframe according to the OFDM symbol information of the PMCH.

In a sixth possible implementation manner of the second aspect, with reference to the second aspect to the fifth possible implementation manner of the second aspect, the method further includes:

receiving, by the UE, configuration information of an enhanced physical downlink control channel EPDCCH, where the configuration information of the EPDCCH is used to indicate transmission bandwidth of the EPDCCH on the MBSFN subframe; and determining, by the UE, the transmission bandwidth of the EPDCCH on the MBSFN subframe according to the configuration information of the EPDCCH.

In a seventh possible implementation manner of the second aspect, with reference to the second aspect to the sixth possible implementation manner of the second aspect, the method further includes:

receiving, by the UE, antenna configuration information of the PMCH, where the antenna configuration information is used to indicate that an antenna transmission manner of the PMCH is a multi-antenna transmission manner in which a quantity of antenna ports is greater than 1; and determining, by the UE, the antenna transmission manner of the PMCH according to the antenna configuration information of the PMCH.

In an eighth possible implementation manner of the second aspect, with reference to the seventh possible implementation manner of the second aspect, in the multi-antenna transmission manner, the reference signal pattern uses a frequency division multiplexing FDM manner, or a time division multiplexing TDM manner, or a code division multiplexing CDM manner in which code division is performed by using an orthogonal code.

According to a third aspect, a base station is provided, where the base station includes a determining unit and a sending unit, where the determining unit is configured to determine a subframe configuration of a Multimedia Broadcast multicast service Single Frequency Network MBSFN subframe that is used to bear a physical multicast channel PMCH, where the subframe configuration includes a cyclic prefix CP type and/or a reference signal pattern; and the sending unit is configured to send the MBSFN configuration information determined by the determining unit to user equipment UE, where the MBSFN configuration information is used to indicate the subframe configuration of the MBSFN subframe; where the CP type includes a normal CP, an extended CP, or another CP, and a length of the another CP is different from a length of the normal CP or a length of the extended CP.

In a first possible implementation manner of the third aspect, with reference to the third aspect, the subframe configuration of the MBSFN subframe includes at least one configuration of a configuration A or B:

the configuration A: the CP type is a normal CP or another CP; or the configuration B: in each physical resource block PRB pair, the reference signal pattern includes n reference signal resource elements REs, where n is a positive integer less than 18.

In a second possible implementation manner of the third aspect, with reference to the first possible implementation manner of the third aspect, the configuration B further includes:

n=6, and the n reference signal REs are spaced five, three, or one subcarrier apart in a frequency domain; or n=8, and the n reference signal REs are spaced two subcarriers apart in a frequency domain; or n=9, and the n reference signal REs are spaced three subcarriers apart in a frequency domain; or n=4, and the n reference signal REs are spaced five or two subcarriers apart in a frequency domain; or n=12, and the n reference signal REs are spaced one subcarrier apart in a frequency domain.

In a third possible implementation manner of the third aspect, with reference to the second possible implementation manner of the third aspect, the configuration B further includes:

if the reference signal RE is denoted as (k,l), k indicates a frequency domain index, and l indicates a time domain index:

when n=6, and the n reference signal REs are spaced five subcarriers apart in the frequency domain:

$$k = \begin{cases} 6m + k_0 & \text{if } l \neq l_1 \text{ and } \Delta f = 15 \text{ kHz} \\ 6m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1, l_2 & \text{if } n_s \bmod 2 = 1 \text{ and } \Delta f = 15 \text{ kHz} \end{cases},$$

$0 \leq k_0 \leq 5$, $-5 \leq a_0 \leq 5$, and $0 \leq k_0 + a_0 \leq 5$, and $m = 0, 1, \ldots, 2N_{RB}^{PMCH,DL} - 1$; or when n=6, and the n reference signal REs are spaced three subcarriers apart in the frequency domain:

$$k = \begin{cases} 4m + k_0 & \text{if } l \neq l_1 \text{ and } \Delta f = 15 \text{ kHz} \\ 4m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1 & \text{if } n_s \bmod 2 = 1 \text{ and } \Delta f = 15 \text{ kHz} \end{cases},$$

$0 \leq k_0 \leq 3$, $-3 \leq a_0 \leq 3$, and $0 \leq k_0 + a_0 \leq 3$, and $m = 0, 1, \ldots, 3N_{RB}^{PMCH,DL} - 1$; or when n=6, and the n reference signal REs are spaced one subcarrier apart in the frequency domain:

$k = 2m + k_0$, $l = l_0$ if $n_s \bmod 2 = 0$ and $\Delta f = 15$ kHz, $0 \leq k_0 \leq 1$, and $m = 0, 1, \ldots, 6N_{RB}^{PMCH,DL} - 1$; or when n=8, and the n reference signal REs are spaced two subcarriers apart in the frequency domain:

$$k = \begin{cases} 3m + k_0 & \text{if } l \neq l_1 \text{ and } \Delta f = 15 \text{ kHz} \\ 3m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1 & \text{if } n_s \bmod 2 = 1 \text{ and } \Delta f = 15 \text{ kHz} \end{cases},$$

$0 \leq k_0 \leq 2$, $-2 \leq a_0 \leq 2$, and $0 \leq k_0 + a_0 \leq 2$, and $m = 0, 1, \ldots, 1N_{RB}^{PMCH,DL} - 1$; or when n=9, and the n reference signal REs are spaced three subcarriers apart in the frequency domain:

$$k = \begin{cases} 4m + k_0 & \text{if } l \neq l_1 \text{ and } \Delta f = 15 \text{ kHz} \\ 4m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1, l_2 & \text{if } n_s \bmod 2 = 1 \text{ and } \Delta f = 15 \text{ kHz} \end{cases},$$

$0 \leq k_0 \leq 3$, $-3 \leq a_0 \leq 3$, and $0 \leq k_0 + a_0 \leq 3$, and $m = 0, 1, \ldots, 3N_{RB}^{PMCH,DL} - 1$; or when n=4, and the n reference signal REs are spaced five subcarriers apart in the frequency domain:

$$k = \begin{cases} 6m + k_0 & \text{if } l \neq l_1 \text{ and } \Delta f = 15 \text{ kHz} \\ 6m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1 & \text{if } n_s \bmod 2 = 1 \text{ and } \Delta f = 15 \text{ kHz} \end{cases},$$

$0 \leq k_0 \leq 5$, $-5 \leq a_0 \leq 5$, $0 \leq k_0 + a_0 \leq 5$, and $m = 0, 1, \ldots, 2N_{RB}^{PMCH,DL} - 1$; or when n=4, and the n reference signal REs are spaced two subcarriers apart in the frequency domain:

$k = 3m + k_0$, $l = l_0$ if $n_s \bmod 2 = 0$ and $\Delta f = 15$ kHz, $0 \leq k_0 \leq 2$, and $m = 0, 1, \ldots, 4N_{RB}^{PMCH,DL} - 1$; or when n=12, and the n reference signal REs are spaced one subcarrier apart in the frequency domain:

$$k = \begin{cases} 2m + k_0 & \text{if } l \neq l_1 \text{ and } \Delta f = 15 \text{ kHz} \\ 2m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1 & \text{if } n_s \bmod 2 = 1 \text{ and } \Delta f = 15 \text{ kHz} \end{cases},$$

$0 \leq k_0 \leq 1$, $-1 \leq a_0 \leq 1$, $0 \leq k_0 + a_0 \leq 1$, and $m = 0, 1, \ldots, 6N_{RB}^{PMCH,DL} - 1$; where $\Delta f$ indicates a frequency domain spacing between adjacent subcarriers; $n_s$ indicates a number of a timeslot that is in a radio frame and in which the reference signal RE is located; $n_s$ mod 2 indicates a mod 2 operation performed on $n_s$; m indicates a number of a reference symbol; $k_0$ and $a_0$ indicate offsets of the frequency domain index; $l_0$, $l_1$, and $l_2$ indicate numbers of OFDM symbols in the timeslot $n_s$ in which the reference signal RE is located, where $t \leq l_0 \leq N_{symb}^{DL}-1$, $0 \leq l_1 \leq N_{symb}^{DL}-1$, $0 \leq l_2 \leq N_{symb}^{DL}-1$, and $l_1 < l_2$; $N_{RB}^{PMCH,DL}$ indicates transmission bandwidth of the PMCH borne on the MBSFN subframe; $N_{symb}^{DL}$ indicates a quantity of OFDM symbols in one timeslot; and t indicates a number of an initial OFDM symbol of the PMCH on the MBSFN subframe.

In a fourth possible implementation manner of the third aspect, with reference to the third aspect to the third possible implementation manner of the third aspect, the sending unit is further configured to send configuration information of a physical downlink shared channel PDSCH to the UE, where the configuration information of the PDSCH is used to indicate transmission bandwidth of the PDSCH on the MBSFN subframe.

In a fifth possible implementation manner of the third aspect, with reference to the third aspect to the fourth possible implementation manner of the third aspect, the sending unit is further configured to send orthogonal frequency division multiplexing OFDM symbol information of the PMCH to the UE, where the OFDM symbol information of the PMCH is used to indicate that the initial OFDM symbol of the PMCH on the MBSFN subframe is the first OFDM symbol of the MBSFN subframe.

In a sixth possible implementation manner of the third aspect, with reference to the third aspect to the fifth possible implementation manner of the third aspect, the sending unit is further configured to send configuration information of an enhanced physical downlink control channel EPDCCH to the UE, where the configuration information of the EPDCCH is used to indicate transmission bandwidth of the EPDCCH on the MBSFN subframe.

In a seventh possible implementation manner of the third aspect, with reference to the third aspect to the sixth possible implementation manner of the third aspect, the sending unit is further configured to send antenna configuration information of the PMCH to the UE, where the antenna configuration information is used to indicate that an antenna transmission manner of the PMCH is a multi-antenna transmission manner in which a quantity of antenna ports is greater than 1.

In an eighth possible implementation manner of the third aspect, with reference to the seventh possible implementation manner of the third aspect, in the multi-antenna transmission manner, the reference signal pattern uses a frequency division multiplexing FDM manner, or a time division multiplexing TDM manner, or a code division multiplexing CDM manner in which code division is performed by using an orthogonal code.

In a ninth possible implementation manner of the third aspect, with reference to the third aspect to the eighth possible implementation manner of the third aspect, the determining unit is specifically configured to:

use a preset subframe configuration of the MBSFN subframe, where the preset subframe configuration of the MBSFN subframe is determined based on a deployment environment of the base station.

In a tenth possible implementation manner of the third aspect, with reference to the third aspect to the eighth possible implementation manner of the third aspect, the determining unit is specifically configured to:

receive second MBSFN configuration information sent by a network device, and determine the subframe configuration of the MBSFN subframe according to the second MBSFN configuration information.

According to a fourth aspect, user equipment UE is provided, where the UE includes a receiving unit and a determining unit, where the receiving unit is configured to receive Multimedia Broadcast multicast service Single Frequency Network MBSFN configuration information, where the MBSFN configuration information is used to indicate a subframe configuration of an MBSFN subframe that bears a physical multicast channel PMCH, and the subframe configuration includes a cyclic prefix CP type and/or a reference signal pattern; and the determining unit is configured to determine the subframe configuration of the MBSFN subframe according to the MBSFN configuration information received by the receiving unit, where the CP type includes a normal CP, an extended CP, or another CP, and a length of the another CP is different from a length of the normal CP or a length of the extended CP.

In a first possible implementation manner of the fourth aspect, with reference to the fourth aspect, the subframe configuration of the MBSFN subframe includes at least one configuration of a configuration A or B:

the configuration A: the CP type is a normal CP or another CP; or the configuration B: in each physical resource block PRB pair, the reference signal pattern includes n reference signal resource elements REs, where n is a positive integer less than 18.

In a second possible implementation manner of the fourth aspect, with reference to the first possible implementation manner of the fourth aspect, the configuration B further includes:

n=6, and the n reference signal REs are spaced five, three, or one subcarrier apart in a frequency domain; or n=8, and the n reference signal REs are spaced two subcarriers apart in a frequency domain; or n=9, and the n reference signal REs are spaced three subcarriers apart in a frequency domain; or n=4, and the n reference signal REs are spaced five or two subcarriers apart in a frequency domain; or n=12, and the n reference signal REs are spaced one subcarrier apart in a frequency domain.

In a third possible implementation manner of the fourth aspect, with reference to the second possible implementation manner of the fourth aspect, the configuration B further includes:

a location of the reference signal RE in the reference signal pattern meets the following conditions:

if the reference signal RE is denoted as (k,l), k indicates a frequency domain index, and l indicates a time domain index:

when n=6, and the n reference signal REs are spaced five subcarriers apart in the frequency domain:

$$k = \begin{cases} 6m + k_0 & \text{if } l \neq l_1 \text{ and } \Delta f = 15 \text{ kHz} \\ 6m + k_0 + a_0 & \text{if } l = l_1 \text{ and } \Delta f = 15 \text{ kHz} \end{cases},$$

-continued $$l = \begin{cases} l_0 & \text{if } n_s\text{mod}2 = 0 \text{ and } \Delta f = 15 \text{ kHz} \\ l_1, l_2 & \text{if } n_s\text{mod}2 = 1 \text{ and } \Delta f = 15 \text{ kHz} \end{cases},$$

$0 \leq k_0 \leq 5$, $-5 \leq a_0 \leq 5$, $0 \leq k_0+a_0 \leq 5$, and m=0, 1, . . . , $2N_{RB}^{PMCH,DL}-1$; or when n=6, and the n reference signal REs are spaced three subcarriers apart in the frequency domain:

$$k = \begin{cases} 4m + k_0 & \text{if } l \neq l_1 \text{ and } \Delta f = 15 \text{ kHz} \\ 4m + k_0 + a_0 & \text{if } l = l_1 \text{ and } \Delta f = 15 \text{ kHz} \end{cases},$$

$$l = \begin{cases} l_0 & \text{if } n_s\text{mod}2 = 0 \text{ and } \Delta f = 15 \text{ kHz} \\ l_1, & \text{if } n_s\text{mod}2 = 1 \text{ and } \Delta f = 15 \text{ kHz} \end{cases},$$

$0 \leq k_0 \leq 3$, $-3 \leq a_0 \leq 3$, and $0 \leq k_0+a_0 \leq 3$, and m=0, 1, . . . , $3N_{RB}^{PMCH,DL}-1$; or when n=6, and the n reference signal REs are spaced one subcarrier apart in the frequency domain:

k=2m+$k_0$, l=$l_0$ if $n_s$ mod 2=0 and $\Delta f$=15 kHz, $0 \leq k_0 \leq 1$, and m=0, 1, . . . , $6N_{RB}^{PMCH,DL}-1$; or when n=8, and the n reference signal REs are spaced two subcarriers apart in the frequency domain:

$$k = \begin{cases} 3m + k_0 & \text{if } l \neq l_1 \text{ and } \Delta f = 15 \text{ kHz} \\ 3m + k_0 + a_0 & \text{if } l = l_1 \text{ and } \Delta f = 15 \text{ kHz} \end{cases},$$

$$l = \begin{cases} l_0 & \text{if } n_s\text{mod}2 = 0 \text{ and } \Delta f = 15 \text{ kHz} \\ l_1, & \text{if } n_s\text{mod}2 = 1 \text{ and } \Delta f = 15 \text{ kHz} \end{cases},$$

$0 \leq k_0 \leq 2$, $-2 \leq a_0 \leq 2$, and $0 \leq k_0+a_0 \leq 2$, and m=0, 1, . . . , $1N_{RB}^{PMCH,DL}-1$; or when n=9, and the n reference signal REs are spaced three subcarriers apart in the frequency domain:

$$k = \begin{cases} 4m + k_0 & \text{if } l \neq l_1 \text{ and } \Delta f = 15 \text{ kHz} \\ 4m + k_0 + a_0 & \text{if } l = l_1 \text{ and } \Delta f = 15 \text{ kHz} \end{cases},$$

$$l = \begin{cases} l_0 & \text{if } n_s\text{mod}2 = 0 \text{ and } \Delta f = 15 \text{ kHz} \\ l_1, l_2 & \text{if } n_s\text{mod}2 = 1 \text{ and } \Delta f = 15 \text{ kHz} \end{cases},$$

$0 \leq k_0 \leq 3$, $-3 \leq a_0 \leq 3$, and $0 \leq k_0+a_0 \leq 3$, and m=0, 1, . . . , $3N_{RB}^{PMCH,DL}-1$; or when n=4, and the n reference signal REs are spaced five subcarriers apart in the frequency domain:

$$k = \begin{cases} 6m + k_0 & \text{if } l \neq l_1 \text{ and } \Delta f = 15 \text{ kHz} \\ 6m + k_0 + a_0 & \text{if } l = l_1 \text{ and } \Delta f = 15 \text{ kHz} \end{cases},$$

$$l = \begin{cases} l_0 & \text{if } n_s\text{mod}2 = 0 \text{ and } \Delta f = 15 \text{ kHz} \\ l_1, & \text{if } n_s\text{mod}2 = 1 \text{ and } \Delta f = 15 \text{ kHz} \end{cases},$$

$0 \leq k_0 \leq 5$, $-5 \leq a_0 \leq 5$, $0 \leq k_0+a_0 \leq 5$, and m=0, 1, . . . , $2N_{RB}^{PMCH,DL}-1$; or when n=4, and the n reference signal REs are spaced two subcarriers apart in the frequency domain:

k=3m+$k_0$, l=$l_0$ if $n_s$ mod 2=0 and $\Delta f$=15 kHz, $0 \leq k_0 \leq 2$, and m=0, 1, . . . , $4N_{RB}^{PMCH,DL}-1$; or when n=, and the n reference signal REs are spaced one subcarrier apart in the frequency domain:

$$k = \begin{cases} 2m + k_0 & \text{if } l \neq l_1 \text{ and } \Delta f = 15 \text{ kHz} \\ 2m + k_0 + a_0 & \text{if } l = l_1 \text{ and } \Delta f = 15 \text{ kHz} \end{cases},$$

$$l = \begin{cases} l_0 & \text{if } n_s\text{mod}2 = 0 \text{ and } \Delta f = 15 \text{ kHz} \\ l_1, & \text{if } n_s\text{mod}2 = 1 \text{ and } \Delta f = 15 \text{ kHz} \end{cases},$$

$0 \leq k_0 \leq 1$, $-1 \leq a_0 \leq 1$, $0 \leq k_0+a_0 \leq 1$, and m=0, 1, . . . , $6N_{RB}^{PMCH,DL}-1$; where $\Delta f$ indicates a frequency domain spacing between adjacent subcarriers; $n_s$ indicates a number of a timeslot that is in a radio frame and in which the reference signal RE is located; $n_s$ mod 2 indicates a mod 2 operation performed on $n_s$; m indicates a number of a reference symbol; $k_0$ and $a_0$ indicate offsets of the frequency domain index; $l_0$, $l_1$, and $l_2$ indicate numbers of OFDM symbols in the timeslot $n_s$ in which the reference signal RE is located, where $t \leq l_0 \leq N_{symb}^{DL}-1$, $0 \leq l_1 \leq N_{symb}^{DL}-1$, $0 \leq l_2 \leq N_{symb}^{DL}-1$, and $l_1 < l_2$; $N_{RB}^{PMCH,DL}$ indicates transmission bandwidth of the PMCH borne on the MBSFN subframe; $N_{symb}^{DL}$ indicates a quantity of OFDM symbols in one timeslot; and t indicates a number of an initial OFDM symbol of the PMCH on the MBSFN subframe.

In a fourth possible implementation manner of the fourth aspect, with reference to the fourth aspect to the third possible implementation manner of the fourth aspect, the receiving unit is further configured to receive configuration information of a physical downlink shared channel PDSCH, where the configuration information of the PDSCH is used to indicate transmission bandwidth of the PDSCH on the MBSFN subframe; and the determining unit is further configured to determine the transmission bandwidth of the PDSCH on the MBSFN subframe according to the configuration information of the PDSCH that is received by the receiving unit.

In a fifth possible implementation manner of the fourth aspect, with reference to the fourth aspect to the fourth possible implementation manner of the fourth aspect, the receiving unit is further configured to receive orthogonal frequency division multiplexing OFDM symbol information of the PMCH, where the OFDM symbol information is used to indicate that the initial OFDM symbol of the PMCH on the MBSFN subframe is the first OFDM symbol of the MBSFN subframe; and the determining unit is further configured to determine the initial OFDM symbol of the PMCH on the MBSFN subframe according to the OFDM symbol information of the PMCH that is received by the receiving unit.

In a sixth possible implementation manner of the fourth aspect, with reference to the fourth aspect to the fifth possible implementation manner of the fourth aspect, the receiving unit is further configured to receive configuration information of an enhanced physical downlink control channel EPDCCH, where the configuration information of the EPDCCH is used to indicate transmission bandwidth of the EPDCCH on the MBSFN subframe; and the determining unit is further configured to determine the transmission bandwidth of the EPDCCH on the MBSFN subframe according to the configuration information of the EPDCCH that is received by the receiving unit.

In a seventh possible implementation manner of the fourth aspect, with reference to the fourth aspect to the sixth possible implementation manner of the fourth aspect, the receiving unit is further configured to receive antenna configuration information of the PMCH, where the antenna configuration information is used to indicate that an antenna transmission manner of the PMCH is a multi-antenna transmission manner in which a quantity of antenna ports is greater than 1; and the determining unit is further configured to determine the antenna transmission manner of the PMCH according to the antenna configuration information of the PMCH that is received by the receiving unit.

In an eighth possible implementation manner of the fourth aspect, with reference to the seventh possible implementation manner of the fourth aspect, in the multi-antenna transmission manner, the reference signal pattern uses a frequency division multiplexing FDM manner, or a time division multiplexing TDM manner, or a code division multiplexing CDM manner in which code division is performed by using an orthogonal code.

Based on the MBSFN configuration method and the device provided in the embodiments of the present invention, a base station may determine a subframe configuration of an MBSFN subframe that is used to bear a PMCH, where the subframe configuration includes a CP type and/or a reference signal pattern, and then the base station sends MBSFN configuration information to UE, where the MBSFN configuration information is used to indicate the subframe configuration of the MBSFN subframe. Therefore, flexible configuration of the MBSFN subframe may be implemented. In addition, because the CP type in the MBSFN subframe configuration may include a normal CP, an extended CP, or another CP, and a length of the another CP is different from a length of the normal CP or a length of the extended CP, a proper subframe configuration may be selected as required, further, overheads may be reduced, and radio resource utilization of a system is improved.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 1(*b*) is a schematic structural diagram of one PRB pair exists when a CP type is a normal CP according to an embodiment of the present invention;

FIG. 39 is a reference signal pattern 36 of an MBSFN subframe according to an embodiment of the present invention;

FIG. 40 is a schematic flowchart of an MBSFN configuration method according to an embodiment of the present invention;

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

To facilitate clear description of the technical solutions in the embodiments of the present invention, words such as "first" and "second" are used in the embodiments of the present invention to distinguish between same items or similar items that provide basically same functions or purposes. A person skilled in the art may understand that the words such as "first" and "second" do not limit a quantity and an execution order.

Embodiment 1

Figure 1A:
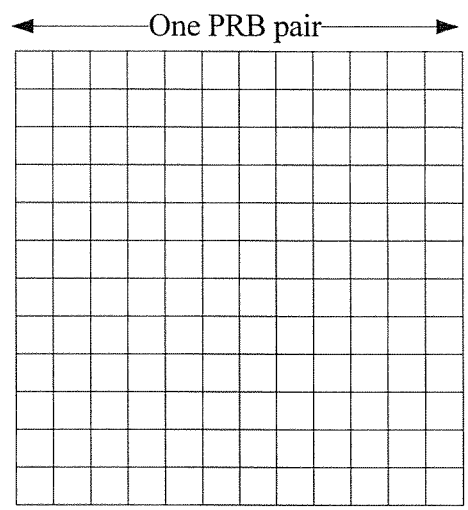
FIG. 1(*a*) is a schematic structural diagram of one PRB pair exists when a CP type is an extended CP according to an embodiment of the present invention.
Figure 1B:
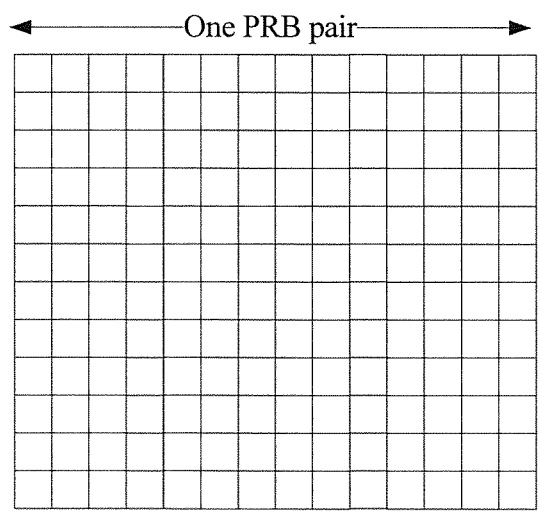
Figure 2:
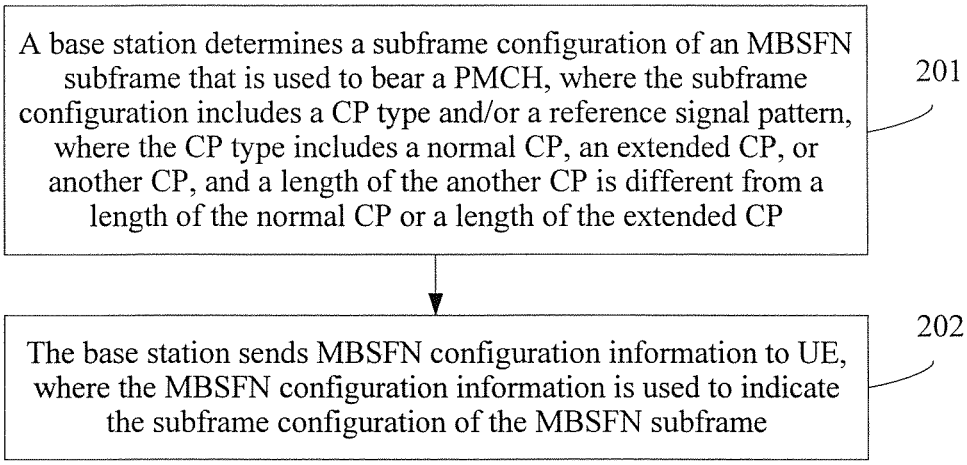
FIG. 2 is a schematic flowchart of an MBSFN configuration method according to an embodiment of the present invention.

This embodiment of the present invention provides an MBSFN configuration method. Specifically, as shown in FIG. 2, the method includes the following steps:

201. A base station determines a subframe configuration of an MBSFN subframe that is used to bear a PMCH, where the subframe configuration includes a CP type and/or a reference signal pattern.

The CP type includes a normal CP, an extended CP, or another CP, and a length of the another CP is different from a length of the normal CP or a length of the extended CP.

Specifically, in the MBSFN configuration method provided in this embodiment of the present invention, that the base station first determines the subframe configuration of the MBSFN subframe that is used to bear the PMCH may be specifically implemented in the following two manners:

In a first possible implementation manner, the base station uses a preset subframe configuration of the MBSFN subframe, where the preset subframe configuration of the MBSFN subframe is determined based on a deployment environment of the base station.

It should be noted that the deployment environment of the base station may include a deployment place of the base station, a channel characterization parameter obtained by means of measurement, and the like, which is not specifically limited in this embodiment of the present invention. It merely means that when the base station is in a determined deployment environment, the base station may use a preset subframe configuration of the MBSFN subframe, where the subframe configuration is determined based on the deployment environment of the base station.

Exemplarily, when deployed in a hotspot (Hotspot) scenario, the base station may use a preset hotspot-scenario-specific subframe configuration of the MBSFN subframe. A hotspot refers to a place at which a network access service of a wireless local area network is provided in a public place, for example, an airport or a large exhibition hall, which is not specifically limited in this embodiment of the present invention. The hotspot-scenario-specific subframe configuration is elaborated in the following part and is not described herein.

In a second possible implementation manner, the base station receives second MBSFN configuration information sent by a network device, and determines the subframe configuration of the MBSFN subframe according to the second MBSFN configuration information.

It should be noted that the network device may include a multi-cell/multicast coordination entity (Multicell/Multicast Coordination Entity, MCE), a gateway device, and the like, which is not specifically limited in this embodiment of the present invention.

Specifically, the MCE may send a multimedia broadcast multicast service (Multimedia Broadcast multicast service, MBMS) configuration request to the base station by using an M2 interface, where the MBMS configuration request includes the second MBSFN configuration information. After receiving the MBMS configuration request, the base station parses out the second MBSFN configuration information from the MBMS configuration request, and may further determine the subframe configuration of the MBSFN subframe according to the second configuration information. Certainly, after completing subframe configuration of the MBSFN subframe according to the subframe configuration information of the MBSFN subframe, the base station may further send an MBMS configuration request response to the MCE, which is not specifically limited in this embodiment of the present invention.

It should be noted that in this embodiment of the present invention, the second subframe configuration includes a CP type and/or a reference signal pattern, and certainly, the second subframe configuration may further include PMCH physical layer configuration information, which is not specifically limited in this embodiment of the present invention.

Optionally, when the base station determines the subframe configuration of the MBSFN subframe that is used to bear the PMCH, the first possible implementation manner and the second possible implementation manner may be combined, that is, the base station may use the preset subframe configuration of the MBSFN subframe, and after receiving the second MBSFN configuration information sent by the network device, update the preset subframe configuration of the MBSFN subframe, which is not specifically limited in this embodiment of the present invention.

The second MBSFN configuration information in the network device may be determined by the network device according to a channel quality parameter that is detected by UE in real time or periodically. The channel quality parameter may include reference signal received power (Reference Signal Received Power, RSRP), reference signal received quality (Reference Signal Received Quality, RSRQ), a channel quality indicator (Channel Quality Indicator, CQI), a channel delay feature, a service quality requirement, and the like, which is not specifically limited in this embodiment of the present invention.

Specifically, in this embodiment of the present invention, the CP type in the subframe configuration of the MBSFN subframe may be an extended CP specified in a standard protocol, or may be a normal CP or another CP, which is not specifically limited in this embodiment of the present invention. A length of the another CP is different from a length of the normal CP or a length of the extended CP.

202. The base station sends MBSFN configuration information to UE, where the MBSFN configuration information is used to indicate the subframe configuration of the MBSFN subframe.

Specifically, in this embodiment of the present invention, after determining the subframe configuration of the MBSFN subframe that is used to bear the PMCH, the base station sends the MBSFN configuration information to the UE to complete configuration of the MBSFN subframe.

The MBSFN configuration information may be carried in radio resource control (Radio Resource Control, RRC) signaling, and the RRC signaling is borne in a system information block type 13 (System Information Block Type 13, SIB 13).

Exemplarily, a signaling bearer manner of the CP type may be as follows:

When performing signaling configuration, the base station may choose to send, to the UE, RRC signaling that carries the CP type, where the RRC signaling is borne in the SIB 13.

Exemplarily, signaling bearer manners of the reference signal pattern may be as follows:

(1) If a same reference signal pattern is used in each MBSFN area, signaling bearing may be implemented in the following two manners:

a. A piece of reference signal pattern signaling is added to the SIB 13, and is juxtaposed with an MBSFN-area information list (MBSFN-Area Information List, mbsfn-AreaInfoList); or b. A piece of reference signal pattern signaling is added to each mbsfn-AreaInfoList in the SIB 13.

It should be noted that one base station may be located in multiple MBSFN areas, and acquire configuration parameters of the multiple MBSFN areas. The configuration parameters of the multiple MBSFN areas are borne in a SIB 13 in RRC signaling, where the SIB 13 includes multiple mbsfn-AreaInfoLists, and may further include multiple pieces of signaling. Obviously, a reference signal signaling overhead in the foregoing manner a is less than that in the manner b.

(2) If different reference signal patterns are used in MBSFN areas, signaling bearing may be implemented in the following manner:

One piece of reference signal pattern signaling is added to an mbsfn-AreaInfoList in the SIB 13, and is corresponding to an MBSFN area ID.

In the MBSFN configuration method provided in this embodiment of the present invention, a base station may determine a subframe configuration of an MBSFN subframe that is used to bear a PMCH, where the subframe configuration includes a CP type and/or a reference signal pattern, and then the base station sends MBSFN configuration information to UE, where the MBSFN configuration information is used to indicate the subframe configuration of the MBSFN subframe. Therefore, flexible configuration of the MBSFN subframe may be implemented. In addition, because the CP type in the MBSFN subframe configuration may include a normal CP, an extended CP, or another CP, and a length of the another CP is different from a length of the normal CP or a length of the extended CP, a proper subframe configuration may be selected as required, further, overheads may be reduced, and radio resource utilization of a system is improved.

Further, the subframe configuration of the MBSFN subframe may include at least one configuration of a configuration A or B:

the configuration A: the CP type is a normal CP or another CP; or the configuration B: in each physical resource block PRE pair, the reference signal pattern includes n reference signal resource elements REs, where n is a positive integer less than 18.

Figure 3:
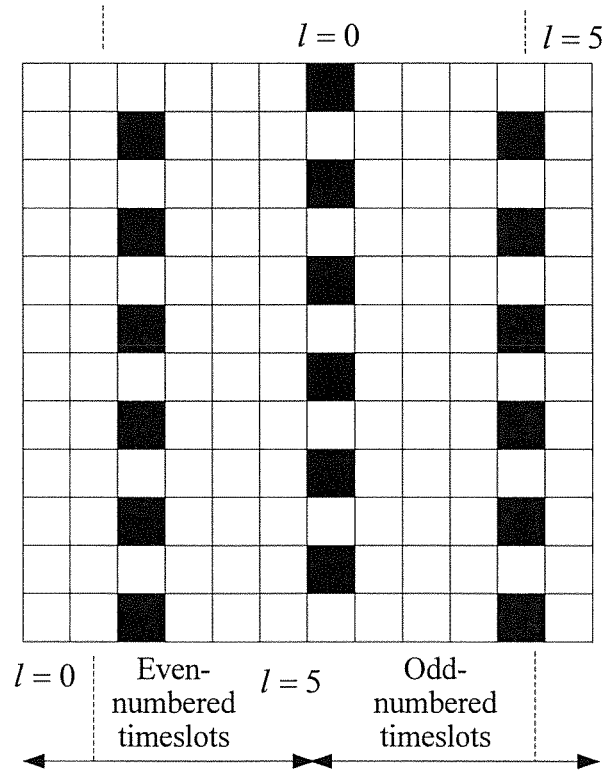
FIG. 3 is a reference signal pattern of an MBSFN subframe in the prior art according to an embodiment of the present invention.

Exemplarily, in the prior art, an MBSFN reference signal pattern is shown in FIG. 3, where reference signal REs are spaced one subcarrier apart in a frequency domain, and are spaced three OFDM symbols apart in a time domain, and a total of 18 reference signal REs are included. However, when the base station is deployed in a hotspot scenario, because compared with another scenario, the hotspot scenario features a small multipath transmission channel delay, coherent bandwidth of the PMCH in the hotspot scenario is relatively large, and further that reference signal REs are spaced multiple subcarriers apart has little impact on channel estimation. In addition, because compared with the another scenario, the hotspot scenario features a low moving speed, coherent time of the PMCH in the hotspot scenario is relatively long, and further that the reference signal REs are spaced multiple OFDM symbols apart has little impact on the channel estimation. In conclusion, if the reference signal pattern shown in FIG. 3 is still used, an unnecessary resource waste is caused, which reduces resource utilization. Therefore, in the hotspot-scenario-specific subframe configuration of the MBSFN subframe, a CP may be designed as a normal CP or another CP whose CP length is less than a length of the normal CP, and/or in each PRB pair, the reference signal pattern includes n REs, where n is a positive integer less than 18, which reduces overheads and improves radio resource utilization of a system.

It should be noted that in the reference signal pattern shown in FIG. 3, a black filling block is a location of a reference signal RE, both an upper dotted line and a lower dotted line represent omitting of reference signal patterns corresponding to other PRB pair resources on a PMCH bandwidth resource, and in a subsequent reference signal pattern, representation meaning of a black filling block, an upper dotted line, and a lower dotted line is the same as that in FIG. 3, which is all illustrated herein and is not further described one by one in the following.

It should be noted that when the subframe configuration meets the at least one configuration of the A or B, if the subframe configuration meets the configuration A, a quantity of reference signal REs on one PRB pair may be 18, or may be n in the configuration B, which is not specifically limited in this embodiment of the present invention.

Further, the configuration B may further include:
n=6, and the n reference signal REs are spaced five, three, or one subcarrier apart in a frequency domain; or
n=8, and the n reference signal REs are spaced two subcarriers apart in a frequency domain; or
n=9, and the n reference signal REs are spaced three subcarriers apart in a frequency domain; or
n=4, and the n reference signal REs are spaced five or two subcarriers apart in a frequency domain; or
n=12, and the n reference signal REs are spaced one subcarrier apart in a frequency domain.

Particularly, with reference to the foregoing configuration B, the following provides several possible reference signal patterns provided in this embodiment of the present invention. For brevity of description, uniform definitions of related symbols are first provided as follows: $\Delta f$ indicates a frequency domain spacing between adjacent subcarriers; $n_s$ indicates a number of a timeslot that is in a radio frame and in which the RE is located; $n_s \bmod 2$ indicates a mod 2 operation performed on $n_s$; m indicates a number of a reference symbol; $k_0$ and $a_0$ indicate offsets of the frequency domain index; $l_0$, $l_1$, and $l_2$ indicate numbers of OFDM symbols in the timeslot $n_s$ in which the RE is located, where $t \le l_0 \le N_{symb}^{DL}-1$, $0 \le l_1 \le N_{symb}^{DL}-1$, $0 \le l_2 \le N_{symb}^{DL}-1$, and $l_1 < l_2$; $N_{RB}^{PMCH,DL}$ indicates transmission bandwidth of the PMCH borne on the MBSFN subframe; $N_{symb}^{DL}$ indicates a quantity of OFDM symbols in one timeslot; and t indicates a number of an initial OFDM symbol of the PMCH on the MBSFN subframe.

If the reference signal RE is denoted as (k,l), k indicates a frequency domain index, and l indicates a time domain index:
when n=6, and the n reference signal REs are spaced five subcarriers apart in the frequency domain:

$$k = \begin{cases} 6m + k_0 & \text{if } l \ne l_1 \text{ and } \Delta f = 15 \text{ kHz} \\ 6m + k_0 + a_0 & \text{if } l = l_1 \text{ and } \Delta f = 15 \text{ kHz} \end{cases}, \text{ and}$$

$$l = \begin{cases} l_0 & \text{if } n_s \bmod 2 = 0 \text{ and } \Delta f = 15 \text{ kHz} \\ l_1, l_2 & \text{if } n_s \bmod 2 = 1 \text{ and } \Delta f = 15 \text{ kHz} \end{cases},$$

where
$0 \le k_0 \le 5$, $-5 \le a_0 \le 5$, $0 \le k_0 + a_0 \le 5$, and m=0, 1, . . . , $2N_{RB}^{PMCH,DL}-1$.

Figure 4:
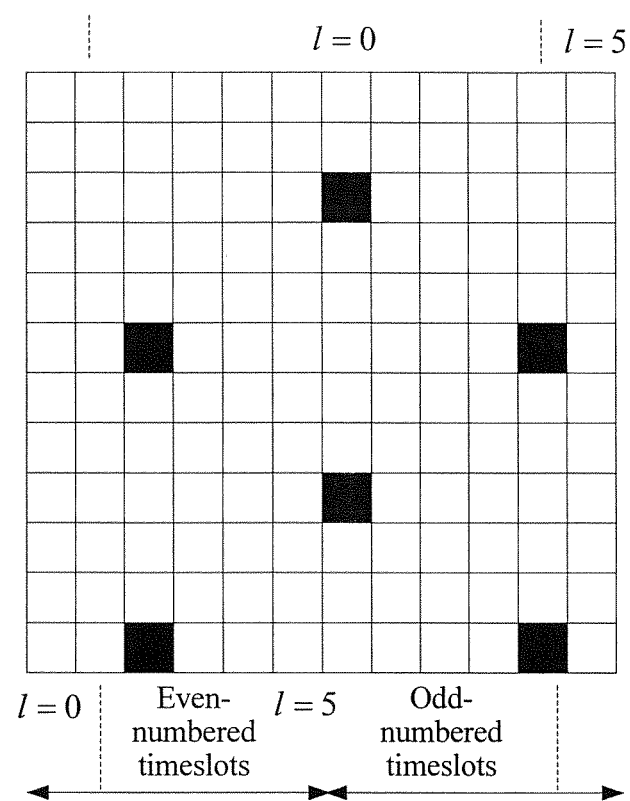
FIG. 4 is a reference signal pattern 1 of an MBSFN subframe according to an embodiment of the present invention.
Figure 5:
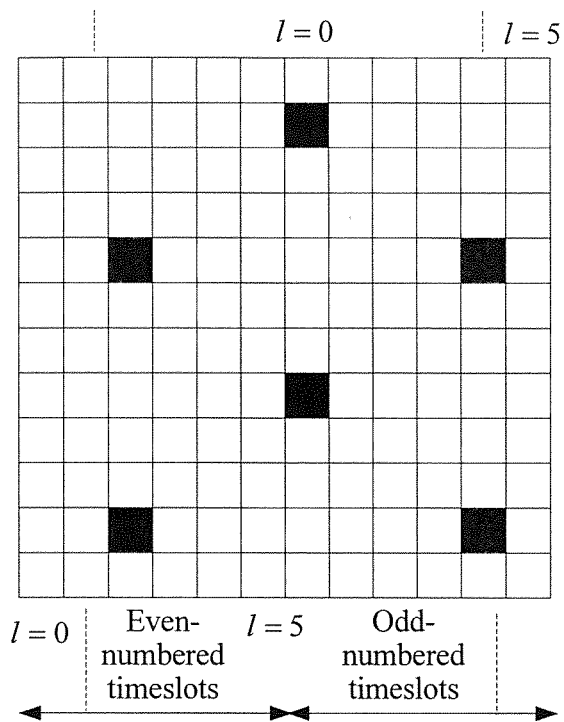
FIG. 5 is a reference signal pattern 2 of an MBSFN subframe according to an embodiment of the present invention.
Figure 6:
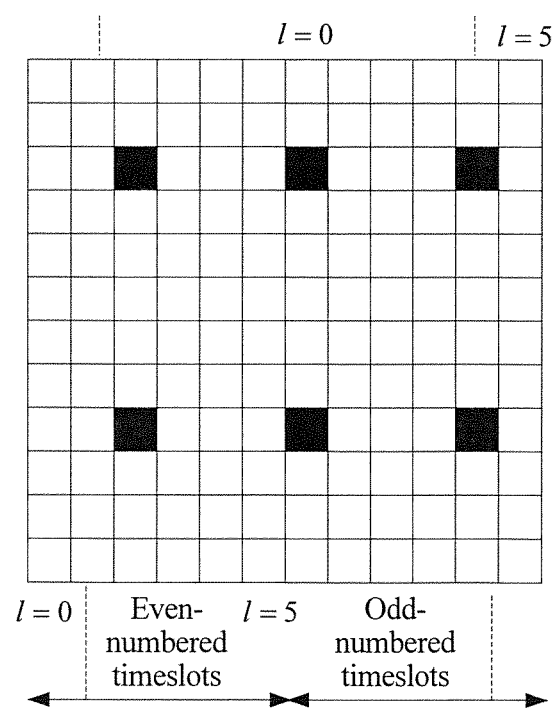
FIG. 6 is a reference signal pattern 3 of an MBSFN subframe according to an embodiment of the present invention.
Figure 7:
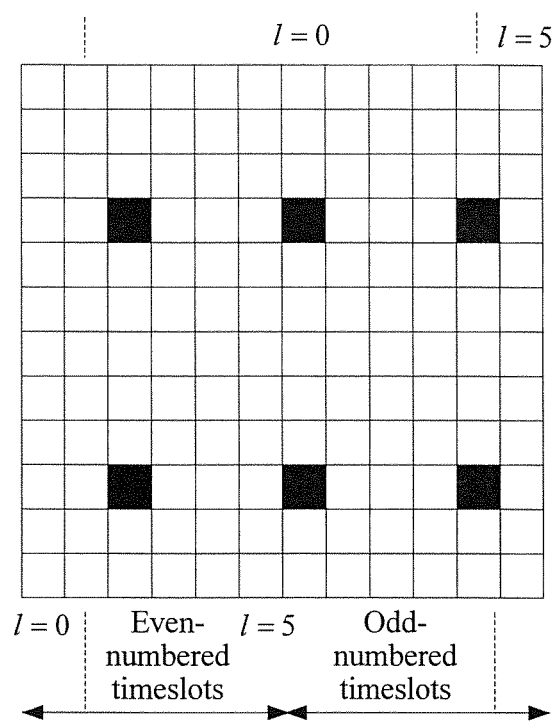
FIG. 7 is a reference signal pattern 4 of an MBSFN subframe according to an embodiment of the present invention.

If the CP type is an extended CP, and $N_{symb}^{DL}=6$:
exemplarily, when $k_0=0$, $a_0=3$, and $$l = \begin{cases} 2 & \text{if } n_s \bmod 2 = 0 \text{ and } \Delta f = 15 \text{ kHz} \\ 0, 4 & \text{if } n_s \bmod 2 = 1 \text{ and } \Delta f = 15 \text{ kHz} \end{cases},$$

a possible reference signal pattern of the PMCH on the MBSFN subframe is shown in FIG. 4;
exemplarily, when $k_0=1$, $a_0=3$, and $$l = \begin{cases} 2 & \text{if } n_s \bmod 2 = 0 \text{ and } \Delta f = 15 \text{ kHz} \\ 0, 4 & \text{if } n_s \bmod 2 = 1 \text{ and } \Delta f = 15 \text{ kHz} \end{cases},$$

a possible reference signal pattern of the PMCH on the MBSFN subframe is shown in FIG. 5;
exemplarily, when $k_0=3$, $a_0=0$, and $$l = \begin{cases} 2 & \text{if } n_s \bmod 2 = 0 \text{ and } \Delta f = 15 \text{ kHz} \\ 0, 4 & \text{if } n_s \bmod 2 = 1 \text{ and } \Delta f = 15 \text{ kHz} \end{cases},$$

a possible reference signal pattern of the PMCH on the MBSFN subframe is shown in FIG. 6; or
exemplarily, when $k_0=2$, $a_0=0$, and $$l = \begin{cases} 2 & \text{if } n_s \bmod 2 = 0 \text{ and } \Delta f = 15 \text{ kHz} \\ 0, 4 & \text{if } n_s \bmod 2 = 1 \text{ and } \Delta f = 15 \text{ kHz} \end{cases},$$

a possible reference signal pattern of the PMCH on the MBSFN subframe is shown in FIG. 7.

Certainly, the reference signal RE in the listed reference signal pattern may perform a cyclic shift in the time/frequency domain, or there may be a reference signal pattern corresponding to another combination according to values of $k_0$, $a_0$, and l in the foregoing location relationship expressions, which is not listed one by one any further in this embodiment of the present invention.

Figure 8:
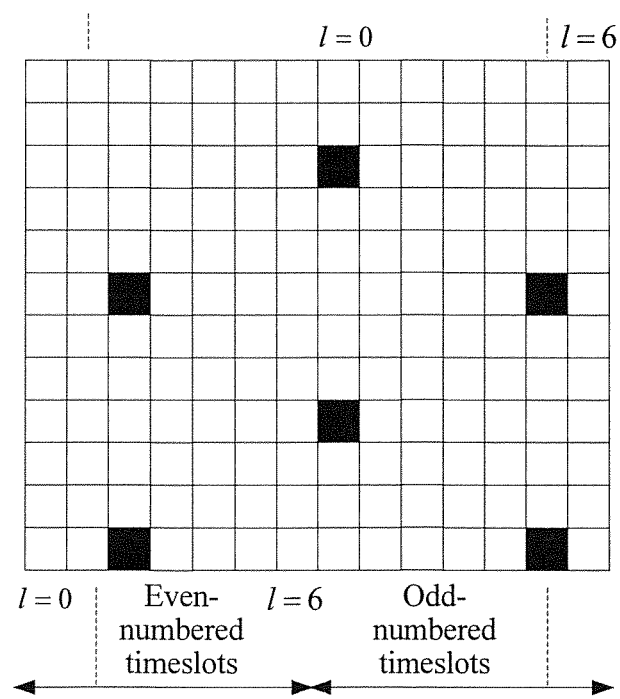
FIG. 8 is a reference signal pattern 5 of an MBSFN subframe according to an embodiment of the present invention.
Figure 9:
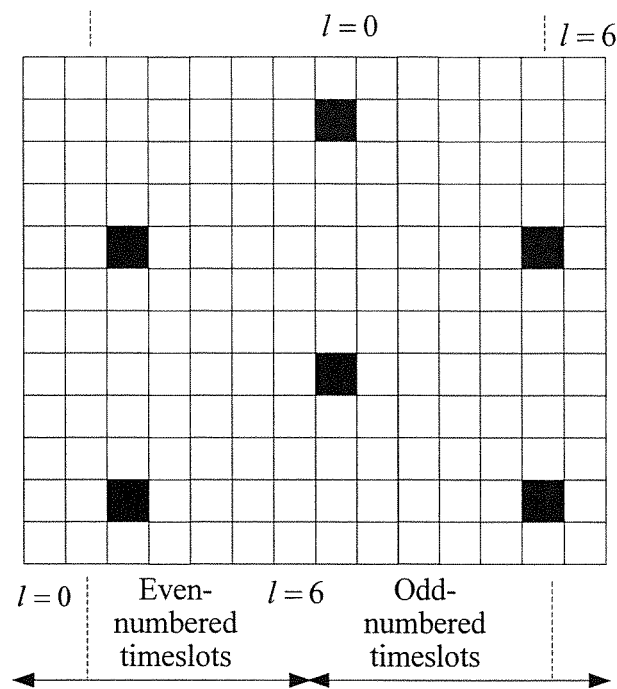
FIG. 9 is a reference signal pattern 6 of an MBSFN subframe according to an embodiment of the present invention.
Figure 10:
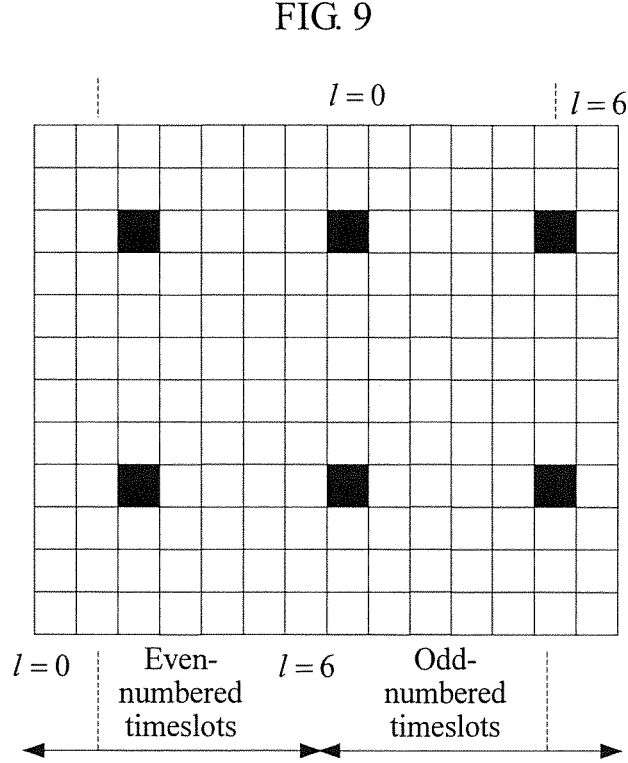
FIG. 10 is a reference signal pattern 7 of an MBSFN subframe according to an embodiment of the present invention.
Figure 11:
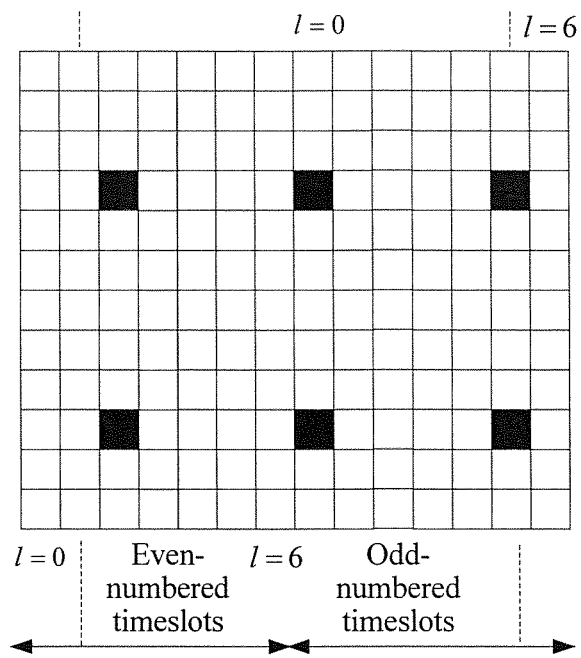
FIG. 11 is a reference signal pattern 8 of an MBSFN subframe according to an embodiment of the present invention.

If the CP type is a normal CP, and $N_{symb}^{DL}=7$:
exemplarily, when $k_0=0$, $a_0=3$, and $$l = \begin{cases} 2 & \text{if } n_s \bmod 2 = 0 \text{ and } \Delta f = 15 \text{ kHz} \\ 0, 5 & \text{if } n_s \bmod 2 = 1 \text{ and } \Delta f = 15 \text{ kHz} \end{cases},$$

a possible reference signal pattern of the PMCH on the MBSFN subframe is shown in FIG. 8;
exemplarily, when $k_0=1$, $a_0=3$ and $$l = \begin{cases} 2 & \text{if } n_s \bmod 2 = 0 \text{ and } \Delta f = 15 \text{ kHz} \\ 0, 5 & \text{if } n_s \bmod 2 = 1 \text{ and } \Delta f = 15 \text{ kHz} \end{cases},$$

a possible reference signal pattern of the PMCH on the MBSFN subframe is shown in FIG. 9;
exemplarily, when $k_0=3$, $a_0=0$, and $$l = \begin{cases} 2 & \text{if } n_s \bmod 2 = 0 \text{ and } \Delta f = 15 \text{ kHz} \\ 0, 5 & \text{if } n_s \bmod 2 = 1 \text{ and } \Delta f = 15 \text{ kHz} \end{cases},$$

a possible reference signal pattern of the PMCH on the MBSFN subframe is shown in FIG. 10; or
exemplarily, when $k_0=2$, $a_0=0$, and $$l = \begin{cases} 2 & \text{if } n_s \bmod 2 = 0 \text{ and } \Delta f = 15 \text{ kHz} \\ 0, 5 & \text{if } n_s \bmod 2 = 1 \text{ and } \Delta f = 15 \text{ kHz} \end{cases},$$

a possible reference signal pattern of the PMCH on the MBSFN subframe is shown in FIG. 11.

Certainly, the reference signal RE in the listed reference signal pattern may perform a cyclic shift in the time/frequency domain, or there may be a reference signal pattern corresponding to another combination according to values of $k_0$, $a_0$, and l in the foregoing location relationship expressions, which is not listed one by one any further in this embodiment of the present invention.

When n=6, and the n reference signal REs are spaced three subcarriers apart in the frequency domain:

$$k = \begin{cases} 4m + k_0 & \text{if } l \neq l_1 \text{ and } \Delta f = 15 \text{ kHz} \\ 4m + k_0 + a_0 & \text{if } l = l_1 \text{ and } \Delta f = 15 \text{ kHz} \end{cases}, \text{ and}$$

$$l = \begin{cases} l_0 & \text{if } n_s \bmod 2 = 0 \text{ and } \Delta f = 15 \text{ kHz} \\ l_1 & \text{if } n_s \bmod 2 = 1 \text{ and } \Delta f = 15 \text{ kHz} \end{cases},$$

where $0 \leq k_0 \leq 3$, $-3 \leq a_0 \leq 3$, and $0 \leq k_0 + a_0 \leq 3$, and m=0, 1, . . . , $3N_{RB}^{PMCH,DL} - 1$.

Figure 12:
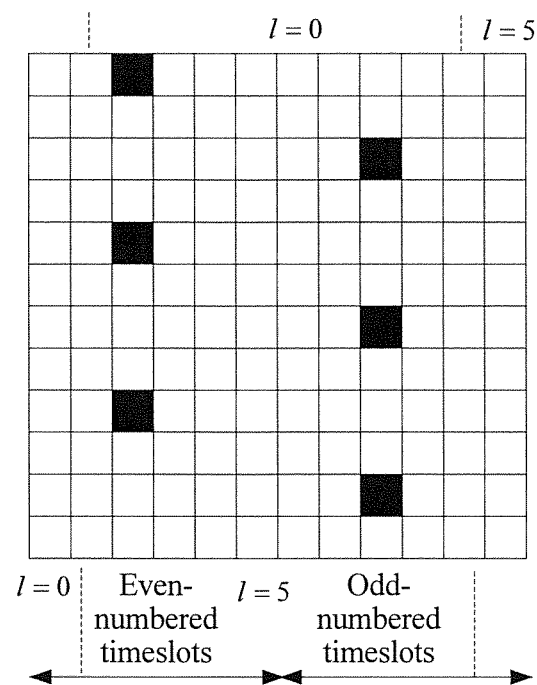
FIG. 12 is a reference signal pattern 9 of an MBSFN subframe according to an embodiment of the present invention.
Figure 13:
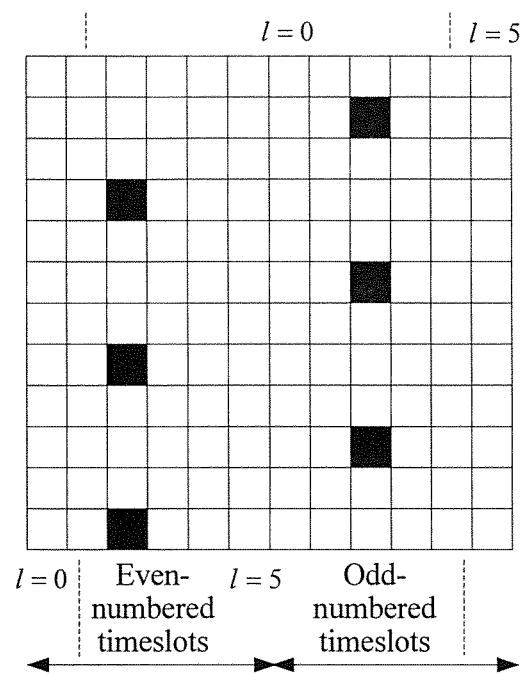
FIG. 13 is a reference signal pattern 10 of an MBSFN subframe according to an embodiment of the present invention.
Figure 14:
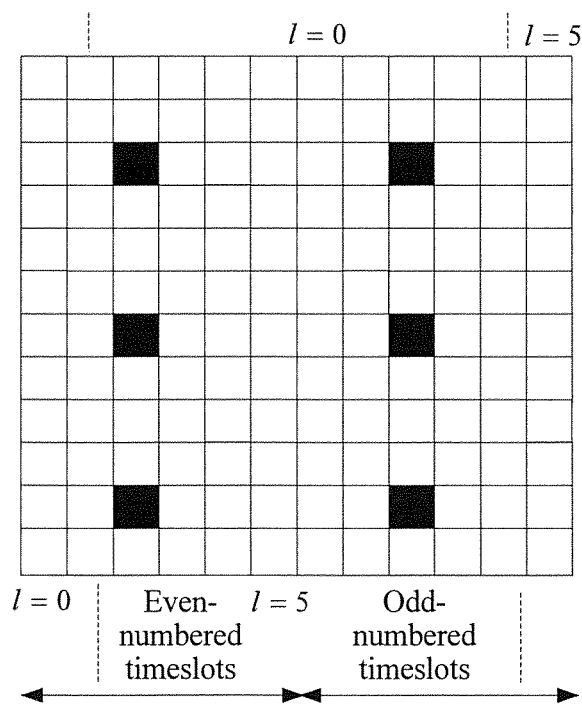
FIG. 14 is a reference signal pattern 11 of an MBSFN subframe according to an embodiment of the present invention.
Figure 15:
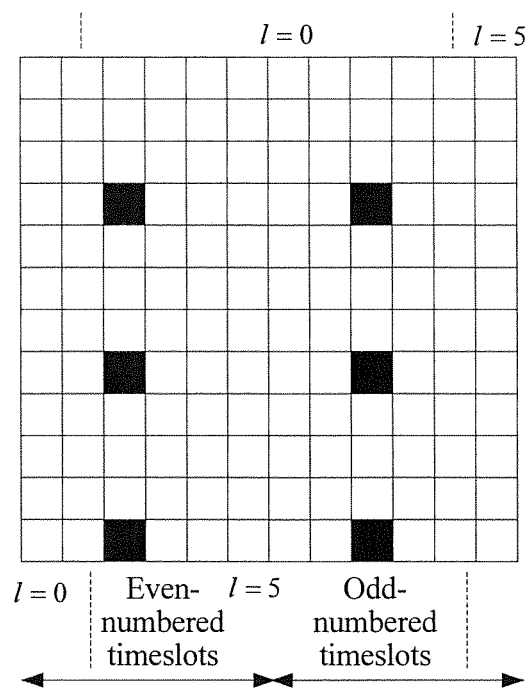
FIG. 15 is a reference signal pattern 12 of an MBSFN subframe according to an embodiment of the present invention.

If the CP type is an extended CP, and $N_{symb}^{DL}=6$:

exemplarily, when $k_0=3$, $a_0=-2$, and $$l = \begin{cases} 2 & \text{if } n_s \bmod 2 = 0 \text{ and } \Delta f = 15 \text{ kHz} \\ 2 & \text{if } n_s \bmod 2 = 1 \text{ and } \Delta f = 15 \text{ kHz} \end{cases},$$

a possible reference signal pattern of the PMCH on the MBSFN subframe is shown in FIG. 12;

exemplarily, when $k_0=0$, $a_0=2$, and $$l = \begin{cases} 2 & \text{if } n_s \bmod 2 = 0 \text{ and } \Delta f = 15 \text{ kHz} \\ 2 & \text{if } n_s \bmod 2 = 1 \text{ and } \Delta f = 15 \text{ kHz} \end{cases},$$

a possible reference signal pattern of the PMCH on the MBSFN subframe is shown in FIG. 13;

exemplarily, when $k_0=1$, $a_0=0$, and $$l = \begin{cases} 2 & \text{if } n_s \bmod 2 = 0 \text{ and } \Delta f = 15 \text{ kHz} \\ 2 & \text{if } n_s \bmod 2 = 1 \text{ and } \Delta f = 15 \text{ kHz} \end{cases},$$

a possible reference signal pattern of the PMCH on the MBSFN subframe is shown in FIG. 14; or exemplarily, when $k_0=0$, $a_0=0$, and $$l = \begin{cases} 2 & \text{if } n_s \bmod 2 = 0 \text{ and } \Delta f = 15 \text{ kHz} \\ 2 & \text{if } n_s \bmod 2 = 1 \text{ and } \Delta f = 15 \text{ kHz} \end{cases},$$

a possible reference signal pattern of the PMCH on the MBSFN subframe is shown in FIG. 15.

Certainly, the reference signal RE in the listed reference signal pattern may perform a cyclic shift in the time/frequency domain, or there may be a reference signal pattern corresponding to another combination according to values of $k_0$, $a_0$, and l in the foregoing location relationship expressions, which is not listed one by one any further in this embodiment of the present invention.

Figure 16:
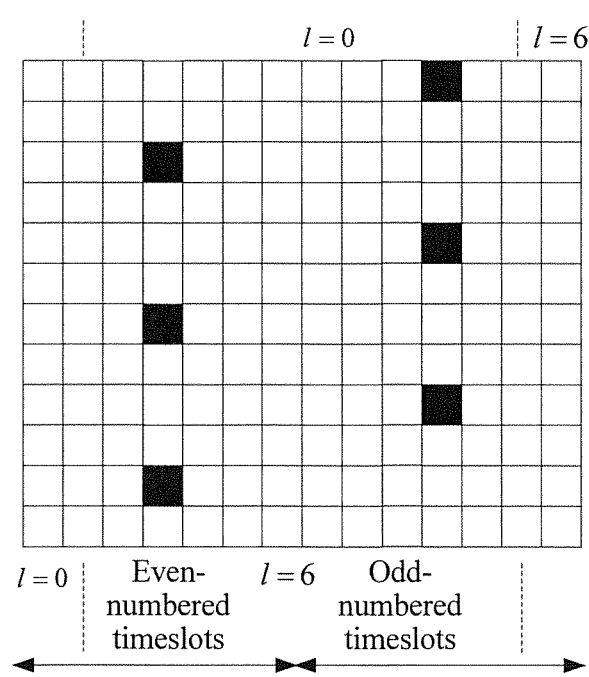
FIG. 16 is a reference signal pattern 13 of an MBSFN subframe according to an embodiment of the present invention.
Figure 17:
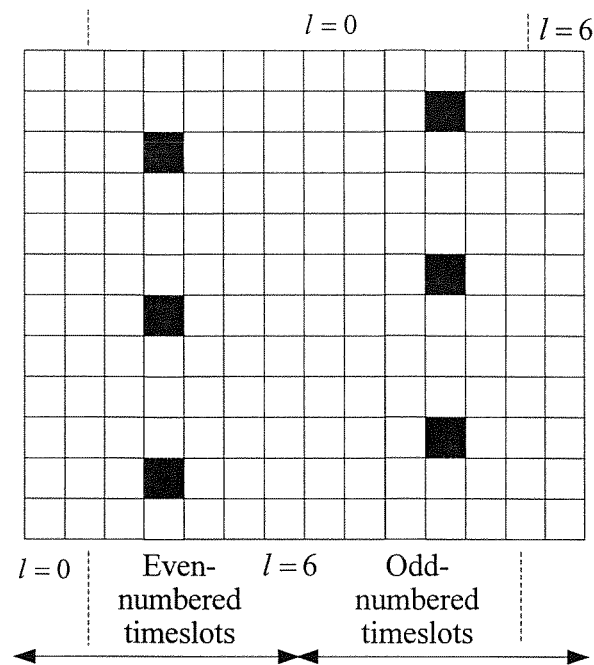
FIG. 17 is a reference signal pattern 14 of an MBSFN subframe according to an embodiment of the present invention.
Figure 18:
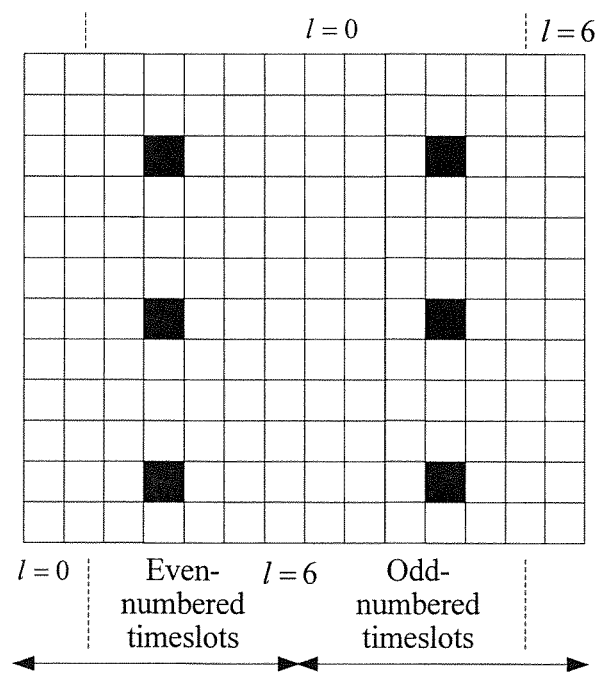
FIG. 18 is a reference signal pattern 15 of an MBSFN subframe according to an embodiment of the present invention.

If the CP type is a normal CP, and $N_{symb}^{DL}=7$:

exemplarily, when $k_0=1$, $a_0=2$, and $$l = \begin{cases} 3 & \text{if } n_s \bmod 2 = 0 \text{ and } \Delta f = 15 \text{ kHz} \\ 3 & \text{if } n_s \bmod 2 = 1 \text{ and } \Delta f = 15 \text{ kHz} \end{cases},$$

a possible reference signal pattern of the PMCH on the MBSFN subframe is shown in FIG. 16;

exemplarily, when $k_0=1$, $a_0=1$, and $$l = \begin{cases} 3 & \text{if } n_s \bmod 2 = 0 \text{ and } \Delta f = 15 \text{ kHz} \\ 3 & \text{if } n_s \bmod 2 = 1 \text{ and } \Delta f = 15 \text{ kHz} \end{cases},$$

a possible reference signal pattern of the PMCH on the MBSFN subframe is shown in FIG. 17; or exemplarily, when $k_0$ $a_0=0$, and $$l = \begin{cases} 3 & \text{if } n_s \bmod 2 = 0 \text{ and } \Delta f = 15 \text{ kHz} \\ 3 & \text{if } n_s \bmod 2 = 1 \text{ and } \Delta f = 15 \text{ kHz} \end{cases},$$

a possible reference signal pattern of the PMCH on the MBSFN subframe is shown in FIG. 18.

Certainly, the reference signal RE in the listed reference signal pattern may perform a cyclic shift in the time/frequency domain, or there may be a reference signal pattern corresponding to another combination according to values of $k_0$, $a_0$, and l in the foregoing location relationship expressions, which is not listed one by one any further in this embodiment of the present invention.

When n=6, and the n reference signal REs are spaced one subcarrier apart in the frequency domain:

$k=2m+k_0$, $l=l_0$, and if $n_s \bmod 2=0$ and $\Delta f=15$ kHz, $0 \leq k_0 \leq 1$, and m=0, 1, . . . , $6N_{RB}^{PMCH,DL} - 1$.

Figure 19:
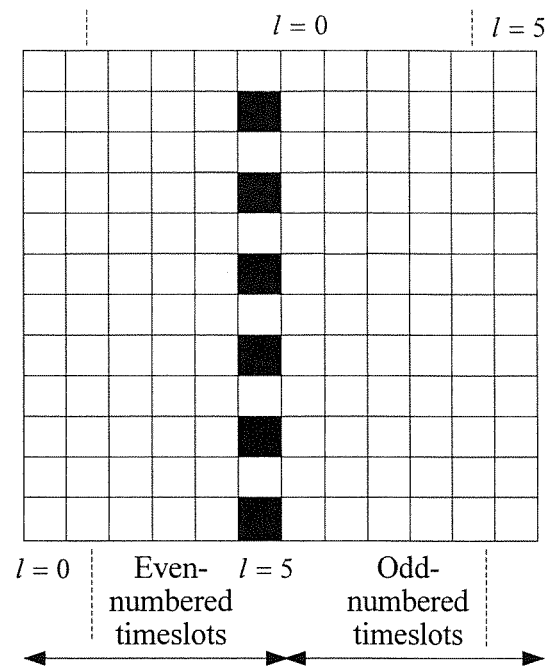
FIG. 19 is a reference signal pattern 16 of an MBSFN subframe according to an embodiment of the present invention.

If the CP type is an extended CP, and $N_{symb}^{DL}=6$:

exemplarily, when $k_0=0$ and $l_0=5$, a possible reference signal pattern of the PMCH on the MBSFN subframe is shown in FIG. 19.

Certainly, the reference signal RE in the listed reference signal pattern may perform a cyclic shift in the time/frequency domain, or there may be a reference signal pattern corresponding to another combination according to values of $k_0$ and $l_0$ in the foregoing location relationship expressions, which is not listed one by one any further in this embodiment of the present invention.

Figure 20:
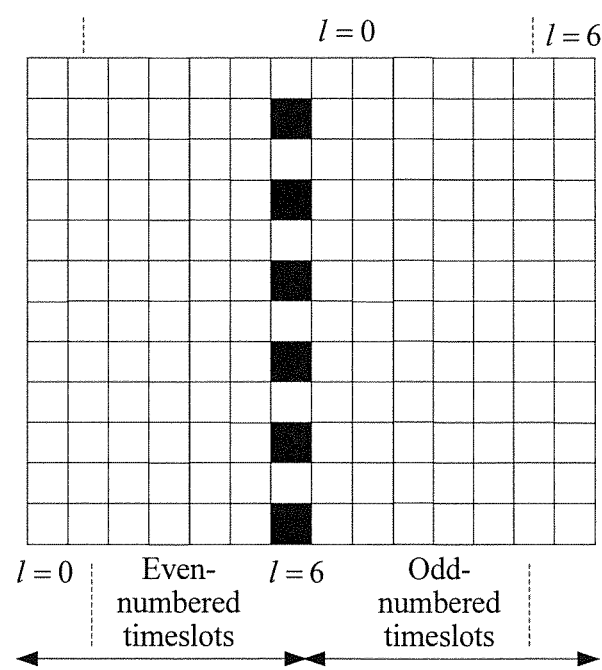
FIG. 20 is a reference signal pattern 17 of an MBSFN subframe according to an embodiment of the present invention.

If the CP type is a normal CP, and $N_{symb}^{DL}=7$:

exemplarily, when $k_0=0$, and $l_0=6$, a possible reference signal pattern of the PMCH on the MBSFN subframe is shown in FIG. 20.

Certainly, the reference signal RE in the listed reference signal pattern may perform a cyclic shift in the time/frequency domain, or there may be a reference signal pattern corresponding to another combination according to values of $k_0$ and $l_0$ in the foregoing location relationship expressions, which is not listed one by one any further in this embodiment of the present invention.

When n=8, and the n reference signal REs are spaced two subcarriers apart in the frequency domain:

$$k = \begin{cases} 3m + k_0 & \text{if } l \neq l_1 \text{ and } \Delta f = 15 \text{ kHz} \\ 3m + k_0 + a_0 & \text{if } l = l_1 \text{ and } \Delta f = 15 \text{ kHz} \end{cases}, \text{ and}$$

$$l = \begin{cases} l_0 & \text{if } n_s \bmod 2 = 0 \text{ and } \Delta f = 15 \text{ kHz} \\ l_1 & \text{if } n_s \bmod 2 = 1 \text{ and } \Delta f = 15 \text{ kHz} \end{cases},$$

where $0 \leq k_0 \leq 2$, $-2 \leq a_0 \leq 2$, and $0 \leq k_0 + a_0 \leq 2$, and m=0, 1, . . . , $1N_{RB}^{PMCH,DL} - 1$.

Figure 21:
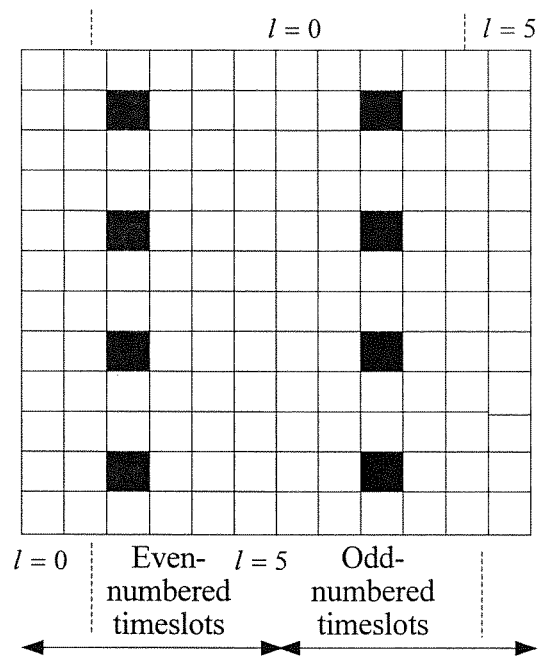
FIG. 21 is a reference signal pattern 18 of an MBSFN subframe according to an embodiment of the present invention.
Figure 22:
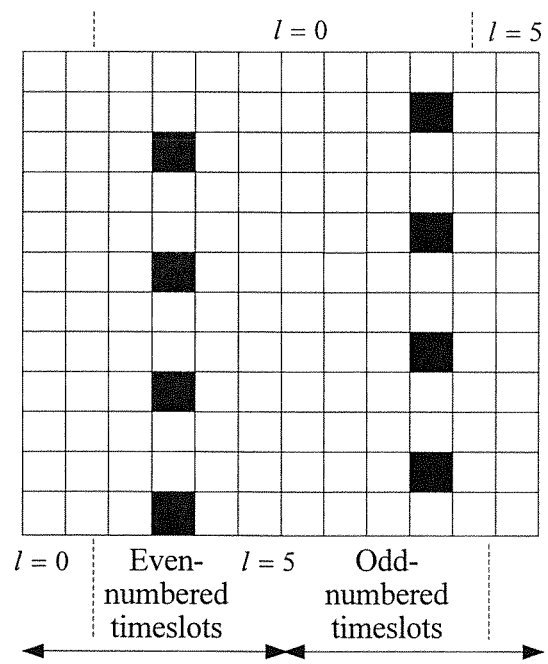
FIG. 22 is a reference signal pattern 19 of an MBSFN subframe according to an embodiment of the present invention.

If the CP type is an extended CP, and $N_{symb}^{DL}=6$:
exemplarily, when $k_0=1$, $a_0=0$, and $$l = \begin{cases} 2 & \text{if } n_s \bmod 2 = 0 \text{ and } \Delta f = 15 \text{ kHz} \\ 2 & \text{if } n_s \bmod 2 = 1 \text{ and } \Delta f = 15 \text{ kHz} \end{cases},$$

a possible reference signal pattern of the PMCH on the MBSFN subframe is shown in FIG. 21; or
exemplarily, when $k_0=0$, $a_0=1$, and $$l = \begin{cases} 3 & \text{if } n_s \bmod 2 = 0 \text{ and } \Delta f = 15 \text{ kHz} \\ 3 & \text{if } n_s \bmod 2 = 1 \text{ and } \Delta f = 15 \text{ kHz} \end{cases},$$

a possible reference signal pattern of the PMCH on the MBSFN subframe is shown in FIG. 22.

Certainly, the reference signal RE in the listed reference signal pattern may perform a cyclic shift in the time/frequency domain, or there may be a reference signal pattern corresponding to another combination according to values of $k_0$, $a_0$, and l in the foregoing location relationship expressions, which is not listed one by one any further in this embodiment of the present invention.

Figure 23:
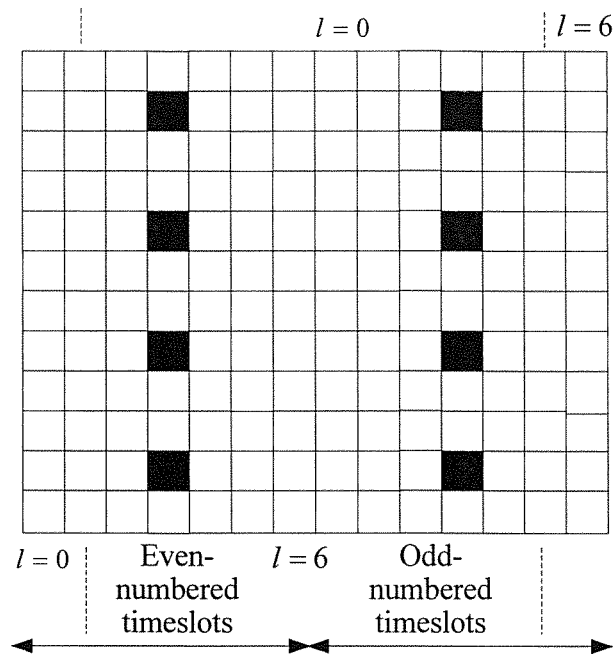
FIG. 23 is a reference signal pattern 20 of an MBSFN subframe according to an embodiment of the present invention.
Figure 24:
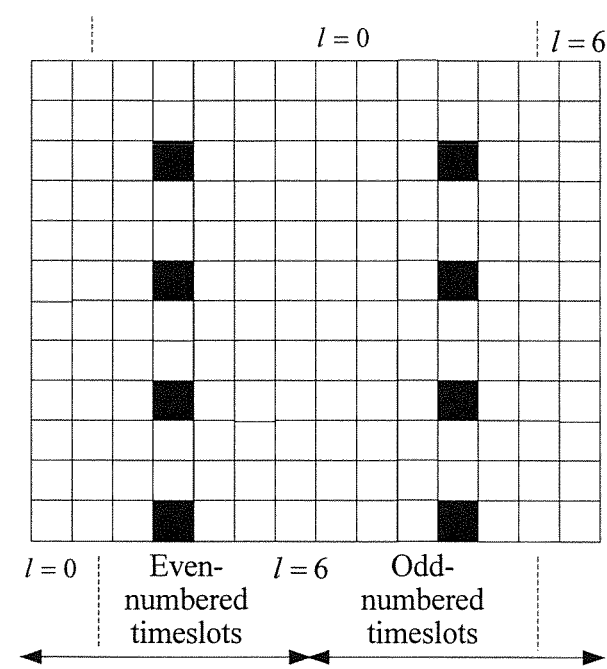
FIG. 24 is a reference signal pattern 21 of an MBSFN subframe according to an embodiment of the present invention.

If the CP type is a normal CP, and $N_{symb}^{DL}=7$:
exemplarily, when $k_0=1$, $a_0=0$, and $$l = \begin{cases} 3 & \text{if } n_s \bmod 2 = 0 \text{ and } \Delta f = 15 \text{ kHz} \\ 3 & \text{if } n_s \bmod 2 = 1 \text{ and } \Delta f = 15 \text{ kHz} \end{cases},$$

a possible reference signal pattern of the PMCH on the MBSFN subframe is shown in FIG. 23; or
exemplarily, when $k_0=0$, $a_0=0$, and $$l = \begin{cases} 3 & \text{if } n_s \bmod 2 = 0 \text{ and } \Delta f = 15 \text{ kHz} \\ 3 & \text{if } n_s \bmod 2 = 1 \text{ and } \Delta f = 15 \text{ kHz} \end{cases},$$

a possible reference signal pattern of the PMCH on the MBSFN subframe is shown in FIG. 24.

Certainly, the reference signal RE in the listed reference signal pattern may perform a cyclic shift in the time/frequency domain, or there may be a reference signal pattern corresponding to another combination according to values of $k_0$, $a_0$, and l in the foregoing location relationship expressions, which is not listed one by one any further in this embodiment of the present invention.

When n=9, and the n reference signal REs are spaced three subcarriers apart in the frequency domain:

$$k = \begin{cases} 4m + k_0 & \text{if } l \neq l_1 \text{ and } \Delta f = 15 \text{ kHz} \\ 4m + k_0 + a_0 & \text{if } l = l_1 \text{ and } \Delta f = 15 \text{ kHz} \end{cases}, \text{ and}$$

$$l = \begin{cases} l_0 & \text{if } n_s \bmod 2 = 0 \text{ and } \Delta f = 15 \text{ kHz} \\ l_1, l_2 & \text{if } n_s \bmod 2 = 1 \text{ and } \Delta f = 15 \text{ kHz} \end{cases},$$

where $0 \leq k_0 \leq 3$, $-3 \leq a_0 \leq 3$, and $0 \leq k_0 + a_0 \leq 3$, and m=0, 1, . . . , $3N_{RB}^{PMCH,DL} - 1$.

Figure 25:
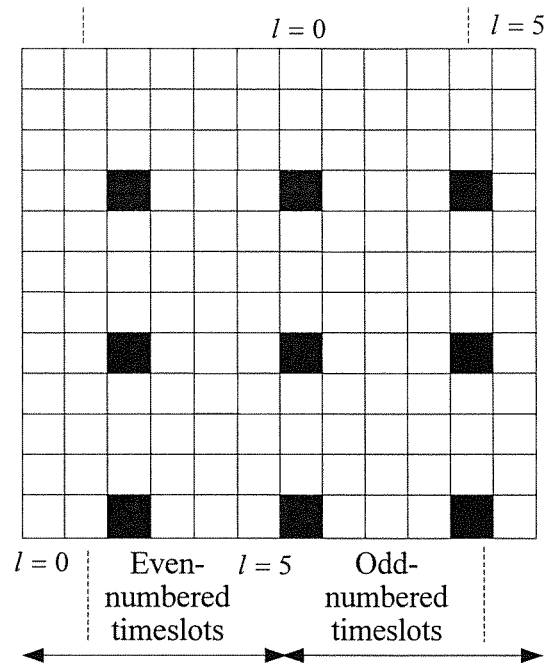
FIG. 25 is a reference signal pattern 22 of an MBSFN subframe according to an embodiment of the present invention.
Figure 26:
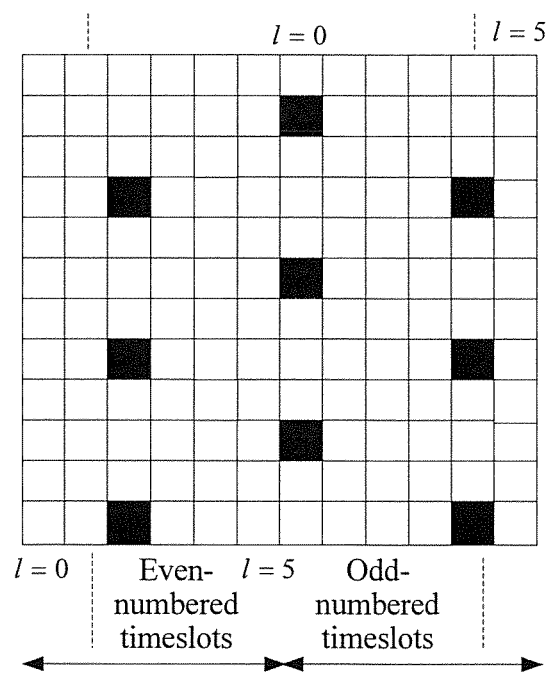
FIG. 26 is a reference signal pattern 23 of an MBSFN subframe according to an embodiment of the present invention.

If the CP type is an extended CP, and $N_{symb}^{DL}=6$:
exemplarily, when $k_0=0$, $a_0=0$, and $$l = \begin{cases} 2 & \text{if } n_s \bmod 2 = 0 \text{ and } \Delta f = 15 \text{ kHz} \\ 0, 4 & \text{if } n_s \bmod 2 = 1 \text{ and } \Delta f = 15 \text{ kHz} \end{cases},$$

a possible reference signal pattern of the PMCH on the MBSFN subframe is shown in FIG. 25; or
exemplarily, when $k_0=0$, $a_0=2$, and $$l = \begin{cases} 2 & \text{if } n_s \bmod 2 = 0 \text{ and } \Delta f = 15 \text{ kHz} \\ 0, 4 & \text{if } n_s \bmod 2 = 1 \text{ and } \Delta f = 15 \text{ kHz} \end{cases},$$

a possible reference signal pattern of the PMCH on the MBSFN subframe is shown in FIG. 26.

Certainly, the reference signal RE in the listed reference signal pattern may perform a cyclic shift in the time/frequency domain, or there may be a reference signal pattern corresponding to another combination according to values of $k_0$, $a_0$, and l in the foregoing location relationship expressions, which is not listed one by one any further in this embodiment of the present invention.

Figure 27:
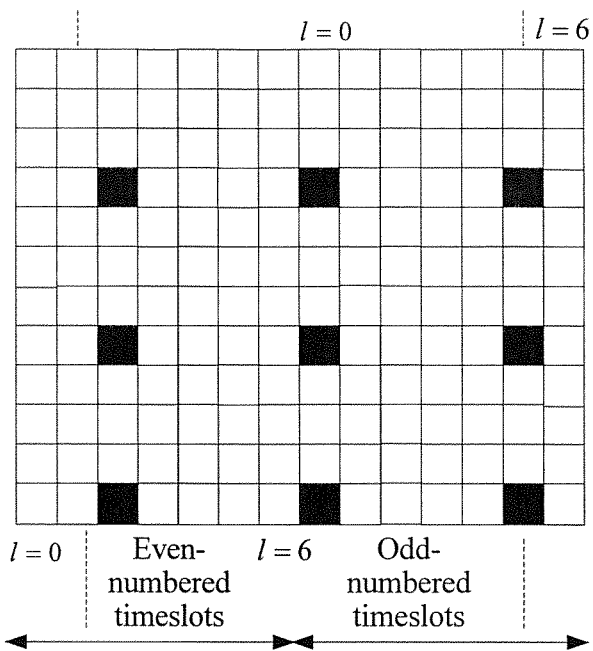
FIG. 27 is a reference signal pattern 24 of an MBSFN subframe according to an embodiment of the present invention.
Figure 28:
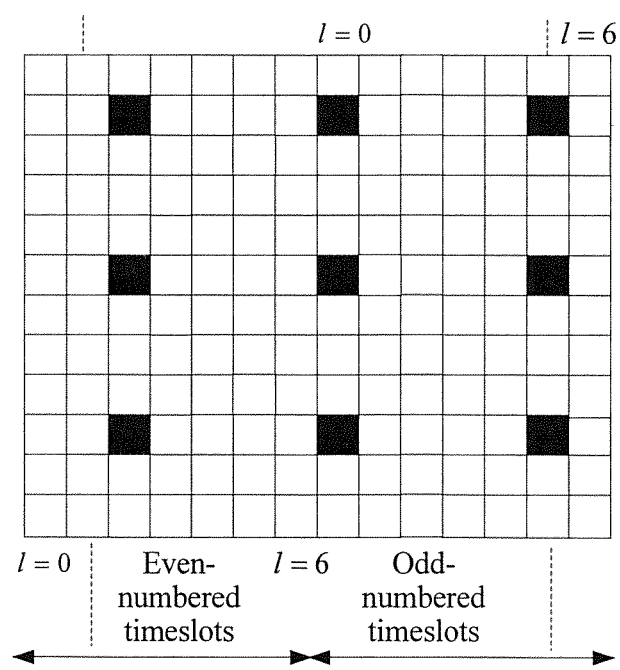
FIG. 28 is a reference signal pattern 25 of an MBSFN subframe according to an embodiment of the present invention.
Figure 29:
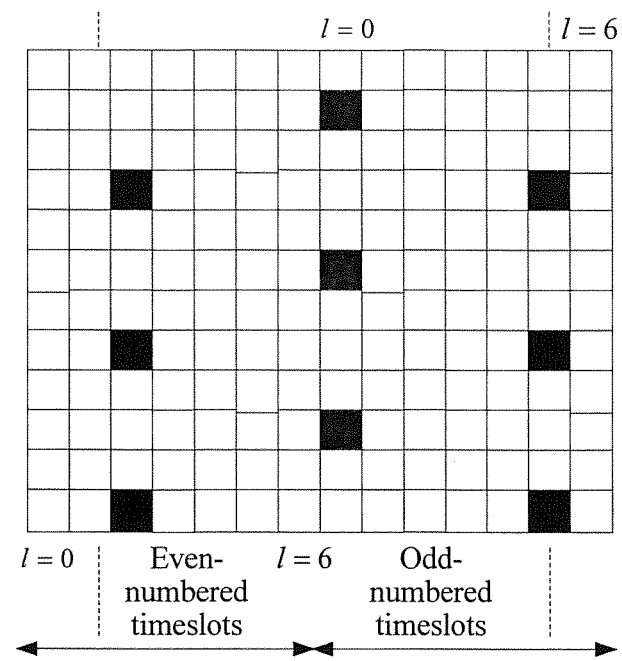
FIG. 29 is a reference signal pattern 26 of an MBSFN subframe according to an embodiment of the present invention.

If the CP type is a normal CP, and $N_{symb}^{DL}=7$:
exemplarily, when $k_0=0$, $a_0=0$, and $$l = \begin{cases} 2 & \text{if } n_s \bmod 2 = 0 \text{ and } \Delta f = 15 \text{ kHz} \\ 0, 5 & \text{if } n_s \bmod 2 = 1 \text{ and } \Delta f = 15 \text{ kHz} \end{cases},$$

a possible reference signal pattern of the PMCH on the MBSFN subframe is shown in FIG. 27;
exemplarily, when $k_0=2$, $a_0=0$, and $$l = \begin{cases} 2 & \text{if } n_s \bmod 2 = 0 \text{ and } \Delta f = 15 \text{ kHz} \\ 0, 5 & \text{if } n_s \bmod 2 = 1 \text{ and } \Delta f = 15 \text{ kHz} \end{cases},$$

a possible reference signal pattern of the PMCH on the MBSFN subframe is shown in FIG. 28; or
exemplarily, when $k_0=0$, $a_0=2$, and $$l = \begin{cases} 2 & \text{if } n_s \bmod 2 = 0 \text{ and } \Delta f = 15 \text{ kHz} \\ 0, 5 & \text{if } n_s \bmod 2 = 1 \text{ and } \Delta f = 15 \text{ kHz} \end{cases},$$

a possible reference signal pattern of the PMCH on the MBSFN subframe is shown in FIG. 29.

Certainly, the reference signal RE in the listed reference signal pattern may perform a cyclic shift in the time/frequency domain, or there may be a reference signal pattern corresponding to another combination according to values of $k_0$, $a_0$, and l in the foregoing location relationship expressions, which is not listed one by one any further in this embodiment of the present invention.

When n=4, and the n reference signal REs are spaced five subcarriers apart in the frequency domain:

$$k = \begin{cases} 6m + k_0 & \text{if } l \neq l_1 \text{ and } \Delta f = 15 \text{ kHz} \\ 6m + k_0 + a_0 & \text{if } l = l_1 \text{ and } \Delta f = 15 \text{ kHz} \end{cases}, \text{ and}$$

-continued $$l = \begin{cases} l_0 & \text{if } n_s \bmod 2 = 0 \text{ and } \Delta f = 15 \text{ kHz} \\ l_1 & \text{if } n_s \bmod 2 = 1 \text{ and } \Delta f = 15 \text{ kHz} \end{cases},$$

where
$0 \le k_0 \le 5$, $-5 \le a_0 \le 5$, $0 \le k_0 + a_0 \le 5$, and m=0, 1, . . . , $2N_{RB}^{PMCH,DL} - 1$.

Figure 30:
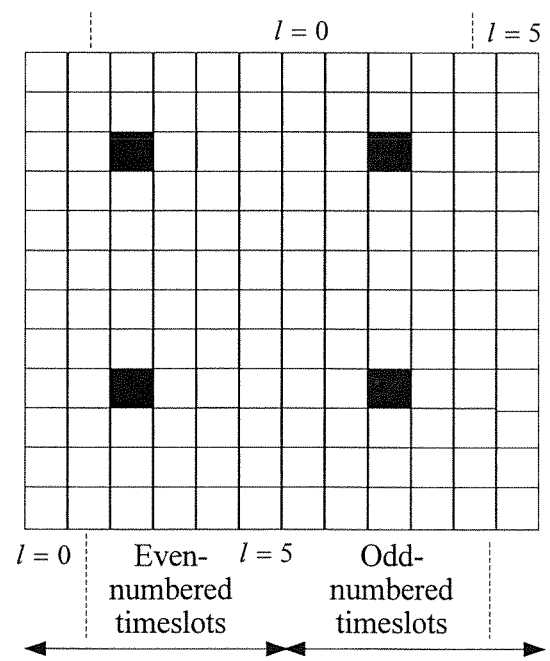
FIG. 30 is a reference signal pattern 27 of an MBSFN subframe according to an embodiment of the present invention.
Figure 31:
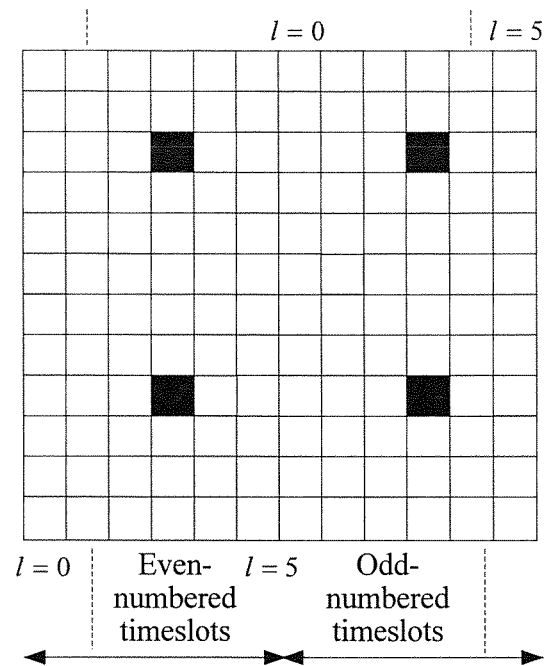
FIG. 31 is a reference signal pattern 28 of an MBSFN subframe according to an embodiment of the present invention.

If the CP type is an extended CP, and $N_{symb}^{DL}=6$:
exemplarily, when $k_0=3$, $a_0=0$, and $$l = \begin{cases} 2 & \text{if } n_s \bmod 2 = 0 \text{ and } \Delta f = 15 \text{ kHz} \\ 2 & \text{if } n_s \bmod 2 = 1 \text{ and } \Delta f = 15 \text{ kHz} \end{cases},$$

a possible reference signal pattern of the PMCH on the MBSFN subframe is shown in FIG. 30; or
exemplarily, when $k_0=3$, $a_0=0$, and $$l = \begin{cases} 3 & \text{if } n_s \bmod 2 = 0 \text{ and } \Delta f = 15 \text{ kHz} \\ 3 & \text{if } n_s \bmod 2 = 1 \text{ and } \Delta f = 15 \text{ kHz} \end{cases},$$

a possible reference signal pattern of the PMCH on the MBSFN subframe is shown in FIG. 31.

Certainly, the reference signal RE in the listed reference signal pattern may perform a cyclic shift in the time/frequency domain, or there may be a reference signal pattern corresponding to another combination according to values of $k_0$, $a_0$, and l in the foregoing location relationship expressions, which is not listed one by one any further in this embodiment of the present invention.

Figure 32:
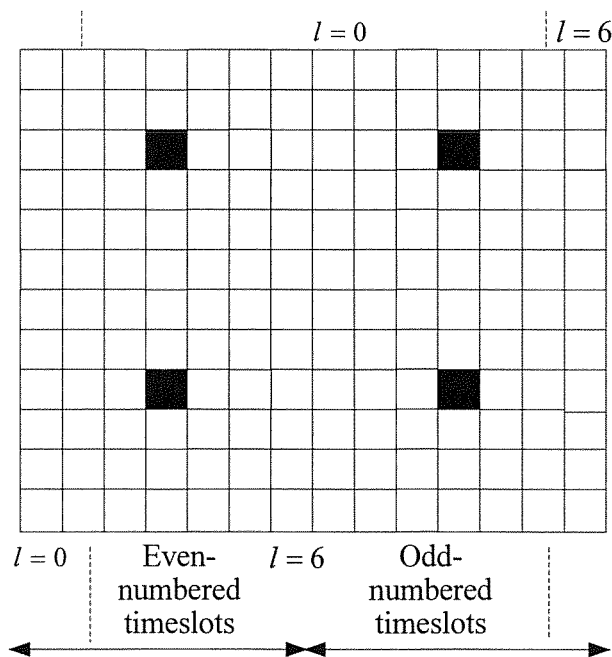
FIG. 32 is a reference signal pattern 29 of an MBSFN subframe according to an embodiment of the present invention.
Figure 33:
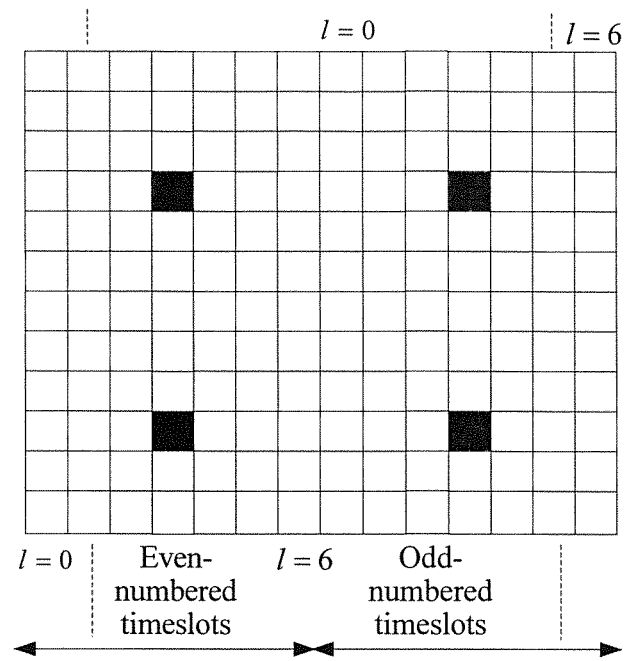
FIG. 33 is a reference signal pattern 30 of an MBSFN subframe according to an embodiment of the present invention.

If the CP type is a normal CP, and $N_{symb}^{DL}=7$:
exemplarily, when $k_0=3$, $a_0=0$, and $$l = \begin{cases} 3 & \text{if } n_s \bmod 2 = 0 \text{ and } \Delta f = 15 \text{ kHz} \\ 3 & \text{if } n_s \bmod 2 = 1 \text{ and } \Delta f = 15 \text{ kHz} \end{cases},$$

a possible reference signal pattern of the PMCH on the MBSFN subframe is shown in FIG. 32; or
exemplarily, when $k_0=2$, $a_0=0$, and $$l = \begin{cases} 3 & \text{if } n_s \bmod 2 = 0 \text{ and } \Delta f = 15 \text{ kHz} \\ 3 & \text{if } n_s \bmod 2 = 1 \text{ and } \Delta f = 15 \text{ kHz} \end{cases},$$

a possible reference signal pattern of the PMCH on the MBSFN subframe is shown in FIG. 33.

Certainly, the reference signal RE in the listed reference signal pattern may perform a cyclic shift in the time/frequency domain, or there may be a reference signal pattern corresponding to another combination according to values of $k_0$, $a_0$, and l in the foregoing location relationship expressions, which is not listed one by one any further in this embodiment of the present invention.

When n=4, and the n reference signal REs are spaced two subcarriers apart in the frequency domain:
$k=3m+k_0$, $l=l_0$ if $n_s \bmod 2=0$ and $\Delta f=15$ kHz, where $0 \le k_0 \le 2$, and m=0, 1, . . . , $4N_{RB}^{PMCH,DL} - 1$.

Figure 34:
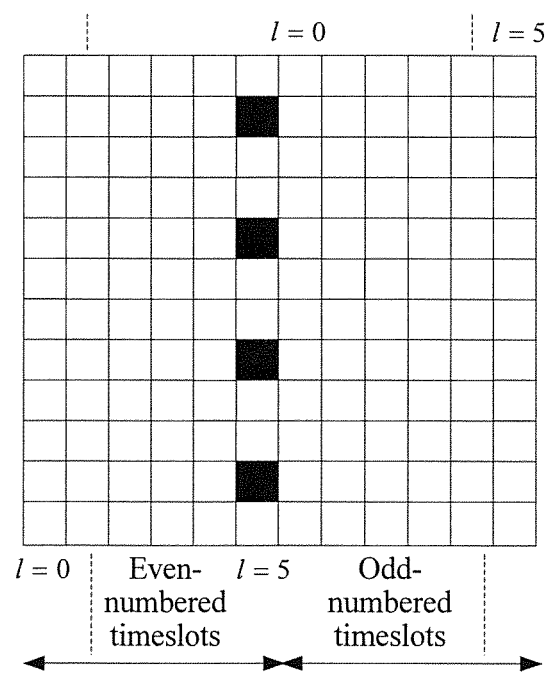
FIG. 34 is a reference signal pattern 31 of an MBSFN subframe according to an embodiment of the present invention.

If the CP type is an extended CP, and $N_{symb}^{DL}=6$:
exemplarily, when $k_0=1$, and $l_0=5$, a possible reference signal pattern of the PMCH on the MBSFN subframe is shown in FIG. 34.

Certainly, the reference signal RE in the listed reference signal pattern may perform a cyclic shift in the time/frequency domain, or there may be a reference signal pattern corresponding to another combination according to values of $k_0$ and $l_0$ in the foregoing location relationship expressions, which is not listed one by one any further in this embodiment of the present invention.

Figure 35:
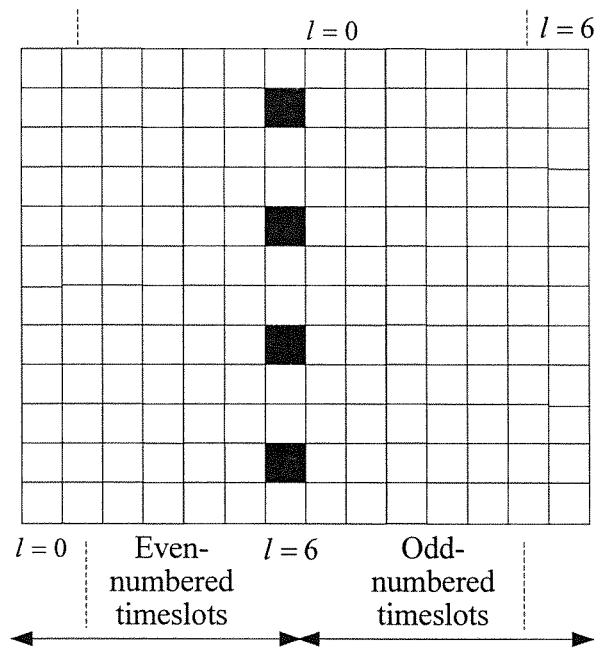
FIG. 35 is a reference signal pattern 32 of an MBSFN subframe according to an embodiment of the present invention.

If the CP type is a normal CP, and $N_{symb}^{DL}=7$:
exemplarily, when $k_0=1$, and $l_0=6$, a possible reference signal pattern of the PMCH on the MBSFN subframe is shown in FIG. 35.

Certainly, the reference signal RE in the listed reference signal pattern may perform a cyclic shift in the time/frequency domain, or there may be a reference signal pattern corresponding to another combination according to values of $k_0$ and $l_0$ in the foregoing location relationship expressions, which is not listed one by one any further in this embodiment of the present invention.

When n=12, and the n reference signal REs are spaced one subcarrier apart in the frequency domain:

$$k = \begin{cases} 2m + k_0 & \text{if } l \ne l_1 \text{ and } \Delta f = 15 \text{ kHz} \\ 2m + k_0 + a_0 & \text{if } l = l_1 \text{ and } \Delta f = 15 \text{ kHz} \end{cases}, \text{ and}$$

$$l = \begin{cases} l_0 & \text{if } n_s \bmod 2 = 0 \text{ and } \Delta f = 15 \text{ kHz} \\ l_1 & \text{if } n_s \bmod 2 = 1 \text{ and } \Delta f = 15 \text{ kHz} \end{cases},$$

where
$0 \le k_0 \le 1$, $-1 \le a_0 \le 1$, $0 \le k_0 + a_0 \le 1$, and m=0, 1, . . . , $6N_{RB}^{PMCH,DL} - 1$.

Figure 36:
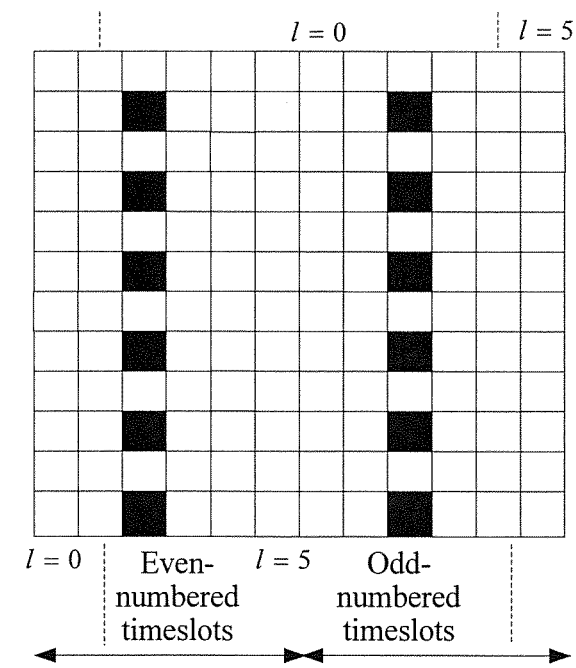
FIG. 36 is a reference signal pattern 33 of an MBSFN subframe according to an embodiment of the present invention.
Figure 37:
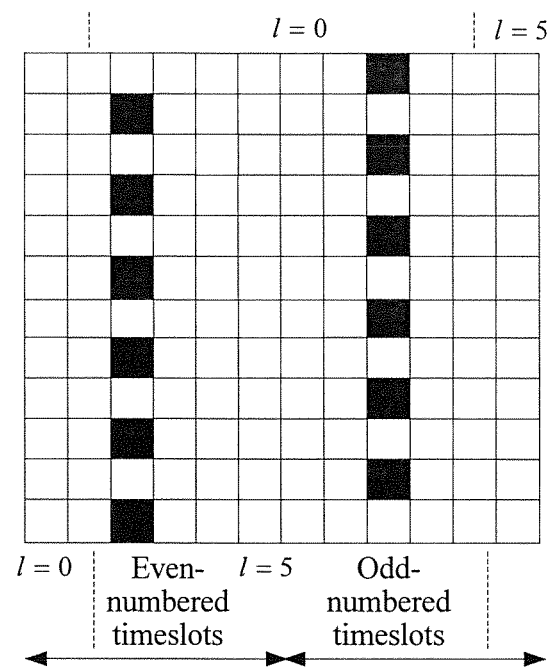
FIG. 37 is a reference signal pattern 34 of an MBSFN subframe according to an embodiment of the present invention.

If the CP type is an extended CP, and
exemplarily, when $k_0=0$, $a_0=0$, and $$l = \begin{cases} 2 & \text{if } n_s \bmod 2 = 0 \text{ and } \Delta f = 15 \text{ kHz} \\ 2 & \text{if } n_s \bmod 2 = 1 \text{ and } \Delta f = 15 \text{ kHz} \end{cases},$$

a possible reference signal pattern of the PMCH on the MBSFN subframe is shown in FIG. 36; or
exemplarily, when $k_0=0$, $a_0=1$, and $$l = \begin{cases} 2 & \text{if } n_s \bmod 2 = 0 \text{ and } \Delta f = 15 \text{ kHz} \\ 2 & \text{if } n_s \bmod 2 = 1 \text{ and } \Delta f = 15 \text{ kHz} \end{cases},$$

a possible reference signal pattern of the PMCH on the MBSFN subframe is shown in FIG. 37.

Certainly, the reference signal RE in the listed reference signal pattern may perform a cyclic shift in the time/frequency domain, or there may be a reference signal pattern corresponding to another combination according to values of $k_0$, $a_0$, and l in the foregoing location relationship expressions, which is not listed one by one any further in this embodiment of the present invention.

Figure 38:
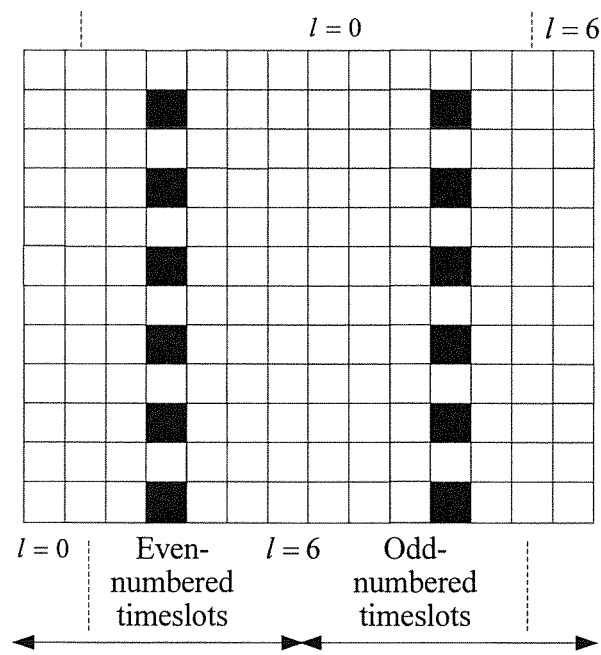
FIG. 38 is a reference signal pattern 35 of an MBSFN subframe according to an embodiment of the present invention.

If the CP type is a normal CP, and $N_{symb}^{DL}=7$:
exemplarily, when $k_0=0$, $a_0=0$, and $$l = \begin{cases} 3 & \text{if } n_s \bmod 2 = 0 \text{ and } \Delta f = 15 \text{ kHz} \\ 3 & \text{if } n_s \bmod 2 = 1 \text{ and } \Delta f = 15 \text{ kHz} \end{cases},$$

a possible reference signal pattern of the PMCH on the MBSFN subframe is shown in FIG. 38; or exemplarily, when $k_0=0$, $a_0=1$, and $$l = \begin{cases} 3 & \text{if } n_s \bmod 2 = 0 \text{ and } \Delta f = 15 \text{ kHz} \\ 3 & \text{if } n_s \bmod 2 = 1 \text{ and } \Delta f = 15 \text{ kHz} \end{cases},$$

a possible reference signal pattern of the PMCH on the MBSFN subframe is shown in FIG. 39.

Certainly, the reference signal RE in the listed reference signal pattern may perform a cyclic shift in the time/frequency domain, or there may be a reference signal pattern corresponding to another combination according to values of $k_0$, $a_0$, and l in the foregoing location relationship expressions, which is not listed one by one any further in this embodiment of the present invention.

It should be noted that in this embodiment of the present invention, for different quantities of reference signal REs, several corresponding reference signal patterns are separately and exemplarily provided. In a case of meeting a channel delay condition, a smaller CP length results in higher resource utilization (for example, resource utilization in FIG. 11 is higher than that in FIG. 7). When CP lengths are the same, a same quantity of reference signal REs may be corresponding to different reference signal patterns, and the different reference signal patterns may have different effective effects.

Exemplarily, that the reference signal REs are located in different subcarriers may bring a frequency diversity gain of channel estimation (for example, a frequency diversity gain in FIG. 9 is greater than that in FIG. 10), that the reference signal REs are located in different OFDM symbols may bring a time gain of the channel estimation (for example, a time diversity gain in FIG. 10 is greater than that in FIG. 18), and that the reference signal REs are located in a same OFDM symbol may reduce reference signal signaling overheads and UE detection complexity (for example, FIG. 18).

The frequency diversity gain and the time diversity gain are generally determined according to a specific channel status and a scenario, which is not specifically limited in this embodiment of the present invention.

Further, the MBSFN configuration method provided in this embodiment of the present invention further includes:

sending, by the base station, configuration information of a PDSCH to the UE, where the configuration information of the PDSCH is used to indicate transmission bandwidth of the PDSCH on the MBSFN subframe.

Specifically, as described in the background, in the current standard protocol, frequency division multiplexing of the PMCH and the PDSCH is not permitted, but time division multiplexing of the PMCH and the PDSCH is permitted, that is, some specific subframes may be designed as MBSFN subframes, and the MBSFN subframes may be used to bear the PMCH. In this embodiment of the present invention, the base station further sends the configuration information of the PDSCH on the MBSFN subframe, where the configuration information of the PDSCH is used to indicate the transmission bandwidth of the PDSCH on the MBSFN subframe, that is, the PDSCH may be borne on the MBSFN subframe that bears the PMCH, which achieves frequency division multiplexing between the PDSCH and the PMCH, thereby improving flexible scheduling of a resource.

The configuration information of the PDSCH may be carried in RRC signaling, and the RRC signaling is borne in an SIB 13. Exemplarily, when performing signaling configuration, the base station may choose to send, to the UE, RRC signaling that carries a PDSCH transmission bandwidth resource location, where the RRC signaling is borne in the SIB 13.

Further, the MBSFN configuration method provided in this embodiment of the present invention further includes:

sending, by the base station, OFDM symbol information of the PMCH to the UE, where the OFDM symbol information of the PMCH is used to indicate that the initial OFDM symbol of the PMCH on the MBSFN subframe is the first OFDM symbol of the MBSFN subframe.

Specifically, in an MBSFN transmission method in the prior art, dynamic control signaling needs to be transmitted in an MBSFN subframe. The dynamic control signaling occupies one or two OFDM symbols. In the MBSFN configuration method provided in this embodiment of the present invention, the base station configures all OFDM symbols of the MBSFN subframe to transmit MBSFN data borne on the PMCH. Such design may maximize resource utilization of the MBSFN subframe, and further improve system performance.

The OFDM symbol information of the PMCH may be carried in RRC signaling, and the RRC signaling is borne in an SIB 13. Exemplarily, when performing signaling configuration, the base station may choose to send, to the UE, RRC signaling that carries a start location of the PMCH on the MBSFN subframe, and the RRC signaling is borne in the SIB 13, where a value of a non-MBSFNregionLength in a signaling parameter mbsfn-AreaInfoList may be 0.

It should be noted that in the description of the reference signal pattern in the foregoing embodiment, t indicates the number of the initial OFDM symbol of the PMCH on the MBSFN subframe. In this embodiment of the present invention, the initial OFDM symbol of the PMCH on the MBSFN subframe may be the first OFDM symbol of the MBSFN subframe. It may be learned, with reference to content of the background, that a number of the first OFDM symbol is 0. Therefore, a value of t is 0 in this case.

Certainly, the initial OFDM symbol of the PMCH on the MBSFN subframe may be similar to a configuration in the prior art, that is, the initial OFDM symbol of the PMCH on the MBSFN subframe is the second OFDM symbol or the third OFDM symbol of the MBSFN subframe, which is not specifically limited in this embodiment of the present invention. If the initial OFDM symbol of the PMCH on the MBSFN subframe is the second OFDM symbol of the MBSFN subframe, in the description of the reference signal pattern in the foregoing embodiment, a value of t is 1. If the initial OFDM symbol of the PMCH on the MBSFN subframe is the third OFDM symbol of the MBSFN subframe, in the description of the reference signal pattern in the foregoing embodiment, a value of t is 2.

Further, the MBSFN configuration method provided in this embodiment of the present invention further includes:

sending, by the base station, configuration information of an enhanced physical downlink control channel (Enhanced physical downlink control channel, EPDCCH) to the UE, where the configuration information of the EPDCCH is used to indicate transmission bandwidth of the EPDCCH on the MBSFN subframe.

Specifically, in an MBSFN transmission method in the prior art, dynamic control signaling needs to be transmitted in an MBSFN subframe. In this embodiment of the present invention, the base station sends the configuration information of the EPDCCH on the MBSFN subframe, where configuration information of the EPDCCH is used to indicate the transmission bandwidth of the EPDCCH on the MBSFN subframe, that is, the EPDCCH may be borne on the MBSFN subframe that bears the PMCH, and the dynamic signaling may be transmitted by using the EPDCCH, which achieves frequency division multiplexing between the EPDCCH and the PMCH, thereby improving a throughput of the MBSFN subframe.

The configuration information of the EPDCCH may be carried in RRC signaling, and the RRC signaling is borne in an SIB 13. Exemplarily, when performing signaling configuration, the base station may choose to send, to the UE, RRC signaling that carries an EPDCCH transmission bandwidth resource location, where the RRC signaling is borne in the SIB 13.

Certainly, the dynamic signaling may be transmitted in another manner, which is not specifically limited in this embodiment of the present invention.

Further, the MBSFN configuration method provided in this embodiment of the present invention further includes:

sending, by the base station, antenna configuration information of the PMCH to the UE, where the antenna configuration information is used to indicate that an antenna transmission manner of the PMCH is a multi-antenna transmission manner in which a quantity of antenna ports is greater than 1.

Particularly, in the multi-antenna transmission manner, the reference signal pattern may use a frequency division multiplexing (Frequency Division Multiplexing, FDM) manner, or a time division multiplexing (Time Division Multiplexing, TDM) manner, or a code division multiplexing (Code Division Multiplexing, CDM) manner in which code division is performed by using an orthogonal code.

Specifically, in an MBSFN transmission method in the prior art, only a single antenna port 4 can be used to perform signal transmission. In the MBSFN configuration method provided in this embodiment of the present invention, the base station may configure the antenna transmission manner of the PMCH to be the multi-antenna transmission manner in which a quantity of antenna ports is greater than 1. In this way, a transmit diversity gain and a spatial multiplexing gain may be brought, impact of a fading channel is reduced, and further system performance may be improved.

The antenna configuration information may be carried in RRC signaling, and the RRC signaling is borne in an SIB 13. Exemplarily, when performing signaling configuration, the base station may choose to send, to the UE, RRC signaling that carries the antenna configuration information, where the RRC signaling is borne in the SIB 13.

A person of ordinary skill in the art may understand that after completing subframe configuration of the MBSFN subframe, the base station may send a broadcast signal and a reference signal on the MBSFN subframe, which is not specifically limited in this embodiment of the present invention.

The reference signal may be determined according to the reference signal pattern. Exemplarily, description is provided herein with reference to a specific reference signal pattern. It is assumed that the reference signal pattern is shown in FIG. 4, that is, a location of a reference signal RE in the reference signal pattern meets the following relationships:

$$k = \begin{cases} 6m & \text{if } l \neq l_1 \text{ and } \Delta f = 15 \text{ kHz} \\ 6m+3 & \text{if } l = l_1 \text{ and } \Delta f = 15 \text{ kHz} \end{cases}, \text{ and}$$

-continued $$l = \begin{cases} l_0 & \text{if } n_s \bmod 2 = 0 \text{ and } \Delta f = 15 \text{ kHz} \\ l_1, l_2 & \text{if } n_s \bmod 2 = 1 \text{ and } \Delta f = 15 \text{ kHz} \end{cases}.$$

A generate sequence of the reference signal is as follows:

$$r_{l,n_s}(m) = \frac{1}{\sqrt{2}}(1 - 2 \cdot c(2m)) + j\frac{1}{\sqrt{2}}(1 - 2 \cdot c(2m+1)),$$

where m=0, 1, ..., $nN_{RB}^{PMCH,DL}-1$, l indicates a time domain index, $n_s$ is a number of a timeslot that is in a radio frame and in which the reference signal RE is located, $N_{RB}^{max,DL}$ is maximum transmission bandwidth of a downlink system, n is a quantity of reference signal REs on one OFDM symbol exists when the frequency domain is one PRB pair resource, and m indicates a number of a reference symbol. Therefore, an initial value of a pseudo-random sequence is:

$c_{init} = 2^9 \cdot (7 \cdot (n_s+1)+l+1) \cdot (2 \cdot N_{ID}^{MBSFN})$, where $N_{ID}^{MBSFN}$ indicates an MBSFN area ID of an MBSFN area.

A relational expression in which a reference signal sequence is mapped into a complex-valued modulation symbol $a_{k,l}^{(p)}$ is as follows:

$$a_{k,l}^{(p)} = r_{l,n_s}(m'),$$

where m'=m+(n/2)($N_{RB}^{max,DL}-N_{RB}^{PMCH,DL}$), and m=0, 1, ..., $nN_{RB}^{PMCH,DL}-1$.

Therefore, a complex-valued modulation symbol, that is, the reference signal, corresponding to each reference signal RE may be obtained according to the reference signal pattern.

It should be noted that when a reference signal is being sent, for a method for transmitting the reference signal in a multi-antenna transmission manner, refer to a method for transmitting a reference signal in unicast in a multi-antenna transmission manner, and details are not described herein in this embodiment of the present invention.

Embodiment 2

This embodiment of the present invention provides an MBSFN configuration method. Specifically, as shown in FIG. 40, the method includes the following steps:

4001. UE receives MBSFN configuration information, where the MBSFN configuration information is used to indicate a subframe configuration of an MBSFN subframe that bears a PMCH, and the subframe configuration includes a CP type and/or a reference signal pattern.

The CP type includes a normal CP, an extended CP, or another CP, and a length of the another CP is different from a length of the normal CP or a length of the extended CP.

Specifically, in the MBSFN configuration method provided in this embodiment of the present invention, the UE first receives the MBSFN configuration information, where the configuration information is used to indicate the subframe configuration of the MBSFN subframe that bears the PMCH.

The MBSFN configuration information may be carried in RRC signaling, and the RRC signaling is borne in an SIB 13. For details, refer to the description of the signaling bearer manner of the MBSFN configuration information in the embodiment shown in FIG. 2, which is not described herein again.

Specifically, in this embodiment of the present invention, the CP type in the subframe configuration of the MBSFN subframe may be an extended CP specified in a standard protocol, or may be a normal CP or another CP, which is not specifically limited in this embodiment of the present invention. A length of the another CP is different from a length of the normal CP or a length of the extended CP.

4002. The UE determines the subframe configuration of the MBSFN subframe according to the MBSFN configuration information.

Specifically, in this embodiment of the present invention, after receiving the MBSFN configuration information, the UE determines the subframe configuration of the MBSFN subframe according to the MBSFN configuration information.

In the MBSFN configuration method provided in this embodiment of the present invention, UE receives MBSFN configuration information, where the MBSFN configuration information is used to indicate a subframe configuration of an MBSFN subframe that bears a PMCH; and then the UE may determine the subframe configuration of the MBSFN subframe according to the MBSFN configuration information. Therefore, flexible configuration of the MBSFN subframe may be implemented. In addition, because a CP type in the MBSFN subframe configuration may include a normal CP, an extended CP, or another CP, and a length of the another CP is different from a length of the normal CP or a length of the extended CP, a proper subframe configuration may be selected as required, further, overheads may be reduced, and radio resource utilization of a system is improved.

Further, the subframe configuration of the MBSFN subframe may include at least one configuration of a configuration A or B:

the configuration A: the CP type is a normal CP or another CP; or the configuration B: in each physical resource block PRB pair, the reference signal pattern includes n reference signal resource elements REs, where n is a positive integer less than 18.

Exemplarily, in the prior art, an MBSFN reference signal pattern is shown in FIG. 3, where reference signal REs are spaced one subcarrier apart in a frequency domain, and are spaced three OFDM symbols apart in a time domain, and a total of 18 reference signal REs are included. However, when the base station is deployed in a hotspot scenario, because compared with another scenario, the hotspot scenario features a small multipath transmission channel delay, coherent bandwidth of the PMCH in the hotspot scenario is relatively large, and further that reference signal REs are spaced multiple subcarriers apart has little impact on channel estimation. In addition, because compared with the another scenario, the hotspot scenario features a low moving speed, coherent time of the PMCH in the hotspot scenario is relatively long, and further that the reference signal REs are spaced multiple OFDM symbols apart has little impact on the channel estimation. In conclusion, if the reference signal pattern shown in FIG. 3 is still used, an unnecessary resource waste is caused, which reduces resource utilization. Therefore, in the hotspot-scenario-specific subframe configuration of the MBSFN subframe, a CP length may be designed as a normal CP or another CP whose CP length is less than a length of the normal CP, and/or in each PRB pair, the reference signal pattern includes n REs, where n is a positive integer less than 18, which reduces overheads and improves resource utilization.

It should be noted that when the subframe configuration meets the at least one configuration of A or B, if the subframe configuration meets the configuration A, a quantity of reference signal REs on one PRB pair may be 18, or may be n in the configuration B, which is not specifically limited in this embodiment of the present invention.

Further, the configuration B may further include:

n=6, and the n reference signal REs are spaced five, three, or one subcarrier apart in a frequency domain; or n=8, and the n reference signal REs are spaced two subcarriers apart in a frequency domain; or n=9, and the n reference signal REs are spaced three subcarriers apart in a frequency domain; or n=4, and the n reference signal REs are spaced five or two subcarriers apart in a frequency domain; or n=12, and the n reference signal REs are spaced one subcarrier apart in a frequency domain.

Exemplarily, for the reference signal patterns of the MBSFN subframe, refer to the corresponding reference signal patterns respectively obtained when n=6, 8, 9, 4, 12 in Embodiment 1, which is not described herein again in this embodiment of the present invention.

Further, the MBSFN configuration method provided in this embodiment of the present invention further includes:

receiving, by the UE, configuration information of a PDSCH, where the configuration information of the PDSCH is used to indicate transmission bandwidth of the PDSCH on the MBSFN subframe; and determining, by the UE, the transmission bandwidth of the PDSCH on the MBSFN subframe according to the configuration information of the PDSCH.

Specifically, as described in the background, in the current standard protocol, frequency division multiplexing of the PMCH and the PDSCH is not permitted, but time division multiplexing of the PMCH and the PDSCH is permitted, that is, some specific subframes may be designed as MBSFN subframes, and the MBSFN subframes may be used to bear the PMCH. In this embodiment of the present invention, the UE further receives the configuration information of the PDSCH, where the configuration information of the PDSCH is used to indicate the transmission bandwidth of the PDSCH on the MBSFN subframe, that is, the PDSCH may be borne on the MBSFN subframe that bears the PMCH, which achieves frequency division multiplexing between the PDSCH and the PMCH, thereby improving flexible scheduling of a resource.

For a signaling bearer manner of the configuration information of the PDSCH, refer to the description in Embodiment 1, and details are not described herein again.

Further, the MBSFN configuration method provided in this embodiment of the present invention further includes:

receiving, by the UE, OFDM symbol information of the PMCH, where the OFDM symbol information is used to indicate that the initial OFDM symbol of the PMCH on the MBSFN subframe is the first OFDM symbol of the MBSFN subframe; and determining, by the UE, the initial OFDM symbol of the PMCH on the MBSFN subframe according to the OFDM symbol information of the PMCH.

Specifically, in an MBSFN transmission method in the prior art, dynamic control signaling needs to be transmitted in an MBSFN subframe. The dynamic control signaling occupies one or two OFDM symbols. In the MBSFN configuration method provided in this embodiment of the present invention, all OFDM symbols of the MBSFN subframe may be configured, to transmit MBSFN data borne on the PMCH. Such design may maximize resource utilization of the MBSFN subframe, and further improve system performance.

For a signaling bearer manner of the OFDM symbol information of the PMCH, refer to the description in Embodiment 1, and details are not described herein again. For a value of t corresponding to a number of the initial OFDM symbol of the PMCH on the MBSFN subframe, refer to the description in Embodiment 1, and details are not described herein again.

Further, the MBSFN configuration method provided in this embodiment of the present invention further includes:

receiving, by the UE, configuration information of an EPDCCH, where the configuration information of the EPDCCH is used to indicate transmission bandwidth of the EPDCCH on the MBSFN subframe; and determining, by the UE, the transmission bandwidth of the EPDCCH on the MBSFN subframe according to the configuration information of the EPDCCH.

Specifically, in an MBSFN transmission method in the prior art, dynamic control signaling needs to be transmitted in an MBSFN subframe. In this embodiment of the present invention, the UE receives the configuration information of the EPDCCH, where the configuration information of the EPDCCH is used to indicate the transmission bandwidth of the EPDCCH on the MBSFN subframe, that is, the EPDCCH may be borne on the MBSFN subframe that bears the PMCH, and the dynamic signaling may be transmitted by using the EPDCCH, which achieves frequency division multiplexing between the EPDCCH and the PMCH, thereby improving a throughput of the MBSFN subframe.

For a signaling bearer manner of the configuration information of the EPDCCH, refer to the description in Embodiment 1, and details are not described herein again.

Certainly, the dynamic signaling may be transmitted in another manner, which is not specifically limited in this embodiment of the present invention.

Further, the MBSFN configuration method provided in this embodiment of the present invention further includes:

receiving, by the UE, antenna configuration information of the PMCH, where the antenna configuration information is used to indicate that an antenna transmission manner of the PMCH is a multi-antenna transmission manner in which a quantity of antenna ports is greater than 1; and determining, by the UE, the antenna transmission manner of the PMCH according to the antenna configuration information of the PMCH.

Particularly, in the multi-antenna transmission manner, the reference signal pattern uses a frequency division multiplexing FDM manner, or a time division multiplexing TDM manner, or a code division multiplexing CDM manner in which code division is performed by using an orthogonal code.

Specifically, in an MBSFN transmission method in the prior art, only a single antenna port 4 can be used to perform signal transmission. In the MBSFN configuration method provided in this embodiment of the present invention, the multi-antenna transmission manner in which a quantity of antenna ports is greater than 1 may be configured for MBSFN transmission. In this way, a transmit diversity gain and a spatial multiplexing gain may be brought, impact of a fading channel is reduced, and further system performance may be improved.

For a signaling bearer manner of the antenna configuration information, refer to the description in Embodiment 1, and details are not described herein again.

It should be noted that the UE may obtain a channel quality characterization parameter after detecting a channel condition around in real time or periodically, and then send the channel quality parameter to a network device, and the network device determines the MBSFN configuration information according to the channel quality parameter, which achieves dynamically updating, by the base station, the configuration information of the MBSFN subframe that bears the PMCH, and further makes full use of resources on the MBSFN subframe.

The network device may include an MCE, a gateway device, and the like, and the channel quality parameter may include RSRP, RSRQ, a CQI, a channel delay feature, a service quality requirement, and the like, which are not specifically limited in this embodiment of the present invention.

A person of ordinary skill in the art may understand that after determining the subframe configuration of the MBSFN subframe, the UE may receive a broadcast signal and a reference signal on the determined MBSFN subframe, which is not specifically limited in this embodiment of the present invention.

The reference signal may be determined according to the reference signal pattern. For a specific implementation method, refer to the description in the embodiment shown in FIG. 2, and details are not described herein again.

It should be noted that when a reference signal is being received, for a method for parsing the reference signal in a multi-antenna transmission manner, refer to a method for parsing a reference signal in unicast in a multi-antenna transmission manner, and details are not described herein in this embodiment of the present invention.

Embodiment 3

Figure 41:
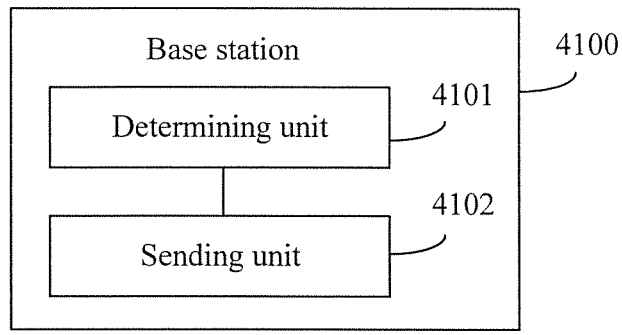
FIG. 41 is a schematic structural diagram of a base station according to an embodiment of the present invention.

This embodiment of the present invention provides a base station 4100. Specifically, as shown in FIG. 41, the base station 4100 includes a determining unit 4101 and a sending unit 4102.

The determining unit 4101 is configured to determine a subframe configuration of an MBSFN subframe that is used to bear a PMCH, where the subframe configuration includes a cyclic prefix CP type and/or a reference signal pattern.

The CP type includes a normal CP, an extended CP, or another CP, and a length of the another CP is different from a length of the normal CP or a length of the extended CP.

The sending unit 4102 is configured to send the MBSFN configuration information determined by the determining unit 4101 to user equipment UE, where the MBSFN configuration information is used to indicate the subframe configuration of the MBSFN subframe.

Preferably, two possible implementation manners in which the determining unit 4101 determines the subframe configuration of the MBSFN subframe that is used to bear the PMCH are provided herein:

In one possible implementation manner, the determining unit 4101 is specifically configured to:

use a preset subframe configuration of the MBSFN subframe, where the preset subframe configuration of the MBSFN subframe is determined based on a deployment environment of the base station 4100.

In the other possible implementation manner, the determining unit 4101 is specifically configured to:

receive second MBSFN configuration information sent by a network device, and determine the subframe configuration of the MBSFN subframe according to the second MBSFN configuration information.

Further, the subframe configuration of the MBSFN subframe may include at least one configuration of a configuration A or B:

the configuration A: the CP type is a normal CP or another CP; or the configuration B: in each physical resource block PRB pair, the reference signal pattern includes n reference signal resource elements REs, where n is a positive integer less than 18.

The configuration B may further include:

n==6, and the n reference signal REs are spaced five, three, or one subcarrier apart in a frequency domain; or n=8, and the n reference signal REs are spaced two subcarriers apart in a frequency domain; or n=9, and the n reference signal REs are spaced three subcarriers apart in a frequency domain; or n=4, and the n reference signal REs are spaced five or two subcarriers apart in a frequency domain; or n=12, and the n reference signal REs are spaced one subcarrier apart in a frequency domain.

Particularly, the configuration B further includes: if the reference signal RE is denoted as (k,l), k indicates a frequency domain index, and l indicates a time domain index:

when n=6, and the n reference signal REs are spaced five subcarriers apart in the frequency domain:

$$k = \begin{cases} 6m + k_0 & \text{if } l \neq l_1 \text{ and } \Delta f = 15 \text{ kHz} \\ 6m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1, l_2 & \text{if } n_s \bmod 2 = 1 \text{ and } \Delta f = 15 \text{ kHz} \end{cases},$$

$0 \leq k_0 \leq 5$, $-5 \leq a_0 \leq 5$, $0 \leq k_0 + a_0 \leq 5$, and $m = 0, 1, \ldots, 2N_{RB}^{PMCH,DL} - 1$; or when n=6, and the n reference signal REs are spaced three subcarriers apart in the frequency domain:

$$k = \begin{cases} 4m + k_0 & \text{if } l \neq l_1 \text{ and } \Delta f = 15 \text{ kHz} \\ 4m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1 & \text{if } n_s \bmod 2 = 1 \text{ and } \Delta f = 15 \text{ kHz} \end{cases},$$

$0 \leq k_0 \leq 5$, $-5 \leq a_0 \leq 3$, and $0 \leq k_0 + a_0 \leq 5$, and $m = 0, 1, \ldots, 2N_{RB}^{PMCH,DL} - 1$; or when n=6, and the n reference signal REs are spaced one subcarrier apart in the frequency domain:

$k = 2m + k_0$, $l = l_0$ if $n_s \bmod 2 = 0$ and $\Delta f = 15$ kHz, $0 \leq k_0 \leq 1$, and $m = 0, 1, \ldots, 6N_{RB}^{PMCH,DL} - 1$; or when n=8, and the n reference signal REs are spaced two subcarriers apart in the frequency domain:

$$k = \begin{cases} 3m + k_0 & \text{if } l \neq l_1 \text{ and } \Delta f = 15 \text{ kHz} \\ 3m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1 & \text{if } n_s \bmod 2 = 1 \text{ and } \Delta f = 15 \text{ kHz} \end{cases},$$

$0 \leq k_0 \leq 2$, $-2 \leq a_0 \leq 2$, and $0 \leq k_0 + a_0 \leq 2$, and $m = 0, 1, \ldots, 1N_{RB}^{PMCH,DL} - 1$; or when n=9, and the n reference signal REs are spaced three subcarriers apart in the frequency domain:

$$k = \begin{cases} 4m + k_0 & \text{if } l \neq l_1 \text{ and } \Delta f = 15 \text{ kHz} \\ 4m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1, l_2 & \text{if } n_s \bmod 2 = 1 \text{ and } \Delta f = 15 \text{ kHz} \end{cases},$$

$0 \leq k_0 \leq 3$, $-3 \leq a_0 \leq 3$, and $0 \leq k_0 + a_0 \leq 3$, and $m = 0, 1, \ldots, 3N_{RB}^{PMCH,DL} - 1$; or when n=4, and the n reference signal REs are spaced five subcarriers apart in the frequency domain:

$$k = \begin{cases} 6m + k_0 & \text{if } l \neq l_1 \text{ and } \Delta f = 15 \text{ kHz} \\ 6m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1 & \text{if } n_s \bmod 2 = 1 \text{ and } \Delta f = 15 \text{ kHz} \end{cases},$$

$0 \leq k_0 \leq 5$, $-5 \leq a_0 \leq 5$, $0 \leq k_0 + a_0 \leq 5$, and $m = 0, 1, \ldots, 2N_{RB}^{PMCH,DL} - 1$; or when n=4, and the n reference signal REs are spaced two subcarriers apart in the frequency domain:

$k = 3m + k_0$, $l = l_0$ if $n_s \bmod 2 = 0$ and $\Delta f = 15$ kHz, $0 \leq k_0 \leq 2$, and $m = 0, 1, \ldots, 4N_{RB}^{PMCH,DL} - 1$; or when n=12, and the n reference signal REs are spaced one subcarrier apart in the frequency domain:

$$k = \begin{cases} 2m + k_0 & \text{if } l \neq l_1 \text{ and } \Delta f = 15 \text{ kHz} \\ 2m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1 & \text{if } n_s \bmod 2 = 1 \text{ and } \Delta f = 15 \text{ kHz} \end{cases},$$

$0 \leq k_0 \leq 1$, $-1 \leq a_0 \leq 1$, $0 \leq k_0 + a_0 \leq 1$, and $m = 0, 1, \ldots, 6N_{RB}^{PMCH,DL} - 1$; where $\Delta f$ indicates a frequency domain spacing between adjacent subcarriers; $n_s$ indicates a number of a timeslot that is in a radio frame and in which the reference signal RE is located; $n_s \bmod 2$ indicates a mod 2 operation performed on $n_s$; m indicates a number of a reference symbol; $k_0$ and $a_0$ indicate offsets of the frequency domain index; $l_0$, $l_1$, and $l_2$ indicate numbers of OFDM symbols in the timeslot $n_s$ in which the reference signal RE is located, where $t \leq l_0 \leq N_{symb}^{DL} - 1$, $0 \leq l_1 \leq N_{symb}^{DL} - 1$, $0 \leq l_2 \leq N_{symb}^{DL} - 1$, and $l_1 < l_2$; $N_{RB}^{PMCH,DL}$ indicates transmission bandwidth of the PMCH borne on the MBSFN subframe; $N_{symb}^{DL}$ indicates a quantity of OFDM symbols in one timeslot; and t indicates a number of an initial OFDM symbol of the PMCH on the MBSFN subframe.

Further, the sending unit 4102 is further configured to send configuration info illation of a physical downlink shared channel PDSCH to the UE, where the configuration information of the PDSCH is used to indicate transmission bandwidth of the PDSCH on the MBSFN subframe.

Further, the sending unit 4102 is further configured to send orthogonal frequency division multiplexing OFDM symbol information of the PMCH to the UE, where the OFDM symbol information of the PMCH is used to indicate that the initial OFDM symbol of the PMCH on the MBSFN subframe is the first OFDM symbol of the MBSFN subframe.

Further, the sending unit 4102 is further configured to send configuration information of an enhanced physical downlink control channel EPDCCH to the UE, where the configuration information of the EPDCCH is used to indicate transmission bandwidth of the EPDCCH on the MBSFN subframe.

Further, the sending unit 4102 is further configured to send antenna configuration information of the PMCH to the UE, where the antenna configuration information is used to indicate that an antenna transmission manner of the PMCH is a multi-antenna transmission manner in which a quantity of antenna ports is greater than 1.

Preferably, in the multi-antenna transmission manner, the reference signal pattern uses a frequency division multiplexing FDM manner, or a time division multiplexing TDM manner, or a code division multiplexing CDM manner in which code division is performed by using an orthogonal code.

Specifically, for a method of performing MBSFN configuration by using the base station 4100, refer to the description in Embodiment 1, and details are not described herein in this embodiment of the present invention.

Because the base station 4100 in this embodiment can be configured to execute the method in the foregoing Embodiment 1, for a technical effect that can be achieved in this embodiment, refer to the description in the foregoing embodiment, and details are not described herein again.

Embodiment 4

Figure 42:
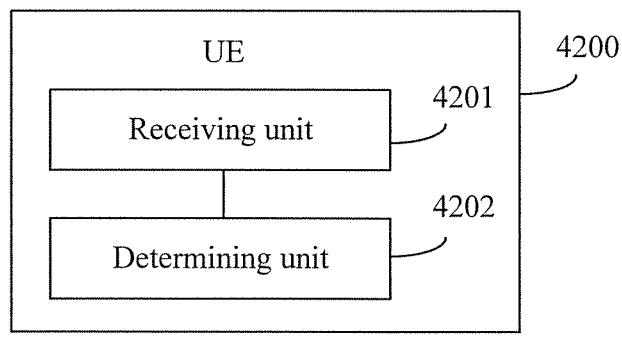
FIG. 42 is a schematic structural diagram of UE according to an embodiment of the present invention.

This embodiment of the present invention provides user equipment UE 4200. Specifically, as shown in FIG. 42, the UE 4200 includes a receiving unit 4201 and a determining unit 4202.

The receiving unit 4201 is configured to receive Multimedia Broadcast multicast service Single Frequency Network MBSFN configuration information, where the MBSFN configuration information is used to indicate a subframe configuration of an MBSFN subframe that bears a physical multicast channel PMCH, and the subframe configuration includes a cyclic prefix CP type and/or a reference signal pattern.

The CP type includes a normal CP, an extended CP, or another CP, and a length of the another CP is different from a length of the normal CP or a length of the extended CP.

The determining unit 4202 is configured to determine the subframe configuration of the MBSFN subframe according to the MBSFN configuration information received by the receiving unit 4201.

Further, the subframe configuration of the MBSFN subframe may include at least one configuration of a configuration A or B:

the configuration A: the CP type is a normal CP or another CP; or the configuration B: in each physical resource block PRB pair, the reference signal pattern includes n reference signal resource elements REs, where n is a positive integer less than 18.

The configuration B may further include:

n=6, and the n reference signal REs are spaced five, three, or one subcarrier apart in a frequency domain; or n=8, and the n reference signal REs are spaced two subcarriers apart in a frequency domain; or n=9, and the n reference signal REs are spaced three subcarriers apart in a frequency domain; or n=4, and the n reference signal REs are spaced five or two subcarriers apart in a frequency domain; or n=12, and the n reference signal REs are spaced one subcarrier apart in a frequency domain.

Particularly, the configuration B further includes: if the reference signal RE is denoted as (k,l), k indicates a frequency domain index, and l indicates a time domain index:

when n=6, and the n reference signal REs are spaced five subcarriers apart in the frequency domain:

$$k = \begin{cases} 6m + k_0 & \text{if } l \neq l_1 \text{ and } \Delta f = 15 \text{ kHz} \\ 6m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1, l_2 & \text{if } n_s \bmod 2 = 1 \text{ and } \Delta f = 15 \text{ kHz} \end{cases},$$

$0 \leq k_0 \leq 5$, $-5 \leq a_0 \leq 5$, $0 \leq k_0 + a_0 \leq 5$, and m=0, 1, ..., $2N_{RB}^{PMCH,DL} - 1$; or when n=6, and the n reference signal REs are spaced three subcarriers apart in the frequency domain:

$$k = \begin{cases} 4m + k_0 & \text{if } l \neq l_1 \text{ and } \Delta f = 15 \text{ kHz} \\ 4m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1 & \text{if } n_s \bmod 2 = 1 \text{ and } \Delta f = 15 \text{ kHz} \end{cases},$$

$0 \leq k_0 \leq 3$, $-3 \leq a_0 \leq 3$, and $0 \leq k_0 + a_0 \leq 3$, and m=0, 1, ..., $3N_{RB}^{PMCH,DL} - 1$; or when n=6, and the n reference signal REs are spaced one subcarrier apart in the frequency domain:

$k = 2m + k_0$, $l = l_0$ if $n_s \bmod 2 = 0$ and $\Delta f = 15$ kHz, $0 \leq k_0 \leq 1$, and m=0, 1, ..., $6N_{RB}^{PMCH,DL} - 1$; or when n=8, and the n reference signal REs are spaced two subcarriers apart in the frequency domain:

$$k = \begin{cases} 3m + k_0 & \text{if } l \neq l_1 \text{ and } \Delta f = 15 \text{ kHz} \\ 3m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1 & \text{if } n_s \bmod 2 = 1 \text{ and } \Delta f = 15 \text{ kHz} \end{cases},$$

$0 \leq k_0 \leq 2$, $-2 \leq a_0 \leq 2$, and $0 \leq k_0 + a_0 \leq 2$, and m=0, 1, ..., $1N_{RB}^{PMCH,DL} - 1$; or when n=9, and the n reference signal REs are spaced three subcarriers apart in the frequency domain:

$$k = \begin{cases} 4m + k_0 & \text{if } l \neq l_1 \text{ and } \Delta f = 15 \text{ kHz} \\ 4m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1, l_2 & \text{if } n_s \bmod 2 = 1 \text{ and } \Delta f = 15 \text{ kHz} \end{cases},$$

$0 \leq k_0 \leq 3$, $-3 \leq a_0 \leq 3$, and $0 \leq k_0 + a_0 \leq 3$, and m=0, 1, ..., $3N_{RB}^{PMCH,DL} - 1$; or when n=4, and the n reference signal REs are spaced five subcarriers apart in the frequency domain:

$$k = \begin{cases} 6m + k_0 & \text{if } l \neq l_1 \text{ and } \Delta f = 15 \text{ kHz} \\ 6m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1 & \text{if } n_s \bmod 2 = 1 \text{ and } \Delta f = 15 \text{ kHz} \end{cases},$$

$0 \leq k_0 \leq 5$, $-5 \leq a_0 \leq 5$, $0 \leq k_0 + a_0 \leq 5$, and m=0, 1, . . . , $2N_{RB}^{PMCH,DL} - 1$; or when n=4, and the n reference signal REs are spaced two subcarriers apart in the frequency domain:

$k = 3m + k_0$, $l = l_0$ if $n_s \bmod 2 = 0$ and $\Delta f = 15$ kHz, $0 \leq k_0 \leq 2$, and m=0, 1, . . . , $4N_{RB}^{PMCH,DL} - 1$; or when n=12, and the n reference signal REs are spaced one subcarrier apart in the frequency domain:

$$k = \begin{cases} 2m + k_0 & \text{if } l \neq l_1 \text{ and } \Delta f = 15 \text{ kHz} \\ 2m + k_0 + a_0 & \text{if } l = l_1 \text{ and } \Delta f = 15 \text{ kHz} \end{cases},$$

$$l = \begin{cases} l_0 & \text{if } n_s \bmod 2 = 0 \text{ and } \Delta f = 15 \text{ kHz} \\ l_1 & \text{if } n_s \bmod 2 = 1 \text{ and } \Delta f = 15 \text{ kHz} \end{cases},$$

$0 \leq k_0 \leq 1$, $-1 \leq a_0 \leq 1$, $0 \leq k_0 + a_0 \leq 1$, and m=0, 1, . . . , $6N_{RB}^{PMCH,DL} - 1$;

$\Delta f$ indicates a frequency domain spacing between adjacent subcarriers; $n_s$ indicates a number of a timeslot that is in a radio frame and in which the reference signal RE is located; $n_s \bmod 2$ indicates a mod 2 operation performed on $n_s$; m indicates a number of a reference symbol; $k_0$ and $a_0$ indicate offsets of the frequency domain index; $l_0$, $l_1$, and $l_2$ indicate numbers of OFDM symbols in the timeslot $n_s$ in which the reference signal RE is located, where to $t \leq l_0 \leq N_{symb}^{DL} - 1$, $0 \leq l_1 \leq N_{symb}^{DL} - 1$, $0 \leq l_2 \leq N_{symb}^{DL} - 1$, and $l_1 < l_2$; $N_{RB}^{PMCH,DL}$ indicates transmission bandwidth of the PMCH borne on the MBSFN subframe; $N_{symb}^{DL}$ indicates a quantity of OFDM symbols in one timeslot; and t indicates a number of an initial OFDM symbol of the PMCH on the MBSFN subframe.

Further, the receiving unit 4201 is further configured to receive configuration information of a physical downlink shared channel PDSCH, where the configuration information of the PDSCH is used to indicate transmission bandwidth of the PDSCH on the MBSFN subframe.

The determining unit 4202 is further configured to determine the transmission bandwidth of the PDSCH on the MBSFN subframe according to the configuration information of the PDSCH that is received by the receiving unit 4201.

Further, the receiving unit 4201 is further configured to receive orthogonal frequency division multiplexing OFDM symbol information of the PMCH, where the OFDM symbol information is used to indicate that the initial OFDM symbol of the PMCH on the MBSFN subframe is the first OFDM symbol of the MBSFN subframe.

The determining unit 4202 is further configured to determine the initial OFDM symbol of the PMCH on the MBSFN subframe according to the OFDM symbol information of the PMCH that is received by the receiving unit 4201.

Further, the receiving unit 4201 is further configured to receive configuration information of an enhanced physical downlink control channel EPDCCH, where the configuration information of the EPDCCH is used to indicate transmission bandwidth of the EPDCCH on the MBSFN subframe.

The determining unit 4202 is further configured to determine the transmission bandwidth of the EPDCCH on the MBSFN subframe according to the configuration information of the EPDCCH that is received by the receiving unit 4201.

Further, the receiving unit 4201 is further configured to receive antenna configuration information of the PMCH, where the antenna configuration information is used to indicate that an antenna transmission manner of the PMCH is a multi-antenna transmission manner in which a quantity of antenna ports is greater than 1.

The determining unit 4202 is further configured to determine the antenna transmission manner of the PMCH according to the antenna configuration information of the PMCH that is received by the receiving unit 4201.

Preferably, in the multi-antenna transmission manner, the reference signal pattern uses a frequency division multiplexing FDM manner, or a time division multiplexing TDM manner, or a code division multiplexing CDM manner in which code division is performed by using an orthogonal code.

Specifically, for a method of performing MBSFN configuration by using the UE 4200, refer to the description in Embodiment 2, and details are not described herein in this embodiment of the present invention.

Because the UE 4200 in this embodiment can be configured to execute the method in the foregoing Embodiment 2, for a technical effect that can be achieved in this embodiment, refer to the description in the foregoing embodiment, and details are not described herein again.

Embodiment 5

Figure 43:
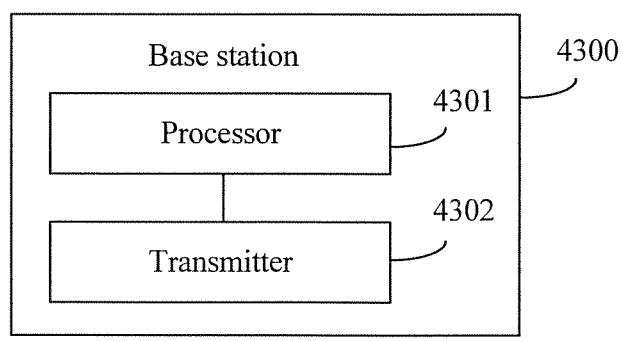
FIG. 43 is a schematic structural diagram of a base station according to an embodiment of the present invention.

This embodiment of the present invention provides a base station. Specifically, as shown in FIG. 43, the base station includes a processor 4301 and a transmitter 4302.

The processor 4301 is configured to determine a subframe configuration of an MBSFN subframe that is used to bear a PMCH, where the subframe configuration includes a cyclic prefix CP type and/or a reference signal pattern.

The CP type includes a normal CP, an extended CP, or another CP, and a length of the another CP is different from a length of the normal CP or a length of the extended CP.

The transmitter 4302 is configured to send the MBSFN configuration information determined by the processor 4301 to user equipment UE, where the MBSFN configuration information is used to indicate the subframe configuration of the MBSFN subframe.

Preferably, two possible implementation manners in which the processor 4301 determines the subframe configuration of the MBSFN subframe that is used to bear are provided herein:

In one possible implementation manner, the processor 4301 is specifically configured to:

use a preset subframe configuration of the MBSFN subframe, where the preset subframe configuration of the MBSFN subframe is determined based on a deployment environment of the base station 4300.

In the other possible implementation manner, the processor 4301 is specifically configured to:

receive second MBSFN configuration information sent by a network device, and determine the subframe configuration of the MBSFN subframe according to the second MBSFN configuration information.

Further, the subframe configuration of the MBSFN subframe may include at least one configuration of a configuration A or B:

the configuration A: the CP type is a not CP or another CP; or the configuration B: in each physical resource block PRB pair, the reference signal pattern includes n reference signal resource elements REs, where n is a positive integer less than 18.

The configuration B may further include:

n=6, and the n reference signal REs are spaced five, three, or one subcarrier apart in a frequency domain; or n=8, and the n reference signal REs are spaced two subcarriers apart in a frequency domain; or n=9, and the n reference signal REs are spaced three subcarriers apart in a frequency domain; or n=4, and the n reference signal REs are spaced five or two subcarriers apart in a frequency domain; or n=12, and the n reference signal REs are spaced one subcarrier apart in a frequency domain.

Particularly, for the reference signal patterns of the MBSFN subframe, refer to the corresponding reference signal patterns respectively obtained when n=6, 8, 9, 4, 12 in Embodiment 1, which is not described herein again in this embodiment of the present invention.

Further, the transmitter 4302 is further configured to send configuration information of a physical downlink shared channel PDSCH to the UE, where the configuration information of the PDSCH is used to indicate transmission bandwidth of the PDSCH on the MBSFN subframe.

Further, the transmitter 4302 is further configured to send orthogonal frequency division multiplexing OFDM symbol information of the PMCH to the UE, where the OFDM symbol information of the PMCH is used to indicate that the initial OFDM symbol of the PMCH on the MBSFN subframe is the first OFDM symbol of the MBSFN subframe.

Further, the transmitter 4302 is further configured to send configuration information of an enhanced physical downlink control channel EPDCCH to the UE, where the configuration information of the EPDCCH is used to indicate transmission bandwidth of the EPDCCH on the MBSFN subframe, and the transmission bandwidth of the EPDCCH represents frequency division multiplexing between the EPDCCH and the PMCH.

Further, the transmitter 4302 is further configured to send antenna configuration information of the PMCH to the UE, where the antenna configuration information is used to indicate that an antenna transmission manner of the PMCH is a multi-antenna transmission manner in which a quantity of antenna ports is greater than 1.

Preferably, in the multi-antenna transmission manner, the reference signal pattern uses a frequency division multiplexing FDM manner, or a time division multiplexing TDM manner, or a code division multiplexing CDM manner in which code division is performed by using an orthogonal code.

Specifically, for a method of performing MBSFN configuration by using the base station 4300, refer to the description in Embodiment 1, and details are not described herein in this embodiment of the present invention.

Because the base station 4300 in this embodiment can be configured to execute the method in the foregoing Embodiment 1, for a technical effect that can be achieved in this embodiment, refer to the description in the foregoing embodiment, and details are not described herein again.

Embodiment 6

Figure 44:
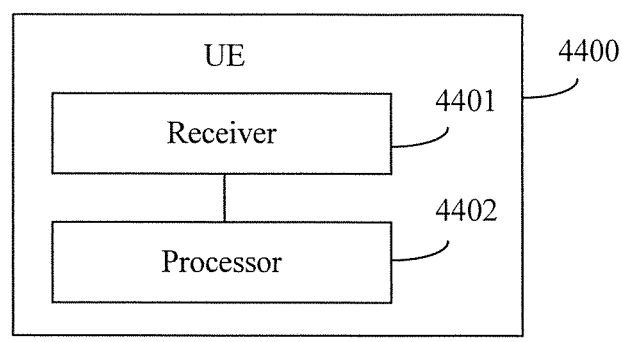
FIG. 44 is a schematic structural diagram of UE according to an embodiment of the present invention.

This embodiment of the present invention provides user equipment UE 4400. Specifically, as shown in FIG. 44, the UE 4400 includes a receiver 4401 and a processor 4402.

The receiver 4401 is configured to receive Multimedia Broadcast multicast service Single Frequency Network MBSFN configuration information, where the MBSFN configuration information is used to indicate a subframe configuration of an MBSFN subframe that bears a physical multicast channel PMCH, and the subframe configuration includes a cyclic prefix CP type and/or a reference signal pattern.

The CP type includes a normal CP, an extended CP, or another CP, and a length of the another CP is different from a length of the normal CP or a length of the extended CP.

The processor 4402 is configured to determine the subframe configuration of the MBSFN subframe according to the MBSFN configuration information received by the receiver 4401.

Further, the subframe configuration of the MBSFN subframe may include at least one configuration of a configuration A or B:

the configuration A: the CP type is a normal CP or another CP; or the configuration B: in each physical resource block PRB pair, the reference signal pattern includes n reference signal resource elements REs, where n is a positive integer less than 18.

The configuration B may further include:

n=6, and the n reference signal REs are spaced five, three, or one subcarrier apart in a frequency domain; or n=8, and the n reference signal REs are spaced two subcarriers apart in a frequency domain; or n=9, and the n reference signal REs are spaced three subcarriers apart in a frequency domain; or n=4, and the n reference signal REs are spaced five or two subcarriers apart in a frequency domain; or n=12, and the n reference signal REs are spaced one subcarrier apart in a frequency domain.

Particularly, for the reference signal patterns of the MBSFN subframe, refer to the corresponding reference signal patterns respectively obtained when n=6, 8, 9, 4, 12 in Embodiment 1, which is not described herein again in this embodiment of the present invention.

Further, the receiver 4401 is further configured to receive configuration information of a physical downlink shared channel PDSCH, where the configuration information of the PDSCH is used to indicate transmission bandwidth of the PDSCH on the MBSFN subframe.

The processor 4402 is further configured to determine the transmission bandwidth of the PDSCH on the MBSFN subframe according to the configuration information of the PDSCH that is received by the receiver 4401.

Further, the receiver 4401 is further configured to receive orthogonal frequency division multiplexing OFDM symbol information of the PMCH, where the OFDM symbol information is used to indicate that the initial OFDM symbol of the PMCH on the MBSFN subframe is the first OFDM symbol of the MBSFN subframe.

The processor 4402 is further configured to determine the initial OFDM symbol of the PMCH on the MBSFN subframe according to the OFDM symbol information of the PMCH that is received by the receiver 4401.

Further, the receiver 4401 is further configured to receive configuration information of an enhanced physical downlink control channel EPDCCH, where the configuration information of the EPDCCH is used to indicate transmission bandwidth of the EPDCCH on the MBSFN subframe.

The processor 4402 is further configured to determine the transmission bandwidth of the EPDCCH on the MBSFN subframe according to the configuration information of the EPDCCH that is received by the receiver 4401.

Further, the receiver 4401 is further configured to receive antenna configuration information of the PMCH, where the antenna configuration information is used to indicate that an antenna transmission manner of the PMCH is a multi-antenna transmission manner in which a quantity of antenna ports is greater than 1.

The processor 4402 is further configured to determine the antenna transmission manner of the PMCH according to the antenna configuration information of the PMCH that is received by the receiver 4401.

Preferably, in the multi-antenna transmission manner, the reference signal pattern uses a frequency division multiplexing FDM manner, or a time division multiplexing TDM manner, or a code division multiplexing CDM manner in which code division is performed by using an orthogonal code.

Specifically, for a method of performing MBSFN configuration by using the UE 4400, refer to the description in Embodiment 2, and details are not described herein in this embodiment of the present invention.

Because the UE 4400 in this embodiment can be configured to execute the method in the foregoing Embodiment 2, for a technical effect that can be achieved in this embodiment, refer to the description in the foregoing embodiment, and details are not described herein again.

It may be clearly understood by a person skilled in the art that, for the purpose of convenient and brief description, in the apparatus described above, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation.

For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor (processor) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A Multimedia Broadcast multicast service Single Frequency Network (MBSFN) configuration method, the method comprising:

receiving, by user equipment (UE), MBSFN configuration information, wherein the MBSFN configuration information indicates a subframe configuration of an MBSFN subframe that bears a physical multicast channel (PMCH), and the subframe configuration comprises a cyclic prefix (CP) type and/or a reference signal pattern;

determining, by the UE, the subframe configuration of the MBSFN subframe according to the MBSFN configuration information, wherein the CP type comprises a normal CP, an extended CP, or another CP, and a length of the another CP is different from a length of the normal CP or a length of the extended CP;

receiving, by the UE, orthogonal frequency division multiplexing (OFDM) symbol information of the PMCH for indicating that the initial OFDM symbol of the PMCH on the MBSFN subframe is the first OFDM symbol of the MBSFN subframe;

determining, by the UE, the initial OFDM symbol of the PMCH on the MBSFN subframe according to the OFDM symbol information of the PMCH;

receiving, by the UE, antenna configuration information of the PMCH for indicating that an antenna transmission manner of the PMCH is a multi-antenna transmission manner in which a quantity of antenna ports is greater than 1;

determining, by the UE, the antenna transmission manner of the PMCH according to the antenna configuration information of the PMCH; and wherein the subframe configuration of the MBSFN subframe comprises:

in each physical resource block (PRB) pair, the reference signal pattern comprises n reference signal resource elements (REs), wherein n is a positive integer less than 18, wherein:

n=6, and the n reference signal REs are spaced five, three, or one subcarrier apart in a frequency domain; or n=8, and the n reference signal REs are spaced two subcarriers apart in a frequency domain; or n=9, and the n reference signal REs are spaced three subcarriers apart in a frequency domain; or n=4, and the n reference signal REs are spaced five or two subcarriers apart in a frequency domain.

2. The method according to claim 1, wherein the subframe configuration of the MBSFN subframe comprises:
the CP type is another CP.

3. The method according to claim 1, wherein the subframe configuration of the MBSFN subframe comprises:
a location of the reference signal RE in the reference signal pattern meets the following conditions:
when the reference signal RE is denoted as (k,l), k indicates a frequency domain index, and l indicates a time domain index;
when n=6, and then n reference signal REs are spaced five subcarriers apart in the frequency domain:

$$k = \begin{cases} 6m + k_0 & \text{if } l \neq l_1 \text{ and } \Delta f = 15 \text{ kHz} \\ 6m + k_0 + a_0 & \text{if } l = l_1 \text{ and } \Delta f = 15 \text{ kHz} \end{cases},$$

$$l = \begin{cases} l_0 & \text{if } n_s \mod 2 = 0 \text{ and } \Delta f = 15 \text{ kHz} \\ l_1, l_2 & \text{if } n_s \mod 2 = 1 \text{ and } \Delta f = 15 \text{ kHz} \end{cases},$$

$0 \leq k_0 \leq 5$, $-5 \leq a_0 \leq 5$, $0 \leq k_0 + a_0 \leq 5$, and m=0,1, ..., $2N_{RB}^{PMCH,DL}-1$; or when n=6, and the n reference signal REs are spaced three subcarriers apart in the frequency domain:

$$k = \begin{cases} 4m + k_0 & \text{if } l \neq l_1 \text{ and } \Delta f = 15 \text{ kHz} \\ 4m + k_0 + a_0 & \text{if } l = l_1 \text{ and } \Delta f = 15 \text{ kHz} \end{cases},$$

$$l = \begin{cases} l_0 & \text{if } n_s \mod 2 = 0 \text{ and } \Delta f = 15 \text{ kHz} \\ l_1 & \text{if } n_s \mod 2 = 1 \text{ and } \Delta f = 15 \text{ kHz} \end{cases},$$

$0 \leq k_0 \leq 3$, $-3 \leq a_0 \leq 3$, and $0 \leq k_0 + a_0 \leq 3$; and m=0,1, ..., $3N_{RB}^{PMCH,DL}-1$; or when n=6, and the n reference signal REs are spaced one subcarrier apart in the frequency domain:
k=2m+$k_0$, l=$l_0$ if $n_s$ mod 2=0 and $\Delta f$=15 kHz, 0<$k_0$<1, and m=0,1, ..., $6N_{RB}^{PMCH,DL}-1$; or when n=8, and the n reference signal REs are spaced two subcarriers apart in the frequency domain:

$$k = \begin{cases} 3m + k_0 & \text{if } l \neq l_1 \text{ and } \Delta f = 15 \text{ kHz} \\ 3m + k_0 + a_0 & \text{if } l = l_1 \text{ and } \Delta f = 15 \text{ kHz} \end{cases},$$

$$l = \begin{cases} l_0 & \text{if } n_s \mod 2 = 0 \text{ and } \Delta f = 15 \text{ kHz} \\ l_1 & \text{if } n_s \mod 2 = 1 \text{ and } \Delta f = 15 \text{ kHz} \end{cases},$$

$0 \leq k_0 \leq 2$, $-2 \leq a_0 \leq 2$, and $0 \leq k_0 + a_0 \leq 2$; and m=0,1, ..., $4N_{RB}^{PMCH,DL}-1$; or when n=9, and the n reference signal REs are spaced three subcarriers apart in the frequency domain:

$$k = \begin{cases} 4m + k_0 & \text{if } l \neq l_1 \text{ and } \Delta f = 15 \text{ kHz} \\ 4m + k_0 + a_0 & \text{if } l = l_1 \text{ and } \Delta f = 15 \text{ kHz} \end{cases},$$

-continued $$l = \begin{cases} l_0 & \text{if } n_s \mod 2 = 0 \text{ and } \Delta f = 15 \text{ kHz} \\ l_1, l_2 & \text{if } n_s \mod 2 = 1 \text{ and } \Delta f = 15 \text{ kHz} \end{cases},$$

$0 \leq k_0 \leq 3$, $-3 \leq a_0 \leq 3$, and $0 \leq k_0 + a_0 \leq 3$; and m=0,1, ..., $3N_{RB}^{PMCH,DL}-1$; or when n=4, and the n reference signal REs are spaced five subcarriers apart in the frequency domain:

$$k = \begin{cases} 6m + k_0 & \text{if } l \neq l_1 \text{ and } \Delta f = 15 \text{ kHz} \\ 6m + k_0 + a_0 & \text{if } l = l_1 \text{ and } \Delta f = 15 \text{ kHz} \end{cases},$$

$$l = \begin{cases} l_0 & \text{if } n_s \mod 2 = 0 \text{ and } \Delta f = 15 \text{ kHz} \\ l_1 & \text{if } n_s \mod 2 = 1 \text{ and } \Delta f = 15 \text{ kHz} \end{cases},$$

$0 \leq k_0 \leq 5$, $-5 \leq a_0 \leq 5$, and $0 \leq k_0 = a_0 \leq 5$, and m=0,1, ..., $2N_{RB}^{PMCH,DL}-1$; or when n=4, and the n reference signal REs are spaced two subcarriers apart in the frequency domain:
k=3m+$k_0$, l=$l_0$ if $n_s$ mod 2=0 and $\Delta f$=15 kHz, $0 \leq k_0 \leq 2$, and m=0,1, ..., $4N_{RB}^{PMCH,DL}-1$; wherein $\Delta f$ indicates a frequency domain spacing between adjacent subcarriers; $n_s$ indicates a number of a timeslot that is in a radio frame and in which the reference signal RE is located; $n_s$ mod 2 indicates a mod 2 operation performed on $n_s$; m indicates a number of a reference symbol; $k_0$ and $a_0$ indicate offsets of the frequency domain index; $l_0$, $l_1$, $l_2$ indicate numbers of OFDM symbols in the timeslot $n_s$ in which the reference signal RE is located, wherein $t \leq l_0 \leq N_{symb}^{DL}-1$, $0 \leq l_1 \leq N_{symb}^{DL}-1$, $0 \leq l_2 \leq N_{symb}^{DL}-1$, and $l_1 < l_2$; $N_{RB}^{PMCH,DL}$ indicates transmission bandwidth of the PMCH borne on the MBSFN subframe; $N_{symb}^{DL}$ indicates a quantity of OFDM symbols in one timeslot; and t indicates a number of an initial OFDM symbol of the PMCH on the MBSFN subframe.

4. The method according to claim 1, further comprising:
receiving, by the UE, configuration information of a physical downlink shared channel (PDSCH) for indicating transmission bandwidth of the PDSCH on the MBSFN subframe; and
determining, by the UE, the transmission bandwidth of the PDSCH on the MBSFN subframe according to the configuration information of the PDSCH.

5. The method according to claim 1, further comprising:
receiving, by the UE, configuration information of an enhanced physical downlink control channel (EPDCCH) for indicating transmission bandwidth of the EPDCCH on the MBSFN subframe; and
determining, by the UE, the transmission bandwidth of the EPDCCH on the MBSFN subframe according to the configuration information of the EPDCCH.

6. The method according to claim 1, wherein in the multi-antenna transmission manner, a reference signal carried on a resource element (RE) of the reference signal pattern uses a frequency division multiplexing (FDM) manner, or a time division multiplexing (TDM) manner, or a code division multiplexing (CDM) manner in which code division is performed by using an orthogonal code.

7. User equipment (UE), comprising:
a receiver and a processor; wherein:
the receiver is configured to:
receive Multimedia Broadcast multicast service Single Frequency Network (MBSFN) configuration information, wherein the MBSFN configuration information indicates a subframe configuration of an MBSFN subframe that bears a physical multicast channel (PMCH), and the subframe configuration comprises a cyclic prefix (CP) type and/or a reference signal pattern, receive orthogonal frequency division multiplexing (OFDM) symbol information of the PMCH, for indicating that the initial OFDM symbol of the PMCH on the MBSFN subframe is the first OFDM symbol of the MBSFN subframe, and receive antenna configuration information of the PMCH for indicating that an antenna transmission manner of the PMCH is a multi-antenna transmission manner in which a quantity of antenna ports is greater than 1; and the processor is configured to:
determine the subframe configuration of the MBSFN subframe according to the MBSFN configuration information, wherein the CP type comprises a normal CP, an extended CP, or another CP, and a length of the another CP is different from a length of the normal CP or a length of the extended CP, determine the initial OFDM symbol of the PMCH on the MBSFN subframe according to the OFDM symbol information of the PMCH, and determine the antenna transmission manner of the PMCH according to the antenna configuration information of the PMCH; and wherein the subframe configuration of the MBSFN subframe comprises:
in each physical resource block (PRB) pair, the reference signal pattern comprises n reference signal resource elements (REs), wherein n is a positive integer less than 18, wherein:
n=6, and the n reference signal REs are spaced five, three, or one subcarrier apart in a frequency domain; or
n=8, and the n reference signal REs are spaced two subcarriers apart in a frequency domain; or
n=9, and the n reference signal REs are spaced three subcarriers apart in a frequency domain; or
n=4, and the n reference signal REs are spaced five or two subcarriers apart in a frequency domain.

8. The UE according to claim 7, wherein the subframe configuration of the MBSFN subframe comprises:
the CP type is another CP.

9. The UE according to claim 7, wherein the subframe configuration of the MBSFN subframe comprises:
a location of the reference signal RE in the reference signal pattern meets the following conditions:
when the reference signal RE is denoted as (k,l), k indicates a frequency domain index, and l indicates a time domain index;
when n=6, and the n reference signal REs are spaced five subcarriers apart in the frequency domain:

$$k = \begin{cases} 6m + k_0 & \text{if } l \neq l_1 \text{ and } \Delta f = 15 \text{ kHz} \\ 6m + k_0 + a_0 & \text{if } l = l_1 \text{ and } \Delta f = 15 \text{ kHz} \end{cases},$$

$$l = \begin{cases} l_0 & \text{if } n_s \text{mod}2 = 0 \text{ and } \Delta f = 15 \text{ kHz} \\ l_1, l_2 & \text{if } n_s \text{mod}2 = 1 \text{ and } \Delta f = 15 \text{ kHz} \end{cases},$$

$0 \leq k_0 \leq 5$, $-5 \leq a_0 \leq 5$, $0 \leq k_0 + a_0 \leq 5$, and $m = 0, 1, \ldots, 2N_{RB}^{PMCH,DL} - 1$; or when n=6, and the n reference signal REs are spaced three subcarriers apart in the frequency domain:

$$k = \begin{cases} 4m + k_0 & \text{if } l \neq l_1 \text{ and } \Delta f = 15 \text{ kHz} \\ 4m + k_0 + a_0 & \text{if } l = l_1 \text{ and } \Delta f = 15 \text{ kHz} \end{cases},$$

$$l = \begin{cases} l_0 & \text{if } n_s \text{mod}2 = 0 \text{ and } \Delta f = 15 \text{ kHz} \\ l_1 & \text{if } n_s \text{mod}2 = 1 \text{ and } \Delta f = 15 \text{ kHz} \end{cases},$$

$0 \leq k_0 \leq 3$, $31 \ 3 \leq a_0 \leq 3$, and $0 \leq k_0 + a_0 \leq 3$; and $m = 0, 1, \ldots, 3N_{RB}^{PMCH,DL} - 1$; or when n=6, and the n reference signal REs are spaced one subcarrier apart in the frequency domain:
$k = 2m + k_0$, $l = l_0$ if $n_s \text{ mod } 2 = 0$ and $\Delta f = 15$ kHz, $0 \leq k_0 \leq 1$, and $m = 0, 1, \ldots, 6N_{RB}^{PMCH,DL} - 1$; or when n=8, and the n reference signal REs are spaced two subcarriers apart in the frequency domain:

$$k = \begin{cases} 3m + k_0 & \text{if } l \neq l_1 \text{ and } \Delta f = 15 \text{ kHz} \\ 3m + k_0 + a_0 & \text{if } l = l_1 \text{ and } \Delta f = 15 \text{ kHz} \end{cases},$$

$$l = \begin{cases} l_0 & \text{if } n_s \text{mod}2 = 0 \text{ and } \Delta f = 15 \text{ kHz} \\ l_1 & \text{if } n_s \text{mod}2 = 1 \text{ and } \Delta f = 15 \text{ kHz} \end{cases},$$

$0 \leq k_0 \leq 2$, $-2 \leq a_0 \leq 2$, and $0 \leq k_0 + a_0 \leq 2$; and $m = 0, 1, \ldots, 4N_{RB}^{PMCH,DL} - 1$; or when n=9, and the n reference signal REs are spaced three subcarriers apart in the frequency domain:

$$k = \begin{cases} 4m + k_0 & \text{if } l \neq l_1 \text{ and } \Delta f = 15 \text{ kHz} \\ 4m + k_0 + a_0 & \text{if } l = l_1 \text{ and } \Delta f = 15 \text{ kHz} \end{cases},$$

$$l = \begin{cases} l_0 & \text{if } n_s \text{mod}2 = 0 \text{ and } \Delta f = 15 \text{ kHz} \\ l_1, l_2 & \text{if } n_s \text{mod}2 = 1 \text{ and } \Delta f = 15 \text{ kHz} \end{cases},$$

$0 \leq k_0 \leq 3$, $-3 \leq a_0 \leq 3$, and $0 \leq k_0 + a_0 23 \ 3$; and $m = 0, 1, \ldots, 3N_{RB}^{PMCH,DL} - 1$; or when n=4, and the n reference signal REs are spaced five subcarriers apart in the frequency domain:

$$k = \begin{cases} 6m + k_0 & \text{if } l \neq l_1 \text{ and } \Delta f = 15 \text{ kHz} \\ 6m + k_0 + a_0 & \text{if } l = l_1 \text{ and } \Delta f = 15 \text{ kHz} \end{cases},$$

$$l = \begin{cases} l_0 & \text{if } n_s \text{mod}2 = 0 \text{ and } \Delta f = 15 \text{ kHz} \\ l_1 & \text{if } n_s \text{mod}2 = 1 \text{ and } \Delta f = 15 \text{ kHz} \end{cases},$$

$0 \leq k_0 \leq 5$, $-5 \leq a_0 \leq 5$, $0 \leq k_0 + a_0 \leq 5$, and $m = 0, 1, \ldots, 2N_{RB}^{PMCH,DL} - 1$; or when n=4, and the n reference signal REs are spaced two subcarriers apart in the frequency domain:
$k = 3m + k_0$, $l = l_0$ if $n_s \text{ mod } 2 = 0$ and $\Delta f = 15$ kHz, $0 \leq k_0 \leq 2$, and $m = 0, 1, \ldots, 4N_{RB}^{PMCH,DL} - 1$; wherein $\Delta f$ indicates a frequency domain spacing between adjacent subcarriers; $n_s$ indicates a number of a timeslot that is in a radio frame and in which the reference signal RE is located; $n_s$ mod 2 indicates a mod 2 operation performed on $n_s$; m indicates a number of a reference symbol; $k_0$ and $a_0$ indicate offsets of the frequency domain index; $l_0$, $l_1$, and $l_2$ indicate numbers of OFDM symbols in the timeslot $n_s$ in which the reference signal RE is located, wherein $t \leq l_0 \leq N_{symb}^{DL} - 1$, $0 \leq l_1 \leq N_{symb}^{DL} - 1$, $0 \leq l_2 \leq N_{symb}^{DL} - 1$, and $l_1 < l_2$; $N_{RB}^{PM}$ $_{CH,DL}$ indicates transmission bandwidth of the PMCH borne on the MBSFN subframe; $N_{symb}^{DL}$ indicates a quantity of OFDM symbols in one timeslot; and t indicates a number of an initial OFDM symbol of the PMCH on the MBSFN subframe.

10. The UE according to claim 7, wherein:
the receiver is further configured to receive configuration information of a physical downlink shared channel (PDSCH), wherein the configuration information of the PDSCH indicates transmission bandwidth of the PDSCH on the MBSFN subframe; and
the processor is further configured to determine the transmission bandwidth of the PDSCH on the MBSFN subframe according to the configuration information of the PDSCH.

11. The UE according to claim 7, wherein:
the receiver is further configured to receive configuration information of an enhanced physical downlink control channel EPDCCH for indicating transmission bandwidth of the EPDCCH on the MBSFN subframe; and
the processor is further configured to determine the transmission bandwidth of the EPDCCH on the MBSFN subframe according to the configuration information of the EPDCCH.

12. The UE according to claim 7, wherein in the multi-antenna transmission manner, a reference signal carried on a resource element (RE) of the reference signal pattern uses a frequency division multiplexing (FDM) manner, or a time division multiplexing (TDM) manner, or a code division multiplexing (CDM) manner in which code division is performed by using an orthogonal code.

13. A non-transitory computer-readable storage medium comprising instructions which, when executed by a computer of a control plane network element, cause the computer to:
receive Multimedia Broadcast multicast service Single Frequency Network (MBSFN) configuration information, wherein the MBSFN configuration information indicates a subframe configuration of an MBSFN subframe that bears a physical multicast channel (PMCH), and the subframe configuration comprises a cyclic prefix (CP) type and/or a reference signal pattern;
receive orthogonal frequency division multiplexing (OFDM) symbol information of the PMCH, for indicating that the initial OFDM symbol of the PMCH on the MBSFN subframe is the first OFDM symbol of the MBSFN subframe;
receive antenna configuration information of the PMCH for indicating that an antenna transmission manner of the PMCH is a multi-antenna transmission manner in which a quantity of antenna ports is greater than 1;
determine the subframe configuration of the MBSFN subframe according to the MBSFN configuration information, wherein the CP type comprises a normal CP, an extended CP, or another CP, and a length of the another CP is different from a length of the normal CP or a length of the extended CP;
determine the initial OFDM symbol of the PMCH on the MBSFN subframe according to the OFDM symbol information of the PMCH;
determine the antenna transmission manner of the PMCH according to the antenna configuration information of the PMCH; and
wherein the subframe configuration of the MBSFN subframe comprises:
in each physical resource block (PRB) pair, the reference signal pattern comprises n reference signal resource elements (REs), wherein n is a positive integer less than 18, wherein:
n=6, and the n reference signal REs are spaced five, three, or one subcarrier apart in a frequency domain; or
n=8, and the n reference signal REs are spaced two subcarriers apart in a frequency domain; or
n=9, and the n reference signal REs are spaced three subcarriers apart in a frequency domain; or
n=4, and the n reference signal REs are spaced five or two subcarriers apart in a frequency domain.

* * * * *

UNITED STATES PATENT AND TRADEMARK OFFICE
CERTIFICATE OF CORRECTION

PATENT NO. : 10,536,926 B2
APPLICATION NO. : 15/336491
DATED : January 14, 2020
INVENTOR(S) : Wang et al.

Page 1 of 1

It is certified that error appears in the above-identified patent and that said Letters Patent is hereby corrected as shown below:

In the Claims

Claim 3, Column 47, Line 20: "then n reference signal REs" should read -- the n reference signal REs --.

Claim 3, Column 48, Line 18: "$0 \leq k_0 = a_0 \leq 5$" should read -- $0 \leq k_0 + a_0 \leq 5$ --.

Claim 3, Column 48, Line 28: "mod 2indicates" should read -- mod 2 indicates --.

Claim 9, Column 50, Line 11: "$31\ 3 \leq a_0 \leq 3$" should read -- $-3 \leq a_0 \leq 3$ --.

Claim 9, Column 50, Line 40: "$0 \leq k_0 + a_0 23\ 3$" should read -- $0 \leq k_0 + a_0 \leq 3$ --.

Signed and Sealed this
Fourth Day of August, 2020

Andrei Iancu
*Director of the United States Patent and Trademark Office*